US012591660B2

(12) United States Patent
Kakaiya et al.

(10) Patent No.: US 12,591,660 B2
(45) Date of Patent: Mar. 31, 2026

(54) DEVICE SECURITY MANAGER ARCHITECTURE FOR TRUSTED EXECUTION ENVIRONMENT INPUT/OUTPUT (TEE-IO) CAPABLE SYSTEM-ON-A-CHIP INTEGRATED DEVICES

(71) Applicant: Intel Corporation, Santa Clara, CA (US)

(72) Inventors: Utkarsh Y. Kakaiya, El Dorado Hills, CA (US); Jiewen Yao, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 141 days.

(21) Appl. No.: 18/154,334

(22) Filed: Jan. 13, 2023

(65) Prior Publication Data

US 2023/0289433 A1 Sep. 14, 2023

(30) Foreign Application Priority Data

Jan. 18, 2022 (WO) ............... PCT/CN2022/072494

(51) Int. Cl.
*G06F 21/00* (2013.01)
*G06F 21/53* (2013.01)

(52) U.S. Cl.
CPC ........ *G06F 21/53* (2013.01); *G06F 2221/033* (2013.01)

(58) Field of Classification Search
CPC .... G06F 21/53; G06F 2221/033; G06F 21/57; G06F 21/575; G06F 21/74
See application file for complete search history.

(56) References Cited

U.S. PATENT DOCUMENTS

| 2010/0031325 | A1* | 2/2010 | Maigne ................... G06F 21/53 |
| | | | 718/1 |
| 2019/0228145 | A1* | 7/2019 | Shanbhogue ....... G06F 13/1668 |
| 2019/0311123 | A1* | 10/2019 | Lal ........................ H04L 9/0891 |
| 2020/0137031 | A1* | 4/2020 | Pappachan ............ H04L 63/061 |

(Continued)

OTHER PUBLICATIONS

"TEE Device Interface Security Protocol (TDISP)", PCI-SIG Engineering Change Notice, 2020, 62 pages.

(Continued)

*Primary Examiner* — Ghazal B Shehni
(74) *Attorney, Agent, or Firm* — NICHOLSON DE VOS WEBSTER & ELLIOTT LLP

(57) ABSTRACT

Systems, methods, and apparatuses for implementing device security manager architecture for trusted execution environment input/output (TEE-IO) capable system-on-a-chip integrated devices are described. In one example, a system includes a hardware processor core configurable to implement a trust domain manager to manage one or more virtual machines as a respective trust domain isolated from a virtual machine monitor, and an input/output device coupled to the hardware processor core and comprising a device security manager circuit, wherein the device security manager circuit is to, in response to an trusted request from the trust domain manager to a control interface of the device security manager circuit, access a state of a trusted device interface of the input/output device for a trust domain of the trust domain manager, and provide a corresponding response to the trust domain manager.

24 Claims, 29 Drawing Sheets

(56) References Cited

U.S. PATENT DOCUMENTS

| | | | | |
|---|---|---|---|---|
| 2020/0145419 A1* | 5/2020 | Yitbarek | ............. | H04L 63/0853 |
| 2020/0310972 A1* | 10/2020 | Shanbhogue | ........... | G06F 21/79 |
| 2021/0026543 A1* | 1/2021 | Trikalinou | ............ | G06F 3/0655 |
| 2021/0141658 A1 | 5/2021 | Sahita et al. | | |

OTHER PUBLICATIONS

European Search Report and Search Opinion, EP App. No. 23152161.8, Jun. 22, 2023, 8 pages.
Office Action, EP App. No. 23152161.8, Nov. 26, 2024, 4 pages.
DMTF, "Security Protocol and Data Model (SPDM) Specification", Version: 1.0.1, Mar. 19, 2021, 61 pages.
Intel Corporation, "Intel® Architecture Specification: Intel® Trust Domain Extensions (Intel® TDX) Module", Jun. 2022, 316 pages.
Intel Corporation, "Intel® Device Attestation Model in Confidential Computing Environment", Sep. 2022, 40 pages.
Intel Corporation, "Intel® Guest Hypervisor Communication Interface (GHCI) for Intel® Trust Domain Extensions (Intel® TDX) 1.0", Dec. 2022, 39 pages.
Intel Corporation, "Intel® Guest Hypervisor Communication Interface (GHCI) for Intel® Trust Domain Extensions (Intel® TDX) 1.5", Jul. 2022, 71 pages.
Intel Corporation, "Intel® Software Enabling for Intel® TDX in Support of TEE-I/O", Revision 1.00, Sep. 2022, 26 pages.
Intel Corporation, "Intel® TDS Module Architecture Specification: TD Migration", Sep. 2021, 68 pages.
Intel Corporation, "Intel® TDX Virtual Firmware Design Guide", Dec. 2022, 68 pages.
Intel Corporation, "Intel® Trust Domain CPU Architectural Extensions", May 2021, 40 pages.
Intel Corporation, "Intel® Trust Domain Extensions (Intel® TDX) Module Architecture Application Binary Interface (ABI) Reference Specification", Sep. 2021, 296 pages.
Intel Corporation, "Intel® Trust Domain Extensions (Intel® TDX) Module Base Architecture Specification", Sep. 2021, 133 pages.
Intel Corporation, "Intel® Trust Domain Extensions (TDX) Migration TD Design Guide", Oct. 2021, 49 pages.
Intel Corporation, "Intel® Trust Domain Extensions—SEAM Loader (SEAMLDR) Interface Specification", Mar. 2022, 26 pages.
Intel Corporation, "Intel® Trust Domain Extensions", White Paper, Aug. 2022, 9 pages.

* cited by examiner

Device Security Manager 136
(e.g., on TEE-IO Capable Discrete Device)

DSM BACK END
136B

MEASUREMENTS
136B-1

IDE KM
136B-2

TDI REPORTING
136B-3

TDI STATE
MANAGEMENT
136B-4

DSM FRONT END
136A

IDENTITY
136A-1

SPDM
136A-2

SECURE SPDM
136A-3

SPDM

Secure SPDM

TDM (e.g., TEE Security Manager) 101
(e.g., on TEE-IO Capable Host)

TDX-IO Designated Vendor-Specific Extended Capability (DVSEC) 904

| 31 | 24 | 23 | 20 | 19 | 16 | 15 | | 0 | Byte Offset |
|---|---|---|---|---|---|---|---|---|---|
| Next Capability Offset | | | | Cap Version (e.g., = 1) | | PCI Express Extended Capability ID (e.g., = 0x23) | | | 00h |
| DVSEC Length | | | | DVSEC rev (e.g., = 0) | | DVSEC Vendor ID (e.g., = 0x8086) | | | 04h |
| TDX-IO Caps | | | | | | DVSEC ID = TDX-IO | | | 08h |
| TDX-IO Status | | | | | | TDX-IO Control 906 | | | 0Ch |
| | | | | TDX-IO DSM Location 908 | | | | | 10h |

FIG. 9B

| Example format for TDX-IO DVSEC 902 | | | | |
|---|---|---|---|---|
| Bytes | Bits | Attr | Size | Description |
| 3:0 | 31:20 | RO | 12 bits | Next Capability Offset – This field contains the offset to the next PCI Express Capability structure or 000h if no other items exist in the linked list of Capabilities. |
| | 19:16 | RO | 4 bits | Capability Version – This field is a PCI-SIG defined version number that indicates the version of the Capability structure present. E.g., must be 1h for this version of the specification. |
| | 15:0 | RO | 16 bits | PCI Express Extended Capability ID – This field is a PCI-SIG defined ID number that indicates the nature and format of the Extended Capability. Extended Capability ID for the Designated Vendor-Specific Extended Capability is 0023h. |
| 7:4 | 31:20 | RO | 12 bits | DVSEC Length - This field indicates the number of bytes in the entire DVSEC structure, including the PCI Express Extended Capability Header, the DVSEC Header 1, DVSEC Header 2, and DVSEC vendor-specific registers. |
| | 19:16 | RO | 4 bits | DVSEC Revision - This field is a vendor-defined version number that indicates the version of the DVSEC structure. Software must qualify the DVSEC Vendor ID and DVSEC ID before interpreting this field. E.g., must be 0h for this version of the specification. |
| | 15:0 | RO | 16 bits | DVSEC Vendor ID - This field is the Vendor ID associated with the vendor that defined the contents of this capability. E.g., must be 8086h in certain examples. |
| 9:8 | 15:0 | RO | 8 bits | DVSEC ID - This field is a vendor-defined ID that indicates the nature and format of the DVSEC structure. Software must qualify the DVSEC Vendor ID before interpreting this field. E.g., must be 10h for TDX-IO in certain examples. |
| 11:10 | 15:1 | RO | 7 bits | Reserved |
| | 0 | RO | 1 bit | DSM TDI Supported – This field indicates if DSM TDI is supported, and a valid DSM TDI location is specified or not. E.g., default value is 0b. |
| 13:12 906 | 15:1 | RW | 7 bits | Reserved |
| | 0 | RW | 1 bit | TDX Mode Enable – This field is set to enable device to operate in TDX mode. E.g., default value is 0b. |
| 15:14 | 15:1 | RO | 7 bits | Reserved |
| | 0 | RO | 1 bit | TDX Mode Status – This field indicates if TDX mode is enabled or not. E.g., default value is 0b. |
| 19:16 908 | 31:12 | RO | 20 bits | DSM Offset – This field indicates offset of DSM from the address specified in the Function's Base Address Register (BAR). DSM location must be 4KB aligned. |
| | 11:3 | RO | 9 bits | Reserved |
| | 2:0 | RO | 3 bits | DSM BAR Index – This field indicates which one of the Function's Base Address Registers is used to host the DSM. |

FIG. 9C

Example format for TDX-IO DSM Caps 918

| Bytes | Bits | Attr | Size | Description |
|---|---|---|---|---|
| 7:0 | 63:56 | RO | 8 bits | Number of Measurement Registers -- This field indicates number of measurement registers in the DSM. |
| | 55:16 | RO | 40 bits | Reserved |
| | 15:0 | RO | 16 bits | Number of TDIs -- This field indicates number of TDI registers in the DSM. |

Figure 12:
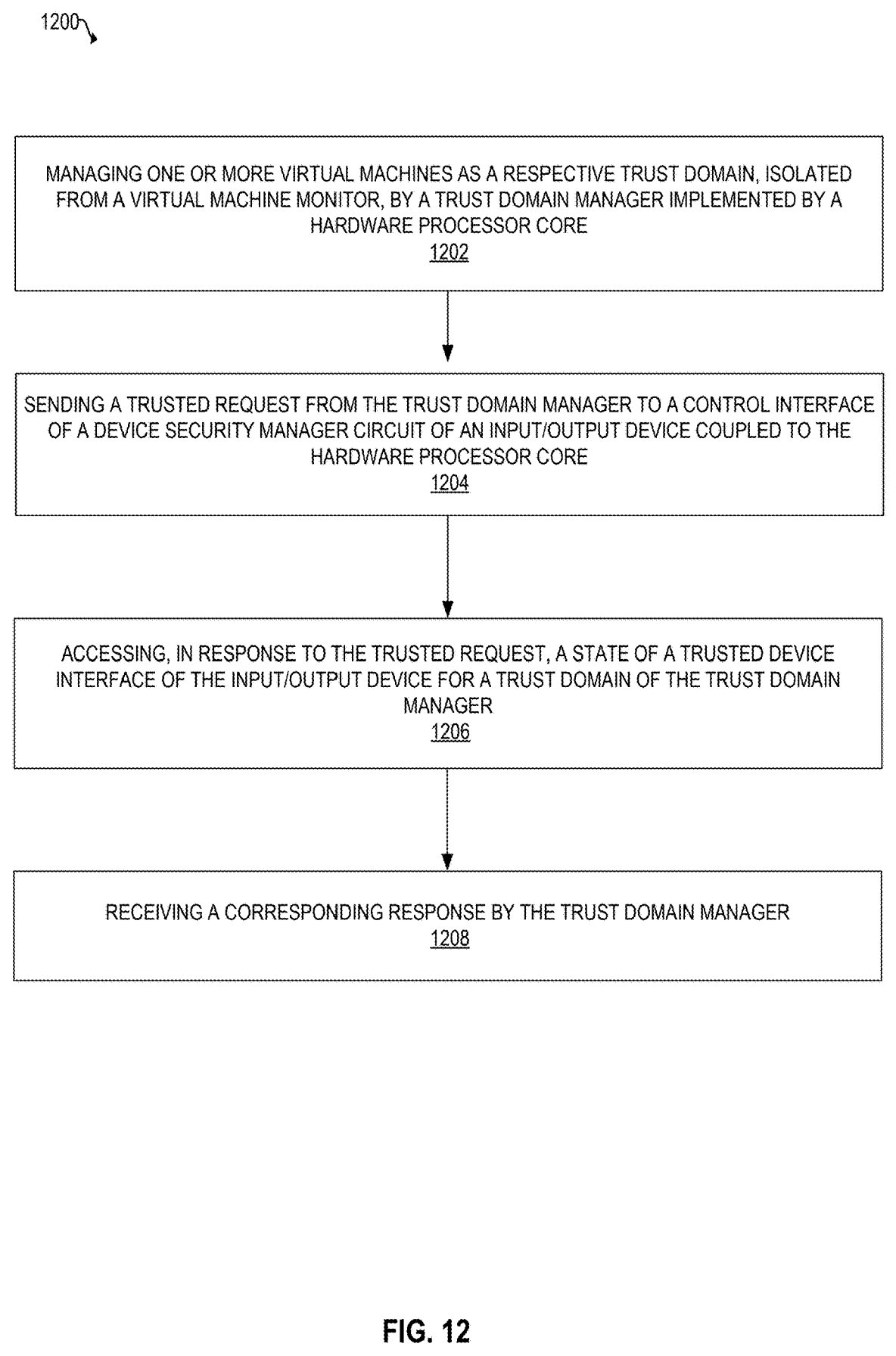

MANAGING ONE OR MORE VIRTUAL MACHINES AS A RESPECTIVE TRUST DOMAIN, ISOLATED FROM A VIRTUAL MACHINE MONITOR, BY A TRUST DOMAIN MANAGER IMPLEMENTED BY A HARDWARE PROCESSOR CORE
1202

SENDING A TRUSTED REQUEST FROM THE TRUST DOMAIN MANAGER TO A CONTROL INTERFACE OF A DEVICE SECURITY MANAGER CIRCUIT OF AN INPUT/OUTPUT DEVICE COUPLED TO THE HARDWARE PROCESSOR CORE
1204

ACCESSING, IN RESPONSE TO THE TRUSTED REQUEST, A STATE OF A TRUSTED DEVICE INTERFACE OF THE INPUT/OUTPUT DEVICE FOR A TRUST DOMAIN OF THE TRUST DOMAIN MANAGER
1206

RECEIVING A CORRESPONDING RESPONSE BY THE TRUST DOMAIN MANAGER
1208

GENERIC VECTOR FRIENDLY INSTRUCTION FORMAT 1300

FIG. 13B

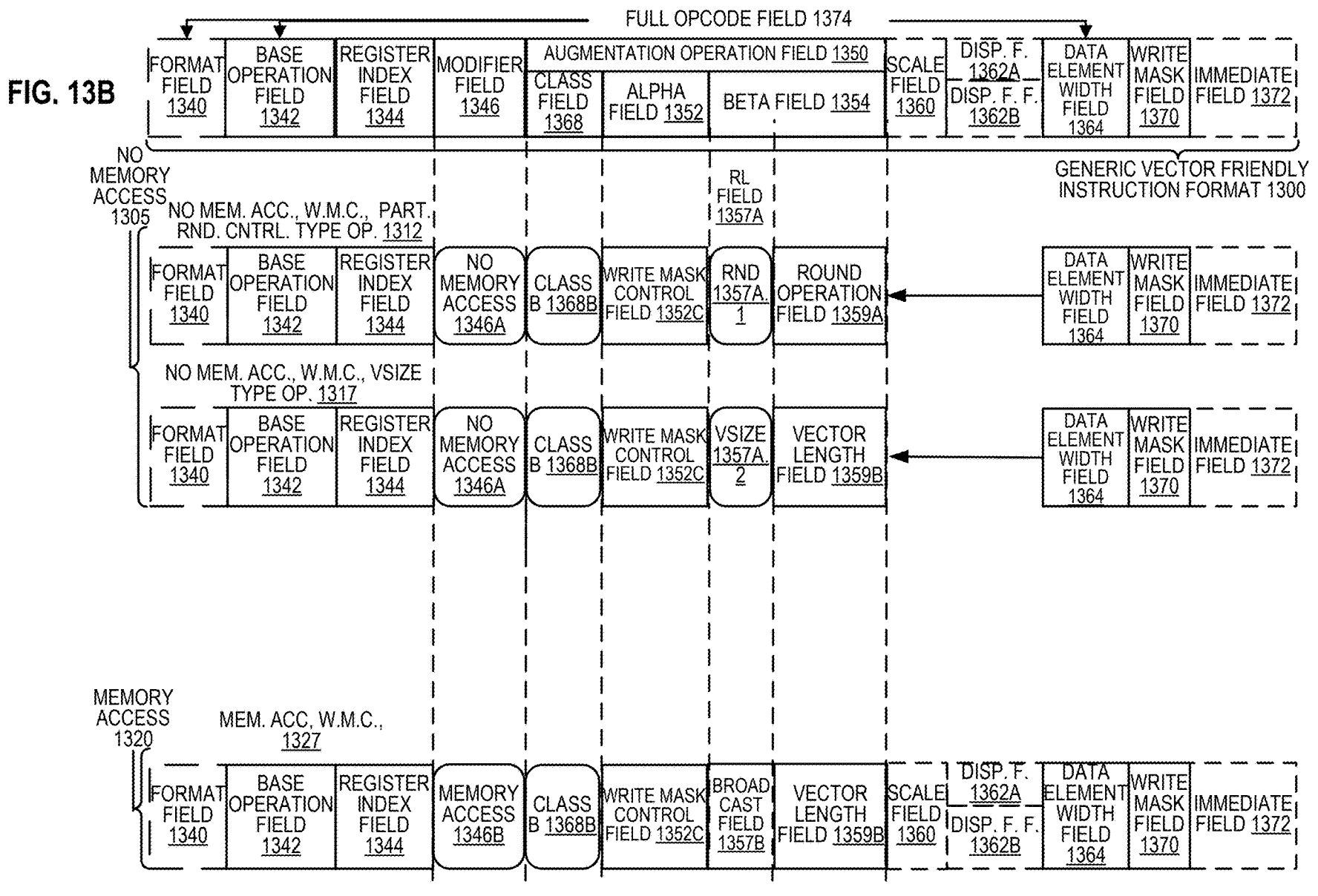

GENERIC VECTOR FRIENDLY INSTRUCTION FORMAT 1300

FULL OPCODE FIELD 1374

AUGMENTATION OPERATION FIELD 1350

NO MEMORY ACCESS 1305

NO MEM. ACC., W.M.C., PART. RND. CNTRL. TYPE OP. 1312

NO MEM. ACC., W.M.C., VSIZE TYPE OP. 1317

MEMORY ACCESS 1320

MEM. ACC., W.M.C., 1327

| FORMAT FIELD 1340 | BASE OPERATION FIELD 1342 | REGISTER INDEX FIELD 1344 | MODIFIER FIELD 1346 | CLASS FIELD 1368 | ALPHA FIELD 1352 | BETA FIELD 1354 | SCALE FIELD 1360 | DISP. F. 1362A / DISP. F. F. 1362B | DATA ELEMENT WIDTH FIELD 1364 | WRITE MASK FIELD 1370 | IMMEDIATE FIELD 1372 |

RL FIELD 1357A

| FORMAT FIELD 1340 | BASE OPERATION FIELD 1342 | REGISTER INDEX FIELD 1344 | NO MEMORY ACCESS 1346A | CLASS B 1368B | WRITE MASK CONTROL FIELD 1352C | RND 1357A.1 | ROUND OPERATION FIELD 1359A | | DATA ELEMENT WIDTH FIELD 1364 | WRITE MASK FIELD 1370 | IMMEDIATE FIELD 1372 |

| FORMAT FIELD 1340 | BASE OPERATION FIELD 1342 | REGISTER INDEX FIELD 1344 | NO MEMORY ACCESS 1346A | CLASS B 1368B | WRITE MASK CONTROL FIELD 1352C | VSIZE 1357A.2 | VECTOR LENGTH FIELD 1359B | | DATA ELEMENT WIDTH FIELD 1364 | WRITE MASK FIELD 1370 | IMMEDIATE FIELD 1372 |

| FORMAT FIELD 1340 | BASE OPERATION FIELD 1342 | REGISTER INDEX FIELD 1344 | MEMORY ACCESS 1346B | CLASS B 1368B | WRITE MASK CONTROL FIELD 1352C | BROAD CAST FIELD 1357B | VECTOR LENGTH FIELD 1359B | SCALE FIELD 1360 | DISP. F. 1362A / DISP. F. F. 1362B | DATA ELEMENT WIDTH FIELD 1364 | WRITE MASK FIELD 1370 | IMMEDIATE FIELD 1372 |

DEVICE SECURITY MANAGER ARCHITECTURE FOR TRUSTED EXECUTION ENVIRONMENT INPUT/OUTPUT (TEE-IO) CAPABLE SYSTEM-ON-A-CHIP INTEGRATED DEVICES

CROSS-REFERENCE TO RELATED APPLICATIONS

This application claims priority to International Application No. PCT/CN2022/072494 filed Jan. 18, 2022, which is hereby incorporated by reference in its entirety.

TECHNICAL FIELD

The disclosure relates generally to electronics, and, more specifically, an example of the disclosure relates to circuitry for implementing a device security manager for integrated devices that utilize input/output extensions for trust domains.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (IO). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 9B illustrates an example of a TDX-IO designated vendor-specific extended capability (DVSEC) according to examples of the disclosure.

FIG. 9C illustrates an example format of the fields of a TDX-IO designated vendor-specific extended capability (DVSEC) according to examples of the disclosure.

FIG. 9E illustrates an example format of a device security manager capabilities (DSM caps) register according to examples of the disclosure.

FIG. 12 is a flow diagram illustrating operations of a method for accessing state of a trusted device interface of an input/output device according to examples of the disclosure.

FIG. 13A is a block diagram illustrating a generic vector friendly instruction format and class A instruction templates thereof according to examples of the disclosure.

FIG. 13B is a block diagram illustrating the generic vector friendly instruction format and class B instruction templates thereof according to examples of the disclosure.

DETAILED DESCRIPTION

Figure 1:
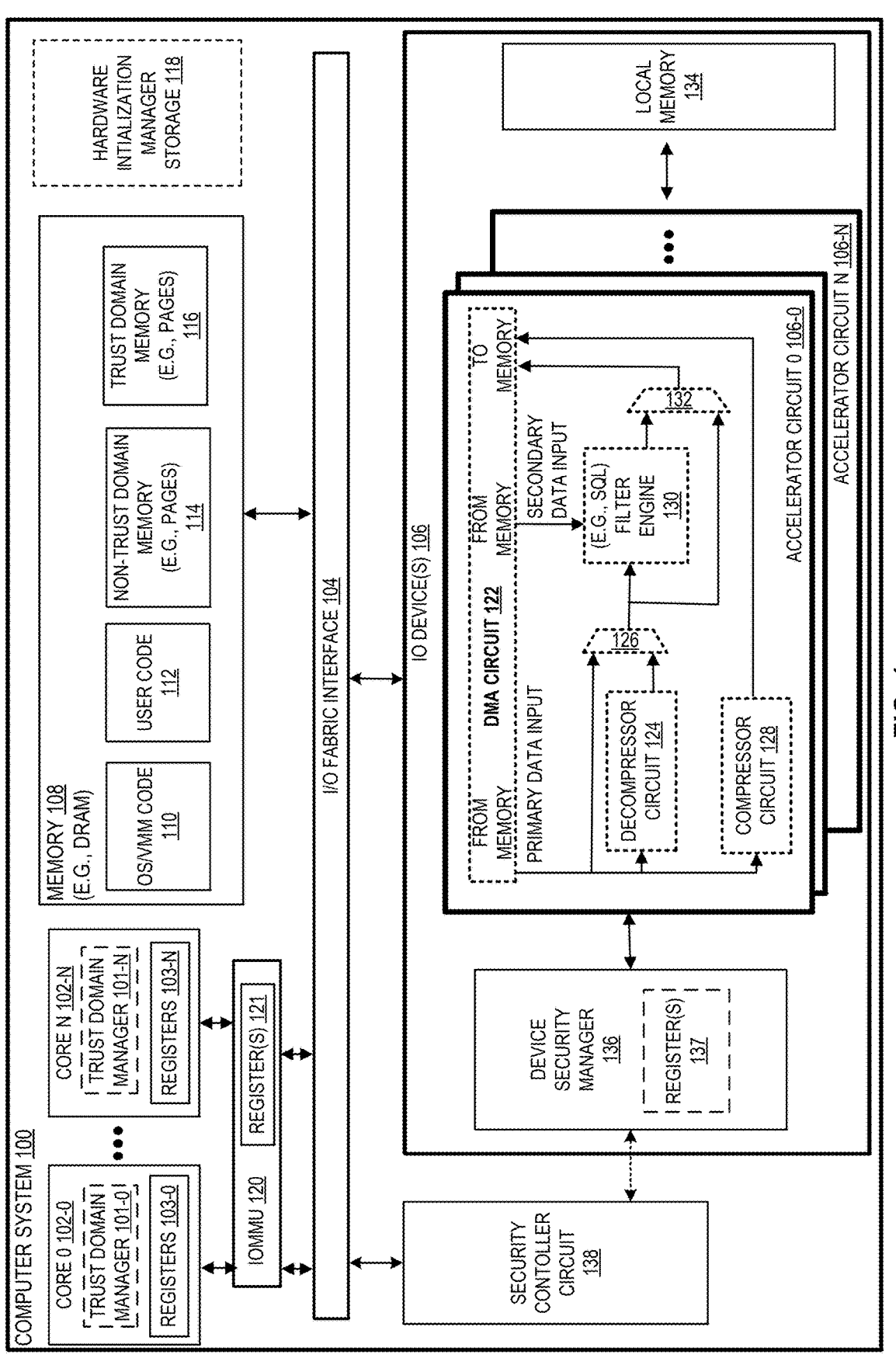
FIG. 1 illustrates a block diagram of a computer system including a plurality of cores having a trust domain manager, a memory, and an input/output (IO) device including a device security manager (e.g., circuit) according to examples of the disclosure.

In the following description, numerous specific details are set forth. However, it is understood that examples of the disclosure may be practiced without these specific details. In other instances, well-known circuits, structures, and techniques have not been shown in detail in order not to obscure the understanding of this description.

References in the specification to "one example," "an example," "examples," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

A (e.g., hardware) processor (e.g., having one or more cores) may execute instructions (e.g., a thread of instructions) to operate on data, for example, to perform arithmetic, logic, or other functions. For example, software may request an operation and a hardware processor (e.g., a core or cores thereof) may perform the operation in response to the request. Certain operations include accessing one or more memory locations, e.g., to store and/or read (e.g., load) data. A system may include a plurality of cores, e.g., with a proper subset of cores in each socket of a plurality of sockets, e.g., of a system-on-a-chip (SoC). Each core (e.g., each processor or each socket) may access data storage (e.g., a memory). Memory may include volatile memory (e.g., dynamic random-access memory (DRAM)) or (e.g., byte-addressable) persistent (e.g., non-volatile) memory (e.g., non-volatile RAM) (e.g., separate from any system storage, such as, but not limited, separate from a hard disk drive). One example of persistent memory is a dual in-line memory module (DIMM) (e.g., a non-volatile DIMM) (e.g., an Intel® Optane™ memory), for example, accessible according to a Compute Express Link (CXL) standard.

In certain examples of computing, a virtual machine (VM) (e.g., guest) is an emulation of a computer system. In certain examples, VMs are based on a specific computer architecture and provide the functionality of an underlying physical computer system. Their implementations may involve specialized hardware, firmware, software, or a combination. In certain examples, a virtual machine monitor (VMM) (also known as a hypervisor) is a software program that, when executed, enables the creation, management, and governance of VM instances and manages the operation of a virtualized environment on top of a physical host machine. A VMM is the primary software behind virtualization environments and implementations in certain examples. When installed over a host machine (e.g., processor) in certain examples, a VMM facilitates the creation of VMs, e.g., each with separate operating systems (OS) and applications. The VMM may manage the backend operation of these VMs by allocating the necessary computing, memory, storage, and other input/output (IO) resources, such as, but not limited to, an input/output memory management unit (IOMMU) (e.g., an IOMMU circuit). The VMM may provide a centralized interface for managing the entire operation, status, and availability of VMs that are installed over a single host machine or spread across different and interconnected hosts.

However, it may be desirable to maintain the security (e.g., confidentiality) of information for a virtual machine from the VMM and/or other virtual machine(s). Certain processors (e.g., a system-on-a-chip (SoC) including a processor) utilize their hardware and/or firmware to isolate virtual machines, for example, with each referred to as a "trust domain" (e.g., a "trust zone", "secure environment", "trusted area", or "secure area"). Certain processors support an instruction set architecture (ISA) (e.g., ISA extension) to implement trust domains. For example, Intel® trust domain extensions (Intel® TDX) that utilize architectural elements to deploy (e.g., hardware-isolated) virtual machines (VMs) referred to as trust domains (TDs). In certain examples, a processor, that implements a trust domain manager, is to utilize the processor's hardware to isolate each trust domain, e.g., isolated from the hosting VMM and service OS environments. In certain examples, a trust domain manager is built using a combination of instruction-set-architecture (ISA) extensions, multi-key total-memory-encryption (MKTME) technology (e.g., circuitry), and a CPU-attested software module.

In certain examples, a hardware processor and its ISA (e.g., a trust domain manager thereof) isolates TD VMs from the VMM (e.g., hypervisor) and/or other non-TD software (e.g., on the host platform). In certain examples, a hardware processor and its ISA (e.g., a trust domain manager thereof) implement trust domains to enhance confidential computing by helping protect the trust domains from a broad range of software attacks and reducing the trust domain's trusted computing base (TCB). In certain examples, a hardware processor and its ISA (e.g., a trust domain manager thereof) enhance a cloud tenant's control of data security and protection. In certain examples, a hardware processor and its ISA (e.g., a trust domain manager thereof) implement trust domains (e.g., trusted virtual machines) to enhance a cloud-service provider's (CSP) ability to provide managed cloud services without exposing tenant data to adversaries.

In certain examples, a hardware processor and its ISA (e.g., a trust domain manager thereof) also support device input/output (IO). For example, with an ISA (e.g., Intel® TDX 2.0) supporting trust domain extension (TDX) with device input/output (IO) (e.g., TDX-IO). In certain examples, a hardware processor and its ISA (e.g., a trust domain manager thereof) that support device input/output (IO) (e.g., TDX-IO) enables the use (e.g., assignment) of a physical function (PF) and/or a virtual function (VF) and/or an assignable device interface (e.g., Scalable IO Virtualization ADI) of a device to (e.g., only) a specific TD.

In certain examples, an IO device is an accelerator. One or more types of accelerators may be utilized. For example, a first type of accelerator may be accelerator circuit 106-0 from FIG. 1, e.g., an In-Memory Analytics accelerator (IAA). A second type of accelerator supports a set of transformation operations on memory, e.g., a data streaming accelerator (DSA). For example, to generate and test cyclic redundancy check (CRC) checksum or Data Integrity Field (DIF) to support storage and networking applications and/or for memory compare and delta generate/merge to support VM migration, VM Fast check-pointing, and software managed memory deduplication usages. A third type of accelerator supports security, authentication, and compression operations (e.g., cryptographic acceleration and compression operations), e.g., a QuickAssist Technology (QAT) accelerator.

While various examples described herein use the term System-on-a-Chip or System-on-Chip ("SoC") to describe a device or system having a processor and associated circuitry (e.g., Input/Output ("I/O") circuitry, power delivery circuitry, memory circuitry, etc.) integrated monolithically into a single Integrated Circuit ("IC") die, or chip, the present disclosure is not limited in that respect. For example, in various examples of the present disclosure, a device or system can have one or more processors (e.g., one or more processor cores) and associated circuitry (e.g., Input/Output ("I/O") circuitry, power delivery circuitry, etc.) arranged in a disaggregated collection of discrete dies, tiles and/or chiplets (e.g., one or more discrete processor core die arranged adjacent to one or more other die such as memory die, I/O die, etc.). In such disaggregated devices and systems, the various dies, tiles and/or chiplets can be physically and electrically coupled together by a package structure including, for example, various packaging substrates, interposers, active interposers, photonic interposers, interconnect bridges and the like. The disaggregated collection of discrete dies, tiles, and/or chiplets can also be part of a System-on-Package ("SoP").

Certain trust domains (TDs) are used to host confidential computing workloads isolated from hosting environments. Certain trust domain technology (e.g., TDX 1.0) architecture enables isolation of the TD (e.g., central processing unit (CPU)) context and memory from the hosting environment, but does not support trusted IO (e.g., direct memory access (DMA) or memory-mapped I/O (MMIO)) to TD private memory, e.g., leading to higher overheads as trust domains are to use a software mechanism for protecting data sent to IO devices (e.g., storage, network, etc.), for example, where all IO data is sent through bounce buffers in TD shared memory using para-virtualized interfaces. However, in certain examples, this precludes the use of some IO models, such as, but not limited to, scalable IO virtualization (IOV), shared virtual memory, direct IO assignments, and compute offload to an accelerator, field-programmable gate array (FPGA), and/or graphics processing unit (GPU). Thus, from an IO perspective, certain trust domain technology (e.g., TDX 1.0) suffers from the limitations of 1) functionality (e.g., security) because protection can only be extended for devices having the capabilities of end to end encryption (e.g., hardware (H/W) or software (S/W) stack based), as well as no support for state of the art IO virtualization/programming models, and 2) performance because copying for bounce buffers (and software based encryption) incurs significant performance overheads, especially with increased speed/bandwidth of IO devices (e.g., accelerators).

Certain trust domain technology (for example, trust domain extensions (TDX) with device input/output (IO) (e.g., TDX-IO)) defines the hardware, firmware, and/or software extensions to enable direct and trusted IO between TDs and corresponding IO (e.g., TDX-IO) enlightened devices, and thus overcomes the above limitations.

Certain systems (e.g., SoCs) are to implement trust domain (e.g., trusted execution environment (TEE)) extensions (e.g., TDX) to enable direct and trusted IO between a trust domain (TD) and a corresponding IO device (e.g., IO device integrated into a SoC). Certain systems (e.g., devices) utilize a device security manager (DSM) to implement direct and trusted IO between a trust domain (TD) and a corresponding IO device.

Examples herein are directed to a device security manager architecture for trust domain technology (for example, trust domain extensions with device input/output (TDX-IO) and/or trusted execution environment-IO (TEE-IO)) for SoC (e.g., integrated) devices. Examples herein are directed to an architecture for implementing a device security manager (DSM) on TEE-IO (e.g., TDX-IO) capable SoC (e.g., integrated) devices.

Certain device security managers (e.g., circuits) require the use of encrypted messages, e.g., according to a standard. For example, a device security manager for TEE-IO devices may be according to a Peripheral Component Interconnect Special Interest Group (PCI-SIG) TEE Device Interface Security Protocol (TDISP) standard. However, certain device security manager architectures (e.g., that use encrypted messages) may be undesirable for use by certain IO devices (e.g., SoC integrated devices) due to the cost and complexity associated therewith. For example, it may be undesirable to implement a device security manager that (i) requires the use of encrypted messages and/or (ii) that has support for a Distributed Management Task Force (DMTF) Secure Protocol and Data Model (SPDM) standard, e.g., using SPDM, Secure-SPDM (e.g., Secured Messages according to a SPDM standard), and/or TDISP message parsing, which increases the cost/complexity of the overall SoC.

Examples herein are directed to a (e.g., simplified architecture) device security manager that does not require the use of encrypted messages, e.g., but still meets the security and functional requirements associated with TEE-IO. Examples herein are directed to a (e.g., "lite-weight") device security manager architecture for TEE-IO capable SoC (e.g., integrated) devices that meets both security and functional requirements. Examples herein are directed to a device security manager that removes the need to build cryptographic engines, SPDM/Secure-SPDM engines, and message processors on an (e.g., integrated) device, and thus making it feasible to adopt TEE-IO (e.g., TDX-IO) capabilities on these devices. In certain examples, an IO device is an integrated accelerator (e.g., DSA, IAA, QAT, etc.) to support TDX-IO capabilities. In certain example, an IO device supports TEE-IO (e.g., TDX-IO) without supporting IDE, SPDM, and/or Secure-SPDM capabilities. Certain examples herein modify the device architecture, TEE security manager (TSM), and/or virtual machine monitor (VMM) to implement the disclosed device security manager (e.g., circuit).

In certain examples, the device security manager enhancements disclosed herein enable TEE-IO (e.g., TDX-IO), and thus are improvements to the functioning of a SoC (e.g., processor) (e.g., of a computer) itself as they allow for direct and trusted IO between a trust domain (TD) and a corresponding IO device.

It should be understood that the functionality (e.g., DSM enhancements) herein may be added to other confidential computing technology, for example, to AMD® Secure Encrypted Virtualization (e.g., SEV) (e.g., Secure Encrypted Virtualization-Encrypted State (SEV-ES) and/or SEV-Secure Nested Paging (SEV-SNP)) or ARM® Realm Management Extension (RME). In certain examples, the confidential computing technology (e.g., AMD® SEV) uses one key per virtual machine to isolate guests and the hypervisor from one another, for example, where the keys are managed by a trust domain manager (e.g., AMD Secure Processor). In certain examples, the confidential computing (e.g., SEV) requires enablement in the guest operating system and hypervisor. In certain examples, the guest changes allow the virtual machine to indicate which pages in memory should be encrypted. In certain examples, the hypervisor changes use hardware virtualization instructions and communication with the trust domain manager (e.g., AMD Secure processor) to manage the appropriate keys in the memory controller. In certain examples, the confidential computing technology (e.g., ARM® Confidential Compute Architecture (ARM® CCA)) enables the construction of protected execution environments called realms, for example, where realms allow lower-privileged software, such as an application or a virtual machine, to protect its content and execution from attacks by higher-privileged software, such as an OS or a hypervisor.

Turning now to FIG. 1, an example system architecture is depicted. FIG. 1 illustrates a block diagram of a computer system 100 including 102-0 to 102-N (e.g., where Nis any positive integer greater than one, although single core examples may also be utilized) having a trust domain manager 101-0 to 101-N, a memory 108 (e.g., a system memory separate from a processor and/or core memory), an input/output memory management unit (IOMMU) 120 (e.g., circuit), and an input/output (IO) device 106 according to examples of the disclosure.

In certain examples, each core includes (e.g., or logical includes) a set of registers, e.g., registers 103-0 for core 102-0, registers 103-N for core 102-N, etc. Registers 103 may be data registers and/or control registers, e.g., for each core (e.g., or each logical core of a plurality of logical cores of a physical core).

In certain examples, a processor (e.g., processor core 102) is to implement a trust domain manager 101. In certain examples, trust domain manager (TDM) code is a processor (e.g., CPU) attested software module that implements the functions to build, tear down, and start execution of trust domains. In certain examples, a processor (e.g., processor core 102) is to implement a trust domain manager to manage one or more virtual machines as a respective trust domain isolated from a virtual machine monitor (e.g., hosting VMM) and/or service O.S. environments.

In certain examples, IO device 106 includes one or more accelerators (e.g., accelerator circuits 106-0 to 106-N (e.g., where N is any positive integer greater than one, although single accelerator circuit examples may also be utilized)).

Although the example shown in FIG. 1 of the device 106 is an accelerator, it should be understood that other devices (e.g., non-accelerator devices) can utilized the examples disclosed herein. In the depicted example, a (e.g., each) accelerator circuit 106-0 to 106-N includes a decompressor circuit 124 to perform decompression operations, a compressor circuit 128 to perform compression operations, and a direct memory access (DMA) circuit 122, e.g., to connect to memory 108 and/or internal memory (e.g., cache) of a core. In one example, compressor circuit 128 is (e.g., dynamically) shared by two or more of the accelerator circuits 106-0 to 106-N. In certain examples, the data for a job that is assigned to a particular accelerator circuit (e.g., accelerator circuit 106-0) is streamed in by DMA circuit 122, for example, as primary and/or secondary input. Multiplexers 126 and 132 may be utilized to route data for a particular operation. Optionally, a (e.g., Structured Query Language (SQL)) filter engine 130 may be included, for example, to perform a filtering query (e.g., for a search term input on the secondary data input) on input data, e.g., on decompressed data output from decompressor circuit 124. Device 106 may include a local memory 134, e.g., shared by a plurality of accelerator circuits 106-0 to 106-N. Computer system 100 may couple to a hard drive, e.g., storage unit 2028 in FIG. 20.

Memory 108 may include operating system (OS) and/or virtual machine monitor code 110, user (e.g., program) code 112, non-trust domain memory 114 (e.g., pages), trust domain memory 116 (e.g., pages), uncompressed data (e.g., pages), compressed data (e.g., pages), or any combination thereof. In certain examples of computing, a virtual machine (VM) is an emulation of a computer system. In certain examples, VMs are based on a specific computer architecture and provide the functionality of an underlying physical computer system. Their implementations may involve specialized hardware, firmware, software, or a combination. In certain examples, the virtual machine monitor (VMM) (also known as a hypervisor) is a software program that, when executed, enables the creation, management, and governance of VM instances and manages the operation of a virtualized environment on top of a physical host machine. A VMM is the primary software behind virtualization environments and implementations in certain examples. When installed over a host machine (e.g., processor) in certain examples, a VMM facilitates the creation of VMs, e.g., each with separate operating systems (OS) and applications. The VMM may manage the backend operation of these VMs by allocating the necessary computing, memory, storage, and other input/output (IO) resources, such as, but not limited to, an input/output memory management unit (IOMMU). The VMM may provide a centralized interface for managing the entire operation, status, and availability of VMs that are installed over a single host machine or spread across different and interconnected hosts.

Memory 108 may be memory separate from a core and/or device 106. Memory 108 may be DRAM. Compressed data may be stored in a first memory device (e.g., far memory 146) and/or uncompressed data may be stored in a separate, second memory device (e.g., as near memory).

A coupling (e.g., input/output (IO) fabric interface 104) may be included to allow communication between device 106, core(s) 102-0 to 102-N, memory 108, etc.

In certain examples, the hardware initialization manager (non-transitory) storage 118 stores hardware initialization manager firmware (e.g., or software). In one example, the hardware initialization manager (non-transitory) storage 118 stores Basic Input/Output System (BIOS) firmware. In another example, the hardware initialization manager (non-transitory) storage 118 stores Unified Extensible Firmware Interface (UEFI) firmware. In certain examples (e.g., triggered by the power-on or reboot of a processor), computer system 100 (e.g., core 102-0) executes the hardware initialization manager firmware (e.g., or software) stored in hardware initialization manager (non-transitory) storage 118 to initialize the system 100 for operation, for example, to begin executing an operating system (OS) and/or initialize and test the (e.g., hardware) components of system 100.

In certain examples, computer system 100 includes an input/output memory management unit (IOMMU) 120 (e.g., circuitry), e.g., coupled between one or more cores 102-0 to 102-N and IO fabric interface 104. In certain examples, IOMMU 120 provides address translation, for example, from a virtual address to a physical address. In certain examples, a device 106 has a mode for support of shared virtual memory, whereby virtual addresses are specified in a descriptor, and the hardware translates these into physical addresses using address translation services of the IOMMU 120. In certain examples, IOMMU 120 includes one or more registers 121, for example, data registers and/or control registers.

A device 106 may include any of the depicted components. For example, with one or more instances of an accelerator circuit 106-0 to 106-N. In certain examples, a job (e.g., corresponding descriptor for that job) is submitted to the device 106 and the device to performs one or more (e.g., decompression or compression) operations. In certain examples, device 106 includes a local memory 134. In certain examples, device 106 is a TEE IO capable device, for example, with the host (e.g., processor including one of more of cores 102-0 to 102-N) being a TEE capable host. In certain examples, a TEE capable host implements a TEE security manager.

In certain examples, a trusted execution environment (TEE) security manager (e.g., implemented by a trust domain manager 101) is to: provide interfaces to the VMM to assign memory, processor, and other resources to trust domains (e.g., trusted virtual machines), (ii) implements the security mechanisms and access controls (e.g., IOMMU translation tables, etc.) to protect confidentiality and integrity of the trust domains (e.g., trusted virtual machines) data and execution state in the host from entities not in the trusted computing base of the trust domains (e.g., trusted virtual machines), (iii) uses a protocol to manage the security state of the trusted device interface (TDI) to be used by the trust domains (e.g., trusted virtual machines), (iv) establishing/managing IDE encryption keys for the host, and, if needed, scheduling key refreshes. TSM programs the IDE encryption keys into the host root ports and communicates with the DSM to configure integrity and data encryption (IDE) encryption keys in the device, (v) or any single or combination thereof.

In certain examples, a device security manager (DSM) 136 is to (i) support authentication of device identities and measurement reporting, (ii) configure the IDE encryption keys in the device (e.g., where the TSM provide the keys for the initial configuration and subsequent key refreshes to the DSM), (iii) provide device interface management for locking TDI configuration, reporting TDI configurations, attaching, and detaching TDIs to trust domains (e.g., trusted virtual machines), (iv) implements access control and security mechanisms to isolate trust domain (e.g., trusted virtual machine) provided data from entities not in the TCB of a trust domain (e.g., a trusted virtual machine), (v) or any single or combination thereof. In certain examples, device security manager (DSM) 136 includes a set of one or more registers 137 (e.g., control and status registers), e.g., as discussed in reference to FIGS. 4-11.

In certain examples, a standard defines a virtual machine monitor (VMM) (e.g., or VM thereof), TSM (e.g., trust domain manager 101), and device security manager (DSM) 136 interaction flow.

In certain examples, IOMMU 120 and trust domain manager(s) 101 cooperate to allow for direct memory access (e.g., directly) between (e.g., to and/or from) IO device(s) 106 and trust domain memory 116 (e.g., a region for only a single trust domain and/or another region shared by a plurality of trust domains).

In order to establish the trust relationship between a device and a TD, certain TDX-IO architectures require the TD and/or a trust domain manager (e.g., circuit and/or code) (e.g., Trusted Execution Environment (TEE) security manager (TSM)) to create a secure communication session between the device and the trust domain manger (e.g., for the trust domain manger to allow a particular trust domain to use the device or a subset of function(s) of the device). In order to establish the trust relationship between a device and a TD, certain TDX-IO architectures require the TD and/or a trust domain manager (e.g., circuit and/or code) (e.g., Trusted Execution Environment (TEE) security manager (TSM)) use (i) a Distributed Management Task Force (DMTF) Secure Protocol and Data Model (SPDM) standard to authenticate the device (e.g., and collect device measurement), and (ii) use a Peripheral Component Interconnect Special Interest Group (PCI-SIG) TEE Device Interface Security Protocol (TDISP) standard (e.g., to communicate with a device security manager (DSM) to manage the device's virtual function(s)).

In certain examples, a SPDM messaging protocol defines a request-response messaging model between two endpoints to perform the message exchanges outlined in SPDM message exchanges, for example, where each SPDM request message shall be responded to with an SPDM response message as defined in the SPDM specification. In certain examples, a TDISP messaging protocol defines a request-response messaging model between two endpoints to perform the message exchanges outlined in TDISP message exchanges, for example, where each TDISP request message shall be responded to with an TDISP response message as defined in the TDISP specification. In certain examples, an endpoint's (e.g., device's) "measurement" describes the process of calculating the cryptographic hash value of a piece of firmware/software or configuration data and tying the cryptographic hash value with the endpoint identity through the use of digital signatures. This allows an authentication initiator to establish that the identity and measurement of the firmware/software or configuration running on the endpoint.

In certain examples, a security controller circuit 138 is included, e.g., to control set-up of device 106.

In certain examples, to help enforce the security policies for the TDs, a new mode of a processor called Secure-Arbitration Mode (SEAM) is introduced to host an (e.g., manufacturer provided) digitally signed, but not encrypted, security-services module (e.g., trust domain manager code). In certain examples, a trust domain manager (TDM) 101 executes out of a reserved, memory space identified by a SEAM-range register (SEAMRR). In certain examples, the processor only allows access to SEAM-memory range to software executing inside the SEAM-memory range, and all other software accesses and direct-memory access (DMA) from devices to this memory range are aborted. In certain examples, a SEAM module does not have any memory-access privileges to other protected, memory regions in the platform, including the System-Management Mode (SMM) memory or (e.g., Intel® Software Guard Extensions (SGX)) protected memory.

Figure 2:
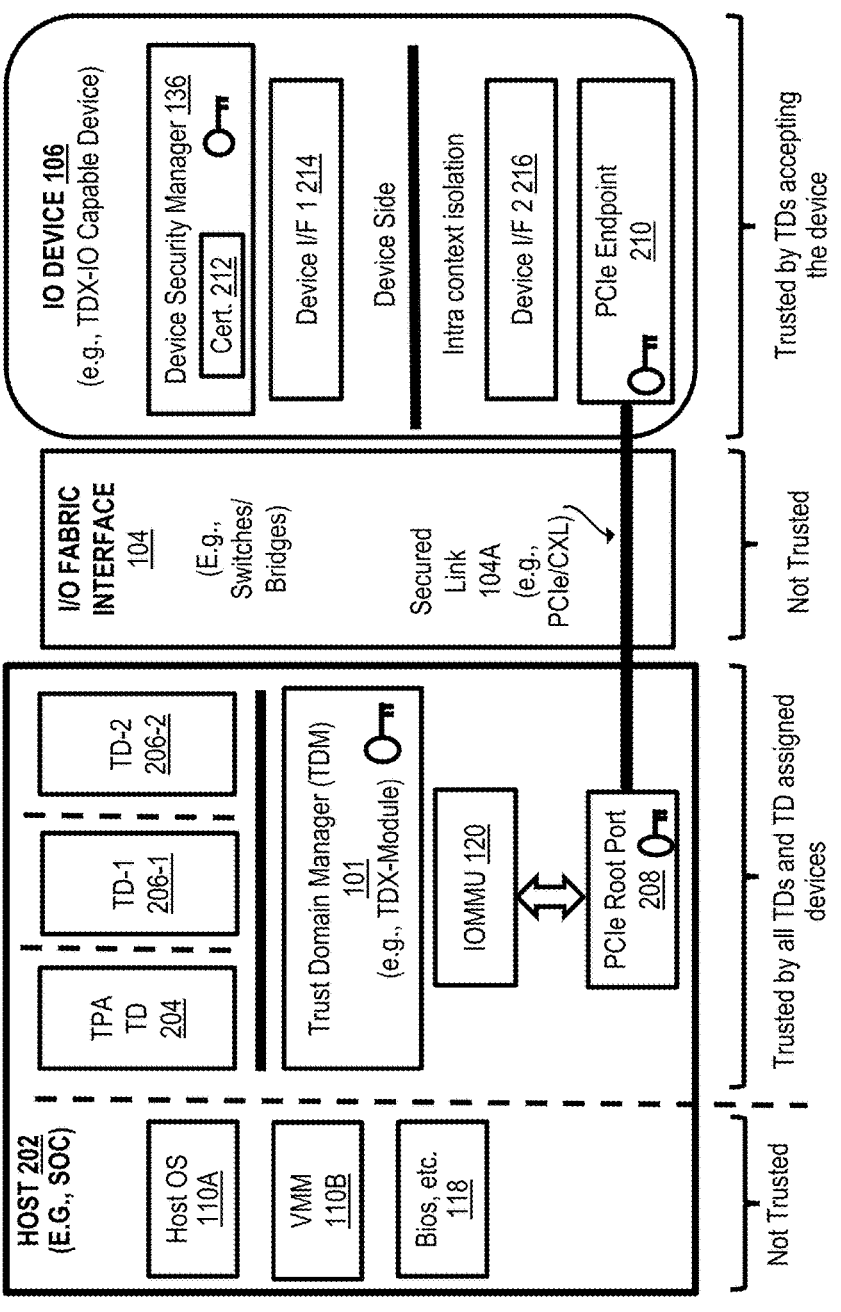
FIG. 2 illustrates a functional diagram of a host coupled to a discrete IO device according to examples of the disclosure.

FIG. 2 illustrates a functional diagram of a host 202 (e.g., one or more of processor cores 102 in FIG. 1) coupled to an (e.g., discrete, and not integrated) IO device 106 (e.g., TDX-IO capable device) according to examples of the disclosure (e.g., forming a system 200). In certain examples, host 202 implements a TDX-IO provisioning agent (TPA) 204 of trust domains, and a plurality of trust domains, shown as trust domain "1" 206-1 and trust domain "2" 206-2, although any single or plurality of trust domains may be implemented. In certain examples, host 202 includes a trust domain manager 101 to manage the trust domains (for example, with the vertical dashed lines indicating isolation therebetween the trust domains, e.g., and host OS 110A implemented by host 202 during operation, VMM 110B implemented by host 202 during operation, and BIOS, etc. 118). In certain examples, the virtual machine monitor 110B manages (e.g., generates) one or more virtual machines, e.g., with the trust domain manager 101 isolating a first virtual machine as a first trust domain from a second (or more) virtual machine and second (or more) trust domain(s). In certain examples, the host 202 includes a (e.g., PCIe) root port 208 having a key(s) (shown symbolically) to allow secure communications with the IO device 106, e.g., with the (e.g., PCIe) endpoint 210 thereof (e.g., also having the key(s) (shown symbolically)). In certain examples, the trust domain manager 101 and device security manager 136 are also to have a key(s), e.g., representing a memory protection key(s) and a secure session key(s), respectively.

In certain examples, the host 202 is coupled to device 106 via a coupling 104, e.g., via a secured link 104A (e.g., a link according to a PCIe/Compute Express Link (CXL) standard).

In certain examples, the host 202 is coupled to device 106 according to a transport level (e.g., SPDM) specification and/or an application level (e.g., TDISP) specification. In certain examples, device 106 includes a device security manager (DSM) 136 with a device secret(s), e.g., device certificate 212, session key, device "measurement" values, etc. In certain examples, device 106 implements one or more physical function(s) and/or virtual function(s) and/or assign-able device interfaces (e.g., scalable IOV assignable device interfaces (ADIs)).

In certain examples, device 106 includes a first device interface (I/F) 214 on the device side, and one or more second device interface(s) 216, e.g., where the device 106 supports intra context isolation between these interfaces.

In certain examples, device 106 (e.g., according to a single-root input/output virtualization (SR-IOV) standard) is shared by a plurality of virtual machines (e.g., trust domains). In certain examples, a physical function has the ability to move data in and out of the device while virtual functions (for example, first virtual function and second virtual function, e.g., where the virtual functions are light-weight (e.g., PCI express (PCIe)) functions that support data flowing but also have a restricted set of configuration resources.

In certain examples, IO device 106 is to perform a direct memory access request to a private memory of a trust domain (e.g., trust domain 206-1 or trust domain 206-2) under the control of the IOMMU 120.

Certain processors (e.g., SoC) support trusted execution environments (TEE) (e.g., trust domain eXtensions (TDX)) that use architectural elements to help deploy hardware-isolated, virtual machines (VMs) called trust domains (TDs). In certain examples, TEE (e.g., TDX) is designed to isolate VMs from the virtual-machine manager (VMM)/hypervisor and any other non-TD software on the platform to protect TDs from a broad range of software. Certain TEE (e.g., TDX) support TEE-IO framework (e.g., shown in FIG. 2) that enables direct assignment of trusted device interfaces of (e.g., PCIe) discrete devices to TDs.

In certain examples, trust domain manager 101 (e.g., TEE security manager (TSM)) is a logical entity in a host that is the trusted computing base (TCB) for a trusted domain (e.g., trusted virtual machine) and enforces security policies on the host. In certain examples, the device security manager (DSM) 136 is a logical entity in the device that may be admitted into the TCB for a TD by the TSM and enforces security policies on the device.

In certain examples, the trust domain manager 101 (e.g., TEE security manager (TSM) (e.g. TDX-module): (i) provides interfaces to the VMM to assign memory, processor, and other resources to trust domains (e.g., trusted virtual machines), (ii) implements the security mechanisms and access controls (e.g., IOMMU translation tables, EPT tables, etc.) to protect confidentiality and integrity of the trust domains data and execution state in the host from entities not in the trusted computing base of the trust domains, (iii) uses a protocol to manage the security state of the trusted device interface (TDI) to be used by the trust domains, and (iv) establishes/manages IDE encryption keys for the host, and, if needed, scheduling key refreshes. In certain example, the trust domain manager (e.g., TSM) programs the IDE encryption keys into the host root ports and communicates with the DSM to configure integrity and data encryption (IDE) encryption keys in the device.

In certain examples, device security manager (DSM) 136 (i) supports authentication of device identities and measurement reporting, (ii) configuration of the IDE encryption keys in the device (e.g., where the trust domain manager (e.g., TSM) provide the keys for the initial configuration and subsequent key refreshes to the DSM), (iii) provides device interface management for locking TDI configuration, reporting TDI configurations, attaching, and detaching TDIs to trust domains, and (iv) implements access control and security mechanisms to isolate trust domain (e.g., trusted virtual machine) provided data from entities not in the TCB of a trust domain.

In order to establish the trust relationship between the device and TD, in certain examples, a TEE-IO architecture requires that the TD and/or trust domain manager (e.g., TSM) uses the DMTF Secure Protocol and Data Model (SPDM) to authenticate the device & collect the device measurements and/or use PCI-SIG TEE Device Interface Security Protocol (TDISP) to manage the trusted device interfaces.

In certain examples, the trust domain manager 101 is trusted by each trust domain, e.g., but a trust domain does not trust another trust domain. In certain examples, each trust domain of a plurality of trust domains includes its own respective trust domain state and/or memory.

Figure 3:
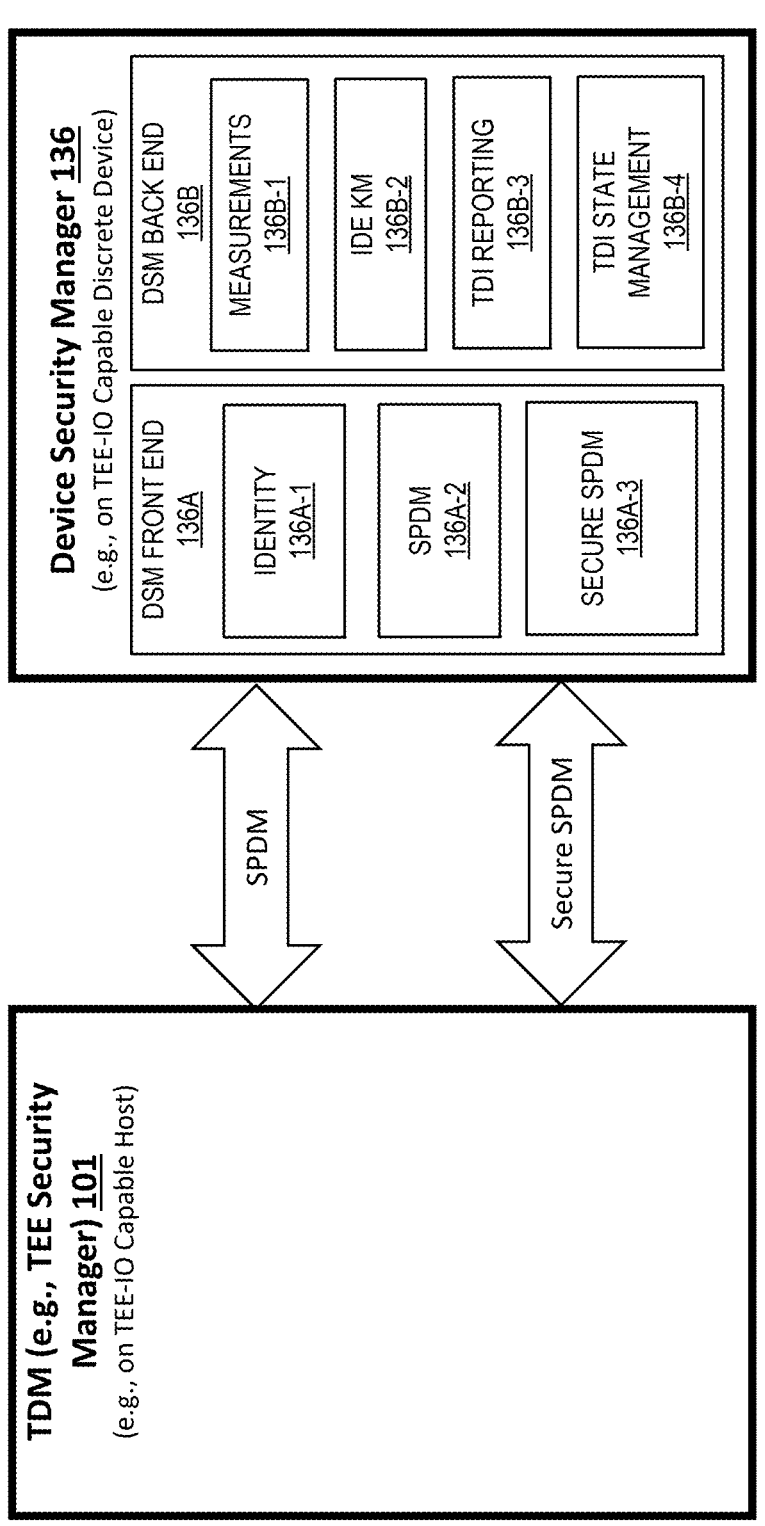
FIG. 3 illustrates a block diagram of a trust domain manager coupled to a device security manager and its components used for managing interactions between the trust domain manager and the device security manager for a discrete IO device according to examples of the disclosure.

FIG. 3 illustrates a block diagram of a trust domain manager 101 coupled to a device security manager 136 and its components used for managing interactions between the trust domain manager and the device security manager for a discrete IO device according to examples of the disclosure. In certain examples, depicted components in device security manager 136 allow for SPDM and secure SPDM (e.g., per Secured Messages using a SPDM specification) communications. In certain examples, device security manager (DSM) 136 includes a DSM front end 136A and a DSM back end 136B.

DSM front end 136A may include one or more (e.g., any combination of) identity 136A-1, SPDM 136A-2, and/or secure SPDM 136A-3. In certain examples, identity 136A-1 block is responsible to provide a unique device identity and to support device authentication. In some examples, identity 136A-1 block implements the Device Identifier Composition Engine (DICE) architecture specified by the Trusted Computing Group (TCG) and/or hosts the DICE certificate. In certain examples, SPDM 136A-2 block implements a Security Protocol and Data Model (SPDM) specification and/or supports authentication and provisioning of hardware identities, measurement reporting for firmware identities, and/or session key exchange protocols to enable confidentiality with integrity protected data communication and other related capabilities. In certain examples, secure SPDM 136A-3 block implements Secured Messages using a SPDM specification and/or supports encrypted and authenticated message exchanges over a secure session. In certain examples, secure SPDM session is utilized to securely program encryption keys on the device and/or to send/receive TDISP messages.

DSM back end 136B may include one or more (e.g., any combination of) measurements 136B-1, IDE key management (KM) 136B-2, TDI reporting 136B-3, and/or TDI state management 136B-4. In certain examples, measurements 136B-1 block manages the measurements for the device which are a representation of firmware and/or software identities or configuration data on an endpoint or the device state, debug mode, etc. In certain examples, IDE key management (KM) 136B-2 block manages the encryption keys and/or state associated with the Integrity & Data Encryption (IDE) session (e.g., link encryption session). In certain examples, TDI reporting 136B-3 block stores the information or configuration associated with the trusted device interface (TDI) and/or securely reports it when queried. In certain examples, TDI state management 136B-4 block manages the trusted device interface (TDI) state, life cycle and/or security properties.

In certain examples, SPDM specifies a method for managed device authentication, firmware measurement, and certificate management, e.g., where SPDM defines the formats for both request and response messages that enable the end-to-end security features among the platform-management components.

In certain examples, TEE-IO capable devices are required to: (i) implement DMTF SPDM 1.1 specification (or higher version such as, but not limited to, SPDM 1.2) for runtime authentication, firmware, and configuration measurement reporting, and session key negotiation, (ii) support PCIe TEE device interface security protocol (TDISP) to support assigning device interfaces to TDs, and/or (iii) support PCIe IDE extensions to provide confidentiality, integrity, and replay protection of protection of data transferred to/from the device.

In order to support device authentication using SPDM, in certain examples, the device will need to have a root-of-trust (RoT) for storage (RTS) to access the device secrets, such as, but not limited to, a private key, a root-of-trust for measurement (RTM) to record the device measurement, and/or a root-of-trust for reporting (RTR) to report the SPDM measurement. In certain examples, the device will also need storage space for the SPDM certificate chain. In order to support IDE key-management and trusted-device interface reporting/management using Secure-SPDM, in certain examples, the device will need to build a cryptographic engine to be able to encrypt/decrypt messages and a message creator/parser. Certain devices (e.g., Graphics Processing Unit (GPU), Infrastructure Processing Unit (IPU), etc.) implement this protocol functionality through a firmware running on a dedicated micro-controller.

Certain processors (e.g., SoCs) are to add TDX-IO support to an integrated accelerator(s) (e.g., DSA, IAA, QAT accelerator) into a SoC. Since certain integrated devices are (i) in a large quantity (e.g., 16 or more devices per SoC), (ii) built mainly based on the non-programmable/hardened (e.g., RTL/VHDL) logic, and (iii) relatively compact data-processing engines with a small die area, expecting each of these devices to implement SPDM & Secure-SPDM (e.g., crypto, certificates, private/public key storage, message processors, etc.) is not feasible from the hardware cost and complexity perspective.

Examples herein provide a (e.g., lite-weight) device security manager architecture (e.g., "DSM-Lite") which significantly reduces the hardware cost/complexity while maintaining the security and functional properties as in a traditional DSM discussed above (e.g., in reference to FIG. 3).

Figure 4:
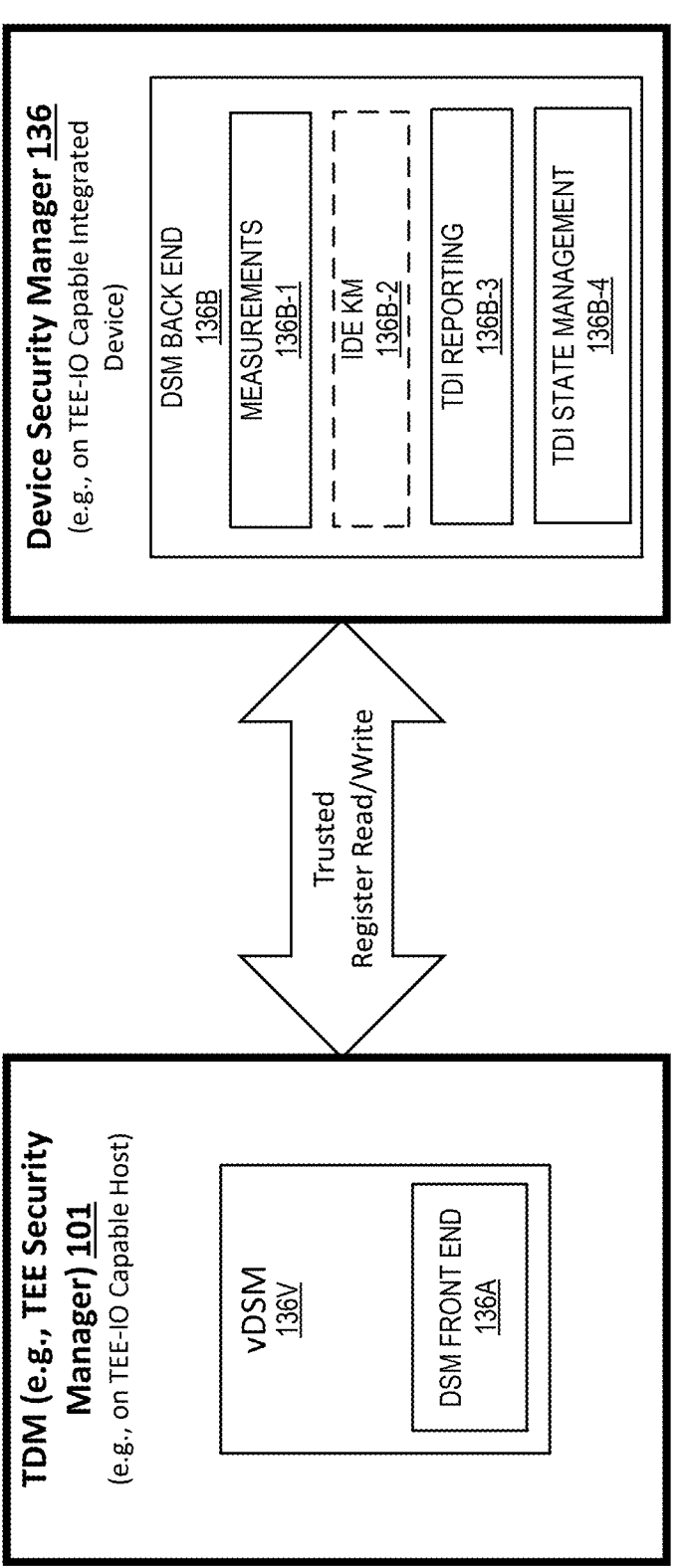
FIG. 4 illustrates a block diagram of a trust domain manager coupled to a device security manager and its components used for managing interactions between the trust domain manager and the device security manager for an integrated IO device according to examples of the disclosure.

FIG. 4 illustrates a block diagram of a trust domain manager 101 coupled to a device security manager 136 (e.g., DSM-Lite) and its components used for managing interactions between the trust domain manager and the device security manager for an integrated IO device according to examples of the disclosure. In certain examples, measurements, TDI reporting, and TDI state management are in a set of one or more registers of device security manager 136. In certain examples, the DSM front end 136A resides in the trust domain manager 101 (e.g., instead of the DSM front end 136A residing in the device security manager 136), e.g., while leaving the DSM back end 136B residing within the device security manager 136. In certain examples (e.g., because the device is an integrated device of a host (e.g., SoC)), the DSM back end 136B does not include IDE key management (KM) 136B-2 block. In certain examples, implementing the DSM front end 136A in the trust domain manager 101 (e.g., instead of the DSM front end 136A being in the device security manager 136) as a virtual DSM 136V (e.g., virtual DSM front end) significantly reduces the hardware cost/complexity for each device (and thus each corresponding device security manager 136), e.g., while leaving the DSM back end 136B within the device security manager 136. Turning again to FIG. 1, a virtual DSM 136V (e.g., virtual DSM front end) allows for certain DSM circuitry (and thus certain DSM functionality) to be implemented external from the IO device 106, for example, where there are a plurality of IO devices 106 but one virtual DSM 136V (e.g., virtual DSM front end) to perform certain DSM functionality. In certain examples, virtual DSM (vDSM) 136V is implemented as (i) part of a TDM 101, (ii) part of an architectural trust domain (TD) (e.g., as an extension of TDM), and/or (iii) as part of a security controller (e.g., security controller circuit 138) (e.g., security co-processor (e.g., secure startup service module (S3M))). In certain examples, the DSM front end 136A (e.g., implemented as vDSM 136V) and DSM back end 136B in the device communicate through (e.g., trusted) register reads and writes.

In certain examples, the device interface (e.g., TDI) state is selectable between: (i) an unlocked state (e.g., as a default state of the device), (ii) a locked state to prevent changes to be made to the device interface, (iii) an operational (e.g., run) state to enable access to device registers of the device (e.g., by the trusted VM (e.g., TD) or direct memory access (DMA) from the device to memory address spaces of the trusted VM (e.g., TD)), and/or (iv) an error state to indicate an error has happened.

Section 1 #Technique to Verify Integrated Device Identity

In certain examples, since the integrated devices are part of the SoC, device identity information is provided to the trust domain manager 101 (e.g., TSM) securely through a platform component, e.g., MCHECK of a processor.

In certain examples, execution of MCHECK is to: (i) establish that the central processing unit (CPU) configuration is properly set, (ii) perform platform-specific (e.g., trust domain extensions (TDX)) initialization operations, (iii) program keys into the memory encryption engines designed to protect the memory coupled with the processor, (iv) program per-boot link keys into the (e.g., CPU) interconnect encryption engines designed to protect protected (e.g., TDX related) memory coherency traffic, (v) verify configuration of integrated devices and associated platform and/or IO address decoders, and/or (vi) pass TDX-IO capable integrated device related information to the trust domain manager (e.g., TDX-module) via a memory page in the protected memory range.

In certain examples, BIOS (or UEFI) will publish TDX-IO capable integrated devices on the platform through an ACPI table (e.g., direct memory access (DMA) remapping (DMAR) table).

In certain examples, MCHECK will validate the BIOS (or UEFI) reported integrated devices and securely pass the information about them (e.g., bus/device/function number, socket number etc.) to the trust domain manager 101 (e.g., TSM) to help it differentiate these integrated devices from other devices connected to the platform (e.g., the discrete devices from the integrated devices supporting the TDX-IO capabilities).

Section 2 #Technique for Authenticating Integrated Device

In certain examples, since the integrated devices are part of the SoC, trust domain manager 101 (e.g., TSM) supports the device authentication for them through a platform-based attestation.

In certain examples, before the trusted device interface of an integrated device can be assigned to a TD, VMM will register the TDX-IO capable integrated device with the trust domain manager 101 (e.g., TSM) (e.g., TDX-module). In certain examples, trust domain manager 101 (e.g., TSM) will compare the VMM provided information against the MCHECK-passed information to help validate that the registered device is indeed a TDX-IO capable integrated device. In certain examples, the trust domain manager 101 (e.g., TSM) will then transition the integrated device into TEE mode (e.g., TDX mode).

In certain examples, during the trusted device interface assignment to a TD, TD will request the device authentication for integrated device via VMM. In certain examples, the VMM is to invoke the trust domain manager 101 (e.g., TSM) (e.g., TDX-module) to acquire the device-attestation report for the integrated device.

In certain examples, the TD is to generate hash of the report and ask the trust domain manager 101 (e.g., TSM) (e.g., TDX-module) to validate the hash against the hash of the original report, e.g., such that this check ensures that even though the report was passed through untrusted channel (such as VMM), the TD can verify the authenticity of the report. In certain examples, the TD is to validate the report to help authenticate the device. In one example, the TD will use a local database to validate the attestation report and in a second example, it may invoke an attestation service.

Section 3 #Technique for Acquiring Device Measurements

In certain examples, since the integrated devices are part of the SoC, the integrated device is to expose the device measurements through a set of registers and for the trust domain manager 101 (e.g., TSM) (e.g., TDX-module) to use platform-specific components to read these registers to acquire the device measurements.

In one example, trust domain manager 101 (e.g., TSM) (e.g., TDX-module) reads one or more registers (e.g., control and status registers (CSRs)) of the device to acquire the measurements and embeds it as part of the device-attestation report.

In a second example, trust domain manager 101 (e.g., TSM) (e.g., TDX-module) runs an architectural trust domain (e.g., virtual Device Security Manager (vDSM) TD) that reads one or more of these registers to acquire the measurements and records them with the trust domain manager 101 (e.g., TSM) (e.g., TDX-module).

In a third example, trust domain manager 101 (e.g., TSM) (e.g., TDX-module) asks the security co-processor (e.g., secure startup service module (S3M)) that in-turn reads these registers and returns the device measurements to the trust domain manager 101 (e.g., TSM) (e.g., TDX-module).

In certain examples, the measurements of the proxy-agent(s) (e.g., TDX-module and/or vDSM TD and/or S3M) are also reported to the TD along with the measurements acquired from the device in the integrated device-attestation report to ensure that TD has an opportunity to validate the authenticity of the proxy-agent/s along with the actual device measurements.

Section 4 #Device Interface State Management

In order to support trusted device interface (TDI) assignment to TDs, in certain examples, the device is expected to build a device interface state management protocol for locking TDI configuration, reporting TDI configurations, and transitioning TDIs through various architectural states. In certain devices, these operations are accomplished by trust domain manager 101 (e.g., TSM) via sending a secure message to DSM, DSM operating on the message, and finally generating a secure message-response which is then later processed by the TSM (as shown in the FIG. 5 below).

Figure 5:
FIG. 5 illustrates a block diagram of a trust domain manager communicating with a device security manager with encrypted messages according to examples of the disclosure.

FIG. 5 illustrates a block diagram of a trust domain manager 101 communicating with a device security manager 136 with encrypted messages according to examples of the disclosure.

However, as certain devices may not implement encrypted messages, e.g., secure SPDM formatted messages (e.g., TDISP messages) (e.g., and thus not include/build cryptographic engines and/or message processors on the integrated devices), examples herein propose alternative mechanisms to achieve similar functionality and secure communication between TSM (e.g., vDSM) and the disclosed DSM (e.g., DSM-Lite). Examples herein are directed to an integrated device that exposes TDI configuration and TDI states through a set of registers. In certain examples, state transitions which were triggered by TSM through sending a secure message can now be triggered via (e.g., MMIO) register reads/writes. In certain examples, any untrusted entity is not to trigger these state transitions, and thus a device includes the ability to protect and secure these registers.

Figure 6:
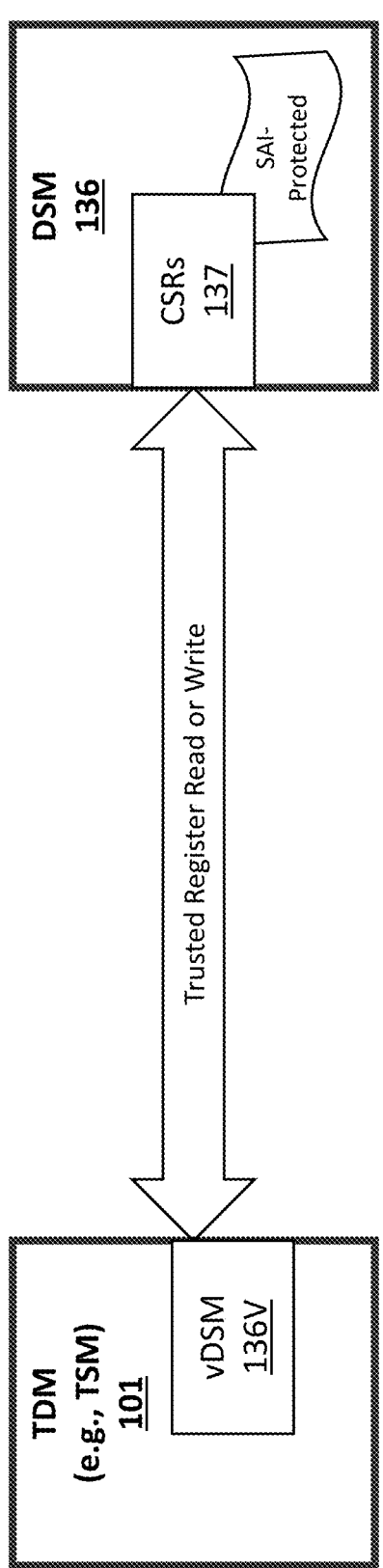
FIG. 6 illustrates a block diagram of a trust domain manager communicating with a device security manager with trusted (e.g., and unencrypted) messages via a set of one or more control and status registers (CSRs) according to examples of the disclosure.

In a first example, the integrated device implements a Security Attribute of the Initiator (SAI) policy on these registers (e.g., as shown in FIG. 6). In certain examples, once the integrated device transitions to a protected trust domain mode (e.g., TDX-mode), access to these registers is allowed with only SEAM-SAI policy group (e.g., ensuring that only the trust domain manager 101 (e.g., TSM) (e.g., TDX-module) can read/write these registers and/or the access is prohibited from any other untrusted entities including OS/VMM).

FIG. 6 illustrates a block diagram of a trust domain manager 101 (e.g., vDSM 136V as part of the trust domain manager) communicating with a device security manager 136 with trusted (e.g., and unencrypted) messages via a set of one or more control and status registers (CSRs) 137 according to examples of the disclosure.

Figure 7:
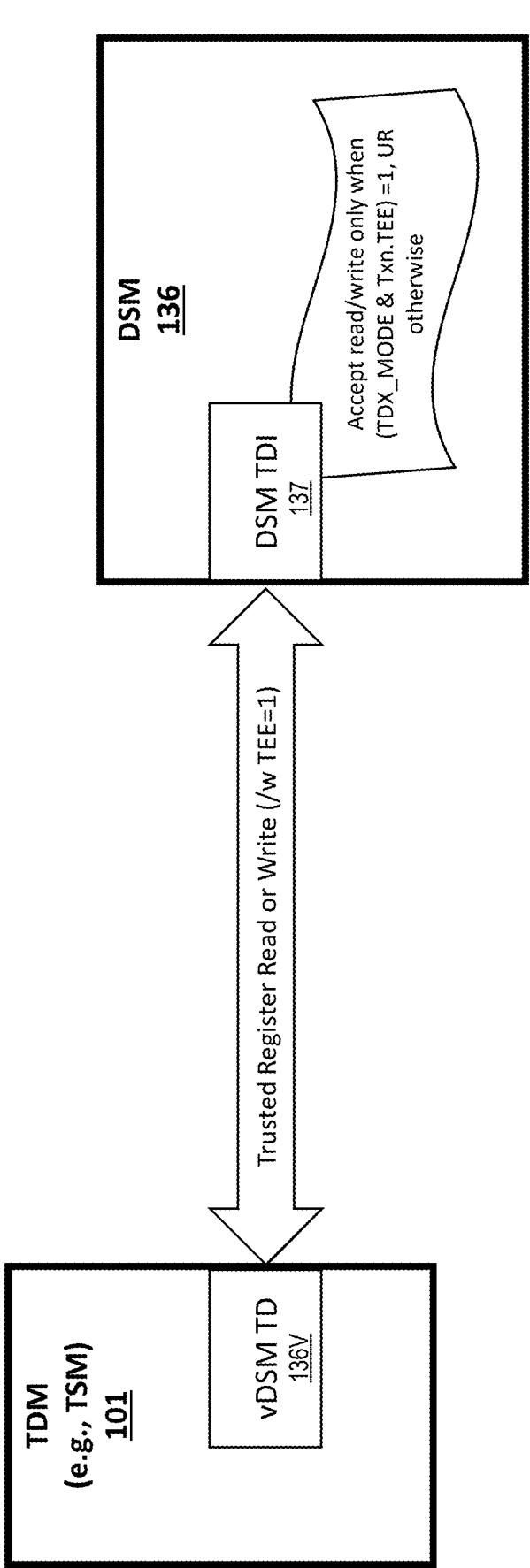
FIG. 7 illustrates a block diagram of a trust domain manager communicating with a device security manager with trusted (e.g., and unencrypted) messages via a set of one or more registers implemented as a special trusted device interface (e.g., device security manager (DSM) trusted device interface (TDI)) according to examples of the disclosure.

In a second example, the integrated device implements these registers 137 as a (e.g., special/control/management) trusted device interface (e.g., DSM TDI), which is then assigned to an architectural TD (e.g., vDSM TD) by the trust domain manager 101 (e.g., TSM) (e.g., TDX-module)—as shown in FIG. 7. In certain examples, the DSM TDI only accepts reads/writes when (i) the TDX-mode is enabled on the device and (ii) the incoming transaction was initiated by a trusted entity (e.g., comes with the TEE-bit/signal set as 1$b$, TEE attribute set as 1$b$, or eXtended TEE (XT) attribute set as 01$b$/11$b$), e.g., such that enforcement by DSM TDI ensures that only trusted transactions are accepted by the DSM-Lite and untrusted entities (such as VMM) cannot read/modify these registers (e.g., such attempts to read/modify are considered an unsupported request (UR)). In one example, TEE-signal is the is_tdx signal of the SoC fabric and in another example the TEE-signal is the ide_t signal of the IOSF-primary bus. In some examples, TEE attribute is T bit from the IDE (Integrity & Data Encryption) transaction layer packet (TLP) or Orthogonal Header Content—C (OHC-C). In some examples, eXtended TEE (XT) attribute are XT bits from the IDE TLP or OHC-C.

In certain examples, a control (e.g., TDX_MODE) register is included (e.g., in the integrated device) for securely transitioning it in and out of trust domain (e.g., tdx_mode) operation.

FIG. 7 illustrates a block diagram of a trust domain manager 101 (e.g., vDSM trust domain (TD) 136V implemented by the trust domain manager) communicating with a device security manager 136 with trusted (e.g., and unencrypted) messages via a set of one or more registers 137 implemented as a special trusted device interface (e.g., DSM TDI) according to examples of the disclosure.

In certain examples, DSM TDI will accept the transaction if TDX_MODE is enabled on the device & TEE-bit is set on the transaction and will reject the transaction and generate an unsupported request (UR) indicated (e.g., writes are dropped and reads return all exceptions (e.g., "FFs)) otherwise. In some examples, DSM TDI will also log and report an error along with generating an unsupported request (UR) indication.

In certain examples, since the device checks to make sure that the transaction was initiated by a TD (e.g., has TEE-bit set), VMM can potentially access these registers by colluding with a malicious TD. Certain examples herein protect against this vulnerability by ensuring that TDX-module allows mapping these registers to vDSM TD and no other TD-thereby providing assurance that these registers can only be accessed by TDX-module itself or by a trusted delegate of it such as the vDSM TD.

In certain examples, these integrated devices are PCIe devices, so a VMM may re-configure the device base address registers (BARs) to re-locate DSM registers-making it difficult for TDX-module to provide the assurance that DSM registers are mapped to only vDSM TD and not any other TD. Certain examples protect against this attack with the use of TDX-mode. In certain examples, the integrated device should (i) implement a register to enable/disable TDX-mode in an SAI-protected region, (ii) monitor BAR re-configuration or any other operations (e.g., function level reset) that impact the security properties of DSM TDI, and/or (iii) reset TDX-mode setting if any such events are detected. In certain examples, protecting TDX-mode setting with SAI ensures that only TDX-module can re-enable TDX-mode once it is reset and evaluating current value of TDX-mode before accepting a trusted transaction ensures that VMM cannot collude with another TD to create the attack stated above.

In certain examples, if VMM needs to re-configure the BAR or reset an integrated device, it should first de-register the device with TDX-module which ensures that all connections associated with the integrated device are teardown and then securely move the integrated device out of TDX-mode. In certain examples, once the required configuration is done, VMM should re-register the integrated device with the TDX-module at which point TDX-module will re-enable the TDX-mode and the trusted device interfaces built on this integrated device will now be ready to be assigned to the trust domains.

In certain examples, vDSM TD approach helps make the TDX-module lightweight (e.g., like a micro-kernel) and moves device-specific functionality into an architectural trust domain. In certain examples, vDSM TD also makes the overall architecture modular, allowing Cloud Service Providers (CSPs) to load/unload this architectural TD if they plan/not-plan to use the integrated device for the trusted-IO. In certain examples, vDSM is implemented as (i) part of a TEE-IO device, (ii) part of TDM, (iii) part of an architectural trust domain (TD) (e.g., as an extension of TDM), and/or (iv) as part of a security controller (e.g., security controller circuit) (e.g., security co-processor (e.g., secure startup service module (S3M))).

Section 5 #Link Encryption

In certain examples, since the integrated devices are part of the SoC, this removes the need for them to build an integrity and data protection (IDE) engine for supporting link encryption (e.g., integrated devices do not need IDE support or corresponding basic-building blocks). In certain examples, since link encryption is not required/supported by the integrated device, this relaxes the need for DSM to support IDE key-management block and corresponding message processing.

Example SoC with Integrated Device

Figure 8:
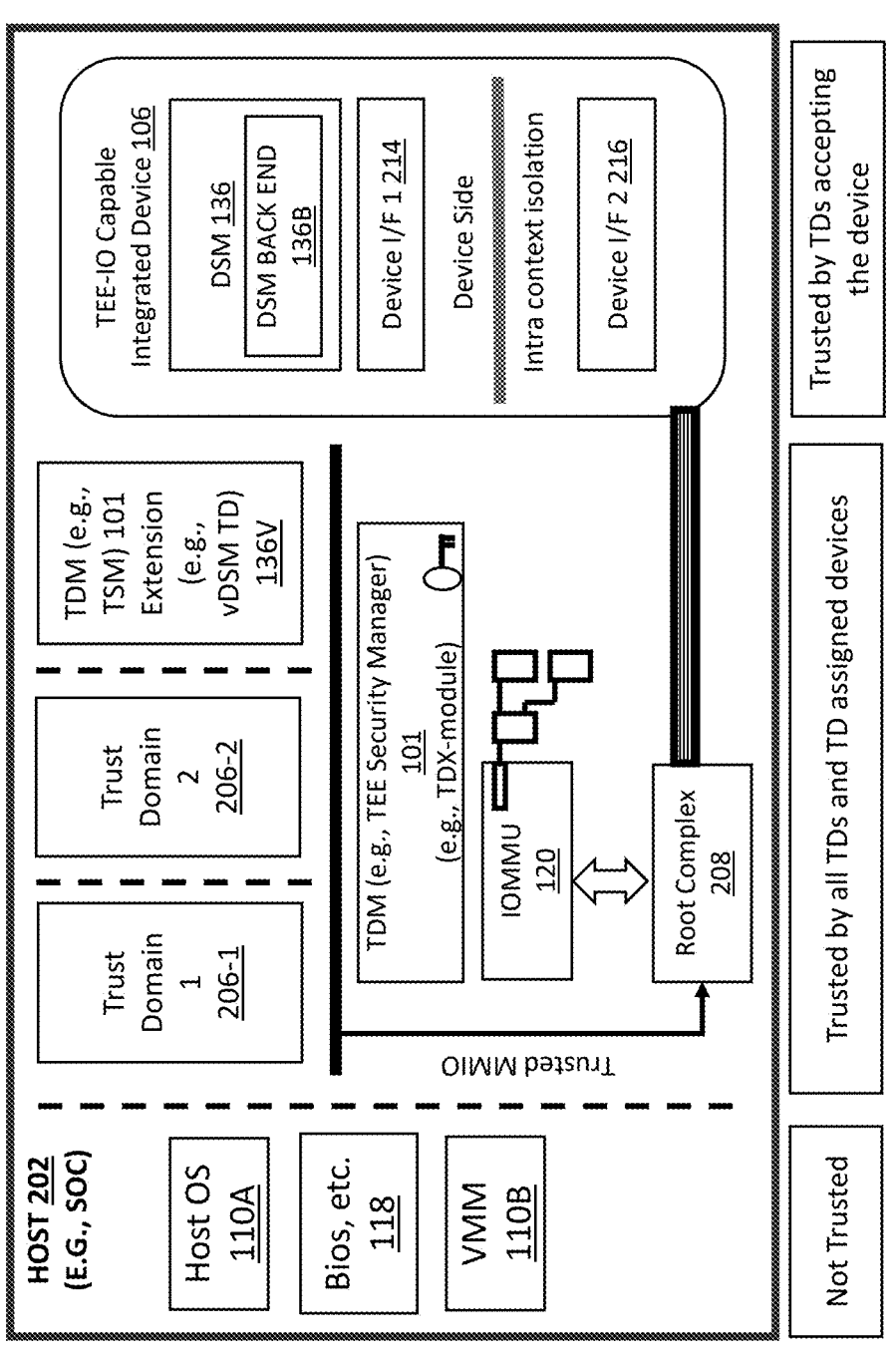
FIG. 8 illustrates a functional diagram of a host coupled to an integrated IO device according to examples of the disclosure.

FIG. 8 illustrates a functional diagram of a host coupled to an integrated IO device 106 according to examples of the disclosure. FIG. 8 shows a TEE-IO framework for SoC integrated devices. In certain examples, this trust domain manager 101 (e.g., TSM) (e.g., TDX-module) has the same responsibilities as discussed in reference to FIG. 2. Additionally or alternatively, in certain examples, trust domain manager 101 (e.g., TSM) (e.g., TDX-module) is responsible for (i) allowing registration of integrated devices and enable TDX-mode on them upon successful validation against the (e.g., MCHECK) provided information, (ii) providing secure communication between TSM-extension (e.g. vDSM TD) and DSM 136 (e.g., DSM-Lite) on the device, and/or (iii) ensuring all TDIs have been detached and vDSM connection has been teardown before allowing VMM to de-register an integrated device.

In certain examples, device security manager 136 on integrated device (DSM-Lite) only implements a proper sub-set of capabilities when compared with the capabilities stated in reference to FIG. 2. In certain examples, DSM 136 (e.g., DSM-Lite) in FIGS. 6-8 (*i*) supports a capability to move the integrated device 106 in/out of TDX-mode (e.g. via TDX-IO DVSEC in configuration space of the integrated device which is exposing an SAI-protected register), (ii) implements a management device interface management TDI (e.g. DSM TDI) for locking TDI configuration, reporting TDI configurations, attaching, and detaching TDIs to trust domains, and/or (iii) implements access control and security mechanisms to isolate trust domain (e.g., trusted virtual machine) provided data from entities not in the TCB of a trust domain. In some examples, the location of DSM TDI is also reported to system software via TDX-IO DVSEC. In comparison to FIG. 2, in certain examples the host (e.g., SoC) 202 in FIG. 8 includes a vDSM 136V (e.g., shown as part of an architectural trust domain (TD), but not so limited). For examples, the vDSM 136V may be implemented as (i) part of TDM 101.

Figure 9A:
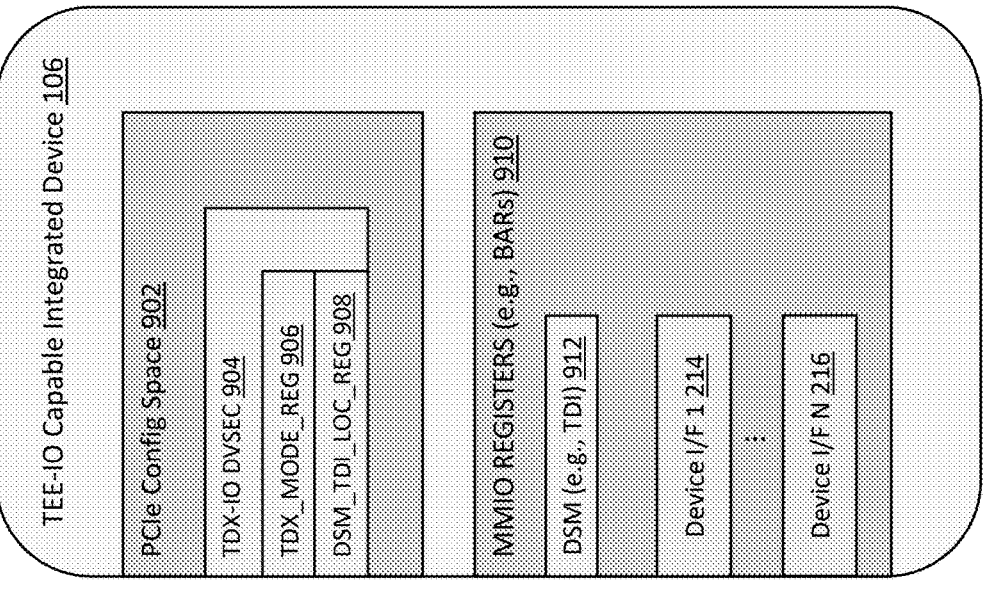
FIG. 9A illustrates a block diagram of the configuration space and registers of an integrated IO device according to examples of the disclosure.

FIG. 9A illustrates a block diagram of the configuration space and registers of an integrated IO device 106 according to examples of the disclosure. FIG. 9A shows an example of TDX-IO capable integrated device 106 with a DSM-Lite implementation. In some examples, TDX-IO capable integrated device 106 implements a TDX-IO designated vendor-specific extended capability (DVSEC) 904, e.g., via one or more registers (e.g., as shown in FIGS. 9B-9C) in the PCIe configuration space 902. In certain examples, a TDM enables or disables TDX mode by modifying the value of "TDX Mode Enable" field in the TDX-IO control register 906 in the DVSEC 904. In certain examples, a TDM discovers the location of DSM register(s) 912 (e.g., as an interface to an instance of DSM 136 (e.g., DSM back end 136B) in the other figures) by reading the TDX-IO DSM Location register 908 in the DVSEC 904.

FIG. 9B illustrates an example of a TDX-IO designated vendor-specific extended capability (DVSEC) 904 according to examples of the disclosure.

FIG. 9C illustrates an example format of the fields of a TDX-IO designated vendor-specific extended capability (DVSEC) 904 according to examples of the disclosure. FIG. 9C shows example formats for TDX-IO control register 906 and TDX-IO DSM Location register 908. In certain examples, a register is readable only (RO). In certain examples, a register is readable and writable (RW).

In certain examples, a TDX-IO capable integrated device 106 implements DSM register(s) 912 as part of MMIO registers 910 (e.g., MMIO registers 910 within device 106). In certain examples, DSM offset is specified in the TDX-IO DSM Location register 908 in the DVSEC 904. In certain examples, DSM register(s) 912 (e.g., as an interface to an instance of DSM 136 (e.g., DSM back end 136B) in the other figures) is implemented as a TEE device interface (TDI) (e.g., as shown in FIG. 7), e.g., and only accept the trusted requests (e.g., a request sent by a trusted entity (e.g., TDM, vDSM TD)).

Figure 9D:
FIG. 9D illustrates an example format of device security manager (DSM) registers according to examples of the disclosure.

FIG. 9D illustrates an example format of device security manager (DSM) registers 912 according to examples of the disclosure. In certain examples, DSM registers 912 include DSM capability register 918, one or more TDI state registers, and/or one or more TDI information registers. In certain examples, TDI state registers are used to read or modify TDI state (e.g., TDISP state). In certain examples, TDI information registers are used to determine the properties or information associated with the TDI (e.g., TDI report).

FIG. 9E illustrates an example format of a device security manager capabilities (DSM caps) register 912 according to examples of the disclosure.

vDSM TD Emulates SPDM & Secure-SPDM Functionality

In certain examples, vDSM TD emulates/implements SPDM & Secure-SPDM functionality and acts a proxy for DSM-Lite of the integrated device.

In certain examples, vDSM TD generates the device certificates and a single (or per-device) private/public key pairs at runtime based on the platform secrets and mimics the SPDM/Secure-SPDM interactions on behalf of the integrated device while relying on the trusted transactions with the DSM 136 (e.g., DSM-Lite) to execute/achieve those flows.

In certain examples, vDSM TD generates an alias private/public key pair at runtime, then ask the security co-processor of the platform (for example, security controller circuit 138, e.g., S3M) to sign the public alias certificate which contains the alias public key, e.g., making the security controller circuit 138 of the platform (e.g., S3M) an endorser. In certain examples, the security controller circuit 168 signs the vDSM TD alias certificate and returns a certificate chain, e.g., where the root certificate is the certificate of security controller circuit (e.g., S3M).

Such an example enables split-DSM model where the complex flows run as a trusted virtual machine on the host (e.g., vDSM TD) while the device-state is managed via (e.g., relatively simple) register read/writes. This architecture hides the DSM differences between a discrete and an integrated device from the software perspective and maintains the HW complexity for integrated device to a minimal subset (e.g., DSM-Lite).

Figure 10:
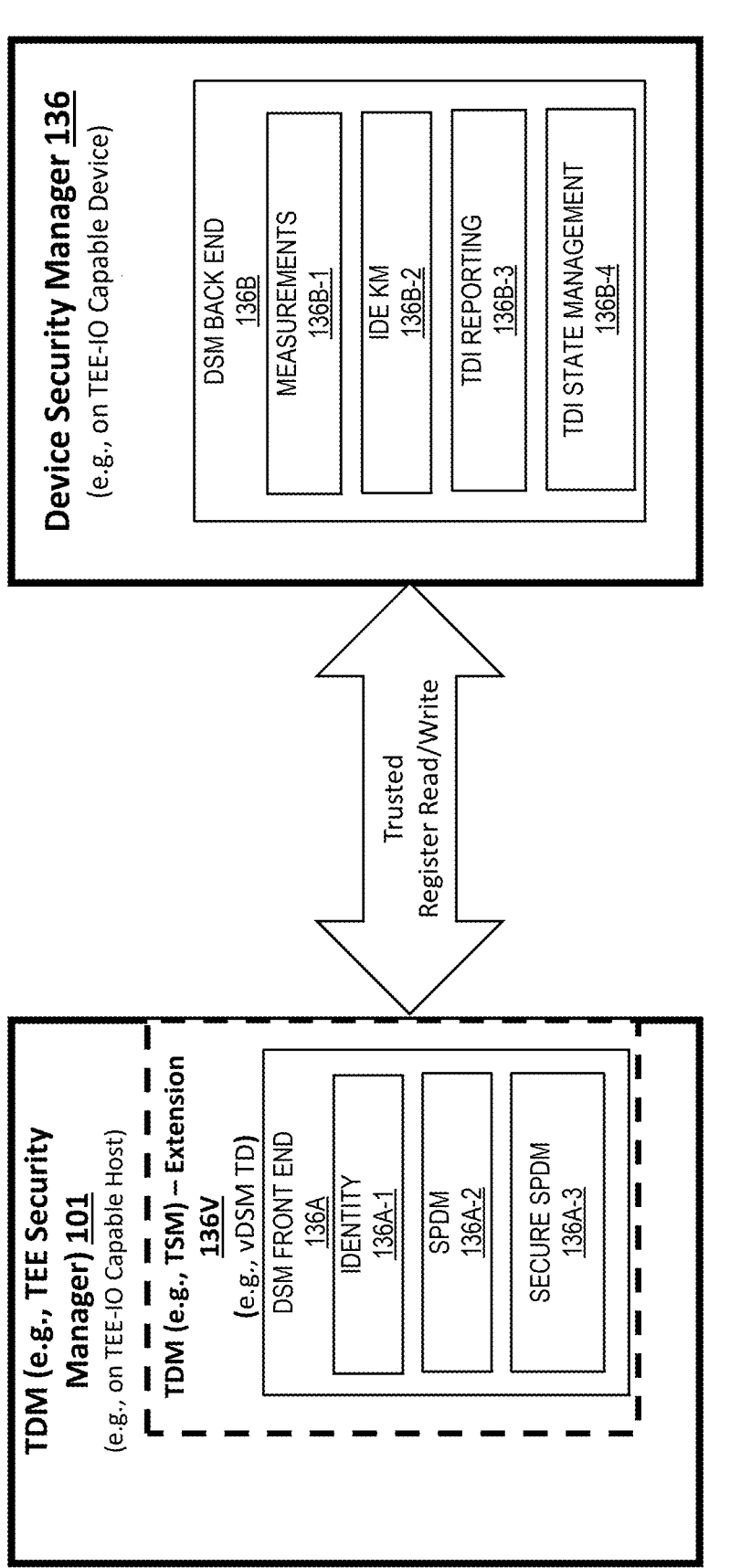
FIG. 10 illustrates a block diagram of a trust domain manager implementing a virtual device security manager according to examples of the disclosure.

FIG. 10 illustrates a block diagram of a trust domain manager 101 implementing a virtual device security manager (vDSM) according to examples of the disclosure. vDSM Implemented on a Co-Processor In a third example, the vDSM functionality is implemented on a co-processor (e.g., security controller circuit 138, e.g., S3M). In certain examples, TSM interacts with the co-processor which in-turn performs register reads/writes with DSM-Lite to execute the trusted IO flows.

Figure 11:
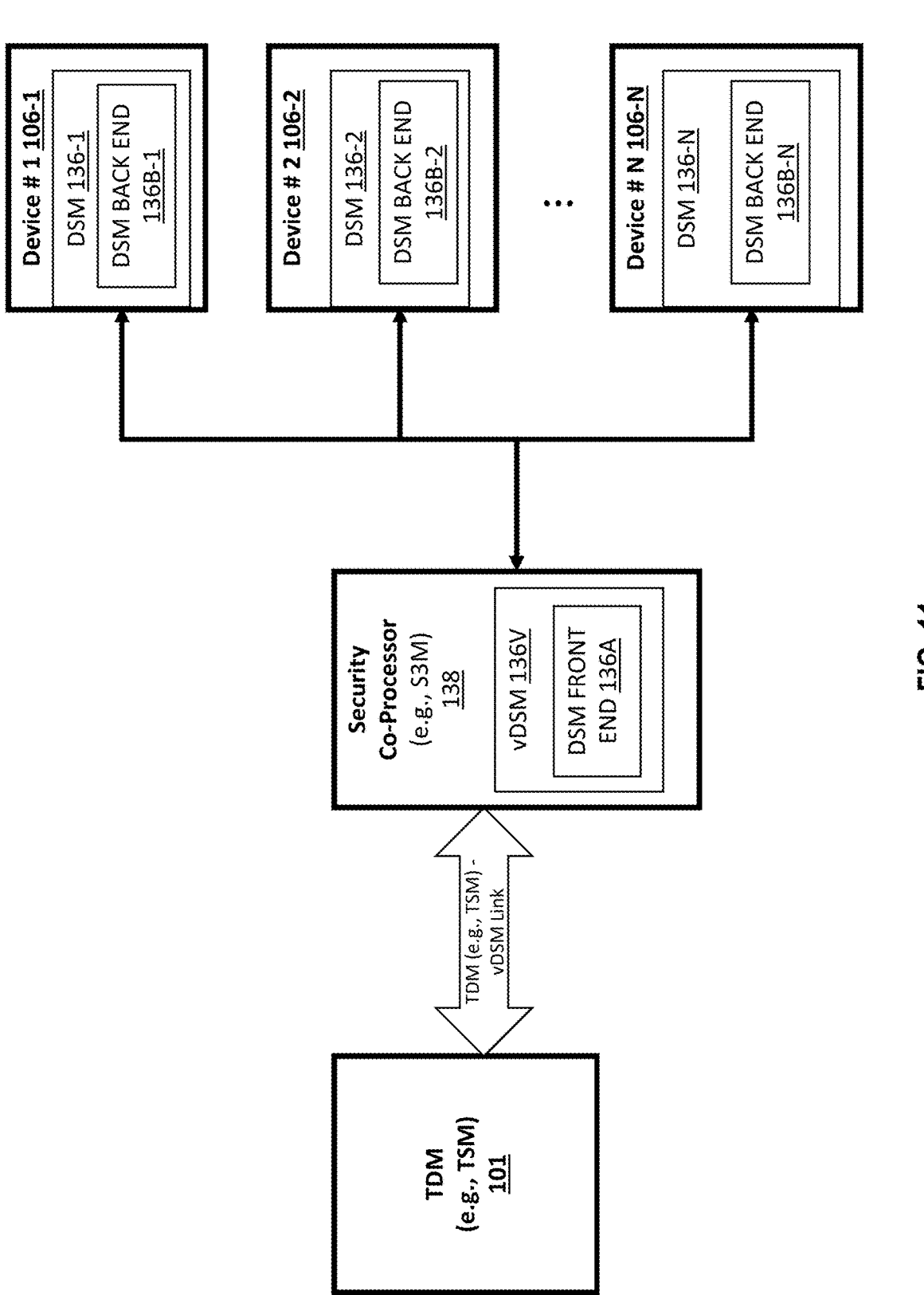
FIG. 11 illustrates a block diagram of a virtual device security manager implemented on a co-processor according to examples of the disclosure.

FIG. 11 illustrates a block diagram of a virtual device security manager 136V (e.g., DSM front end 136A) implemented on a co-processor 138 according to examples of the disclosure. In certain examples, virtual device security manager 136V is shared by multiple devices 106-1, 106-2, to 106-N (e.g., where N is any integer greater than 2). In certain examples, each device includes a DSM 136-1, DSM 136-2, to DSM 136-N, respectively, for example, where each DSM 136-1, DSM 136-2, to DSM 136-N includes (e.g., only includes) DSM back end 136B-1, DSM back end 136B-2, to DSM back end 136B-N, respectively. In certain examples, the virtualized DSM front end 136A thus communicates with each DSM back end 136B-1, DSM back end 136B-2, to DSM back end 136B-N for devices 106-1, 106-2, to 106-N, respectively, e.g., to implement secure communications between a trust domain via TDM 101 and a particular device 106-1, 106-2, or 106-N.

In a first example, TSM 101 to vDSM 136V link is secured via platform specific mechanisms (e.g., SAI). In a second example, TSM 101 to vDSM 136V link uses SPDM/Secure-SPDM protocol.

In a first example, vDSM 136V to DSM-Lite (e.g., DSM back end 136B-1, 136B-2, or 136B-3) connection is a trusted register read/write. In a second example, vDSM 136V to DSM-Lite (e.g., DSM back end 136B-1, 136B-2, or 136B-3) connection is a protected side-band interface between these components.

FIG. 12 is a flow diagram illustrating operations of a method for accessing state of a trusted device interface of an input/output device according to examples of the disclosure.

Some or all of the operations 1200 (or other processes described herein, or variations, and/or combinations thereof) are performed under the control of a trust domain manager and/or device security manager as implemented herein and/or one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some examples, one or more (or all) of the operations 1200 are performed by DSM 136 (e.g., and trust domain manager 101) of the other figures.

The operations 1200 include, at block 1202, managing one or more virtual machines as a respective trust domain, isolated from a virtual machine monitor, by a trust domain manager implemented by a hardware processor core. The operations 1200 further include, at block 1204, sending a trusted (e.g., and unencrypted) request from the trust domain manager to a control interface of a device security manager circuit of an input/output device coupled to the hardware processor core. The operations 1200 further include, at block 1206, accessing, in response to the trusted (e.g., and unencrypted) request, a state of a trusted device interface of the input/output device for a trust domain of the trust domain manager. The operations 1200 further include, at block 1208, receiving a corresponding response by the trust domain manager.

In certain examples, a (e.g., DSM) register (e.g., in DSM) is read and/or written to by an instruction, for example, according to a method for processing a register instruction according to examples of the disclosure. A processor (e.g., or processor core) may perform operations of a method, e.g., in response to receiving a request to execute an instruction from software. Operations may include processing a "DSM" instruction by performing a: fetch of an instruction (e.g., having an instruction opcode corresponding to the command mnemonic), decode of the instruction into a decoded instruction, retrieve data associated with the instruction, (optionally) schedule the decoded instruction for execution, execute the decoded instruction to set the register, and thus control the functionality of the DSM/TSM, and commit a result of the executed instruction.

Exemplary architectures, systems, etc. that the above may be used in are detailed below. Exemplary instruction formats that may cause enqueuing of a job for an accelerator are detailed below.

At least some examples of the disclosed technologies can be described in view of the following examples:

Example 1. An apparatus comprising:

a hardware processor core comprising a trust domain manager to manage one or more hardware isolated virtual machines as a respective trust domain; and a device security manager circuit to be coupled between the hardware processor core and an input/output device, wherein the device security manager circuit is to, in response to an unencrypted request from the trust domain manager to a control interface of the device security manager circuit, access a state of a trusted device interface of the input/output device for a trust domain of the trust domain manager, and send a corresponding response to the trust domain manager.

Example 2. The apparatus of example 1, wherein the control interface of the device security manager circuit comprises a set of one or more protected registers that are accessible by the trust domain manager and not accessible by a virtual machine monitor of the one or more hardware isolated virtual machines.

Example 3. The apparatus of example 1, wherein the control interface of the device security manager circuit comprises a protected trust domain mode and a management trusted device interface (e.g., DSM back end of FIG. 4 or DSM TDI of FIG. 7) of the device security manager circuit, and the device security manager circuit is to access the state of the trusted device interface of the input/output device in response to the protected trust domain mode being enabled and the unencrypted request including a trusted execution environment field (e.g., TEE attribute or XT attribute) that indicates the unencrypted request is from a trusted entity.

Example 4. The apparatus of example 3, wherein the management trusted device interface of the device security manager circuit is accessible by the trust domain and not accessible by a second trust domain managed by the trust domain manager.

Example 5. The apparatus of example 3, wherein the management trusted device interface of the device security manager circuit is to not accept the unencrypted request in response to the protected trust domain mode being disabled.

Example 6. The apparatus of example 5, wherein the device security manager circuit is to:

lock configuration of the input/output device in response to the protected trust domain mode being enabled;

monitor the input/output device for a re-configuration or an error event;

disable the protected trust domain mode in response to the re-configuration; and disable the protected trust domain mode in response to the error event.

Example 7. The apparatus of example 1, wherein the control interface of the device security manager circuit comprises a set of protected registers that provide firmware measurements for the input/output device.

Example 8. The apparatus of example 1, wherein the device security manager circuit is to, in response to the unencrypted request from the trust domain manager to the control interface of the device security manager circuit, transition the state of the trusted device interface according to a Trusted Execution Environment (TEE) Device Interface Security Protocol standard.

Example 9. A method comprising:

managing one or more hardware isolated virtual machines as a respective trust domain by a trust domain manager of a hardware processor core;

sending an unencrypted request from the trust domain manager to a control interface of a device security manager circuit of an input/output device coupled to the hardware processor core;

accessing, in response to the unencrypted request, a state of a trusted device interface of the input/output device for a trust domain of the trust domain manager; and receiving a corresponding response (e.g., for the accessing) by the trust domain manager.

Example 10. The method of example 9, wherein the control interface of the device security manager circuit comprises a set of one or more protected registers that are accessible by the trust domain manager and not accessible by a virtual machine monitor of the one or more hardware isolated virtual machines, and the receiving comprises performing a read or a write on the set of one or more protected registers.

Example 11. The method of example 9, wherein the control interface of the device security manager circuit comprises a protected trust domain mode and a management trusted device interface of the device security manager circuit, and the accessing the state of the trusted device interface of the input/output device is in response to the protected trust domain mode being enabled and the unencrypted request including a trusted execution environment field (e.g., TEE attribute or XT attribute) that indicates the unencrypted request is from a trusted entity.

Example 12. The method of example 11, wherein the management trusted device interface of the device security manager circuit is accessible by the trust domain and not accessible by a second trust domain managed by the trust domain manager.

Example 13. The method of example 11, further comprising not accepting, by the management trusted device interface of the device security manager circuit, the unencrypted request in response to the protected trust domain mode being disabled.

Example 14. The method of example 13, further comprising:
    locking configuration of the input/output device in response to the protected trust domain mode being enabled;
    monitoring the input/output device for a re-configuration or an error event;
    disabling the protected trust domain mode in response to the re-configuration; and
    disabling the protected trust domain mode in response to the error event.

Example 15. The method of example 9, wherein the control interface of the device security manager circuit comprises a set of protected registers, and the accessing comprises performing a read of firmware measurements from the set of protected registers for the input/output device.

Example 16. The method of example 9, wherein the accessing the state comprises transitioning the state of the trusted device interface according to a Trusted Execution Environment (TEE) Device Interface Security Protocol standard.

Example 17. A system comprising:
    a hardware processor core comprising a trust domain manager to manage one or more hardware isolated virtual machines as a respective trust domain; and
    an input/output device coupled to the hardware processor core and comprising a device security manager circuit, wherein the device security manager circuit is to, in response to an unencrypted request from the trust domain manager to a control interface of the device security manager circuit, access a state of a trusted device interface of the input/output device for a trust domain of the trust domain manager, and send a corresponding response to the trust domain manager.

Example 18. The system of example 17, wherein the control interface of the device security manager circuit comprises a set of one or more protected registers that are accessible by the trust domain manager and not accessible by a virtual machine monitor of the one or more hardware isolated virtual machines.

Example 19. The system of example 17, wherein the control interface of the device security manager circuit comprises a protected trust domain mode and a management trusted device interface of the device security manager circuit, and the device security manager circuit is to access the state of the trusted device interface of the input/output device in response to the protected trust domain mode being enabled and the unencrypted request including a trusted execution environment field (e.g., TEE attribute or XT attribute) that indicates the unencrypted request is from a trusted entity.

Example 20. The system of example 19, wherein the management trusted device interface of the device security manager circuit is accessible by the trust domain and not accessible by a second trust domain managed by the trust domain manager.

Example 21. The system of example 19, wherein the management trusted device interface of the device security manager circuit is to not accept the unencrypted request in response to the protected trust domain mode being disabled.

Example 22. The system of example 21, wherein the device security manager circuit is to:
    lock configuration of the input/output device in response to the protected trust domain mode being enabled;
    monitor the input/output device for a re-configuration or an error event;
    disable the protected trust domain mode in response to the re-configuration; and disable the protected trust domain mode in response to the error event.

Example 23. The system of example 17, wherein the control interface of the device security manager circuit comprises a set of protected registers that provide firmware measurements for the input/output device.

Example 24. The system of example 17, wherein the device security manager circuit is to, in response to the unencrypted request from the trust domain manager to the control interface of the device security manager circuit, transition the state of the trusted device interface according to a Trusted Execution Environment (TEE) Device Interface Security Protocol standard.

Example 25. An apparatus comprising:
    a hardware processor core configurable to implement a trust domain manager to manage one or more virtual machines as a respective trust domain isolated from a virtual machine monitor; and
    a device security manager circuit to be coupled between the hardware processor core and an input/output device, wherein the device security manager circuit is to, in response to a trusted request from the trust domain manager to a control interface of the device security manager circuit, access a state of a trusted device interface of the input/output device for a trust domain of the trust domain manager, and provide a corresponding response to the trust domain manager.

Example 26. The apparatus of example 25, wherein the control interface of the device security manager circuit comprises a set of one or more protected registers that are accessible by the trust domain manager and not accessible by a virtual machine monitor of the one or more virtual machines isolated from a virtual machine monitor.

Example 27. The apparatus of example 25, wherein the control interface of the device security manager circuit comprises a protected trust domain mode and a management trusted device interface of the device security manager circuit, and the device security manager circuit is to access the state of the trusted device interface of the input/output device in response to the protected trust domain mode being enabled and the trusted request including a trusted execution environment field (e.g., TEE attribute or XT attribute) that indicates the trusted request is from a trusted entity.

Example 28. The apparatus of example 27, wherein the management trusted device interface of the device security manager circuit is accessible by the trust domain and not accessible by a second trust domain managed by the trust domain manager.

Example 29. The apparatus of example 27, wherein the management trusted device interface of the device security manager circuit is to not accept the trusted request in response to the protected trust domain mode being disabled.

Example 30. The apparatus of example 29, wherein the device security manager circuit is to:

lock configuration of the input/output device in response to the protected trust domain mode being enabled;

monitor the input/output device for a re-configuration or an error event;

disable the protected trust domain mode in response to the re-configuration; and disable the protected trust domain mode in response to the error event.

Example 31. The apparatus of example 25, wherein the control interface of the device security manager circuit comprises a set of protected registers that provide firmware measurements for the input/output device.

Example 32. The apparatus of example 25, wherein the device security manager circuit is to, in response to the trusted request from the trust domain manager to the control interface of the device security manager circuit, transition the state of the trusted device interface according to a Trusted Execution Environment (TEE) Device Interface Security Protocol standard.

Example 33. A method comprising:

managing one or more virtual machines as a respective trust domain, isolated from a virtual machine monitor, by a trust domain manager implemented by a hardware processor core;

sending a trusted request from the trust domain manager to a control interface of a device security manager circuit of an input/output device coupled to the hardware processor core;

accessing, in response to the trusted request, a state of a trusted device interface of the input/output device for a trust domain of the trust domain manager; and receiving a corresponding response (e.g., for the accessing) by the trust domain manager.

Example 34. The method of example 33, wherein the control interface of the device security manager circuit comprises a set of one or more protected registers that are accessible by the trust domain manager and not accessible by a virtual machine monitor of the one or more virtual machines, and the receiving comprises performing a read or a write on the set of one or more protected registers.

Example 35. The method of example 33, wherein the control interface of the device security manager circuit comprises a protected trust domain mode and a management trusted device interface of the device security manager circuit, and the accessing the state of the trusted device interface of the input/output device is in response to the protected trust domain mode being enabled and the trusted request including a trusted execution environment field (e.g., TEE attribute or XT attribute) that indicates the trusted request is from a trusted entity.

Example 36. The method of example 35, wherein the management trusted device interface of the device security manager circuit is accessible by the trust domain and not accessible by a second trust domain managed by the trust domain manager.

Example 37. The method of example 35, further comprising not accepting, by the management trusted device interface of the device security manager circuit, the trusted request in response to the protected trust domain mode being disabled.

Example 38. The method of example 37, further comprising:

locking configuration of the input/output device in response to the protected trust domain mode being enabled;

monitoring the input/output device for a re-configuration or an error event;

disabling the protected trust domain mode in response to the re-configuration; and disabling the protected trust domain mode in response to the error event.

Example 39. The method of example 33, wherein the control interface of the device security manager circuit comprises a set of protected registers, and the accessing comprises performing a read of firmware measurements from the set of protected registers for the input/output device.

Example 40. The method of example 33, wherein the accessing the state comprises transitioning the state of the trusted device interface according to a Trusted Execution Environment (TEE) Device Interface Security Protocol standard.

Example 41. A system comprising:

a hardware processor core configurable to implement a trust domain manager to manage one or more virtual machines as a respective trust domain isolated from a virtual machine monitor; and an input/output device coupled to the hardware processor core and comprising a device security manager circuit, wherein the device security manager circuit is to, in response to a trusted request from the trust domain manager to a control interface of the device security manager circuit, access a state of a trusted device interface of the input/output device for a trust domain of the trust domain manager, and provide a corresponding response to the trust domain manager.

Example 42. The system of example 41, wherein the control interface of the device security manager circuit comprises a set of one or more protected registers that are accessible by the trust domain manager and not accessible by a virtual machine monitor of the one or more virtual machines.

Example 43. The system of example 41, wherein the control interface of the device security manager circuit comprises a protected trust domain mode and a management trusted device interface of the device security manager circuit, and the device security manager circuit is to access the state of the trusted device interface of the input/output device in response to the protected trust domain mode being enabled and the trusted request including a trusted execution environment field (e.g., TEE attribute or XT attribute) that indicates the trusted request is from a trusted entity.

Example 44. The system of example 43, wherein the management trusted device interface of the device security manager circuit is accessible by the trust domain and not accessible by a second trust domain managed by the trust domain manager.

Example 45. The system of example 43, wherein the management trusted device interface of the device security manager circuit is to not accept the trusted request in response to the protected trust domain mode being disabled.

Example 46. The system of example 45, wherein the device security manager circuit is to:

lock configuration of the input/output device in response to the protected trust domain mode being enabled;

monitor the input/output device for a re-configuration or an error event;

disable the protected trust domain mode in response to the re-configuration; and disable the protected trust domain mode in response to the error event.

Example 47. The system of example 41, wherein the control interface of the device security manager circuit comprises a set of protected registers that provide firmware measurements for the input/output device.

Example 48. The system of example 41, wherein the device security manager circuit is to, in response to the trusted request from the trust domain manager to the control interface of the device security manager circuit, transition the state of the trusted device interface according to a Trusted Execution Environment (TEE) Device Interface Security Protocol standard.

In yet another example, an apparatus comprises a data storage device that stores code that when executed by a hardware processor causes the hardware processor to perform any method disclosed herein. An apparatus may be as described in the detailed description. A method may be as described in the detailed description.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, November 2018; and see Intel® Architecture Instruction Set Extensions Programming Reference, October 2018).

Exemplary Instruction Formats

Examples of the instruction(s) described herein may be embodied in different formats. Additionally, exemplary systems, architectures, and pipelines are detailed below. Examples of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While examples are described in which both vector and scalar operations are supported through the vector friendly instruction format, alternative examples use only vector operations the vector friendly instruction format.

Figure 13A:
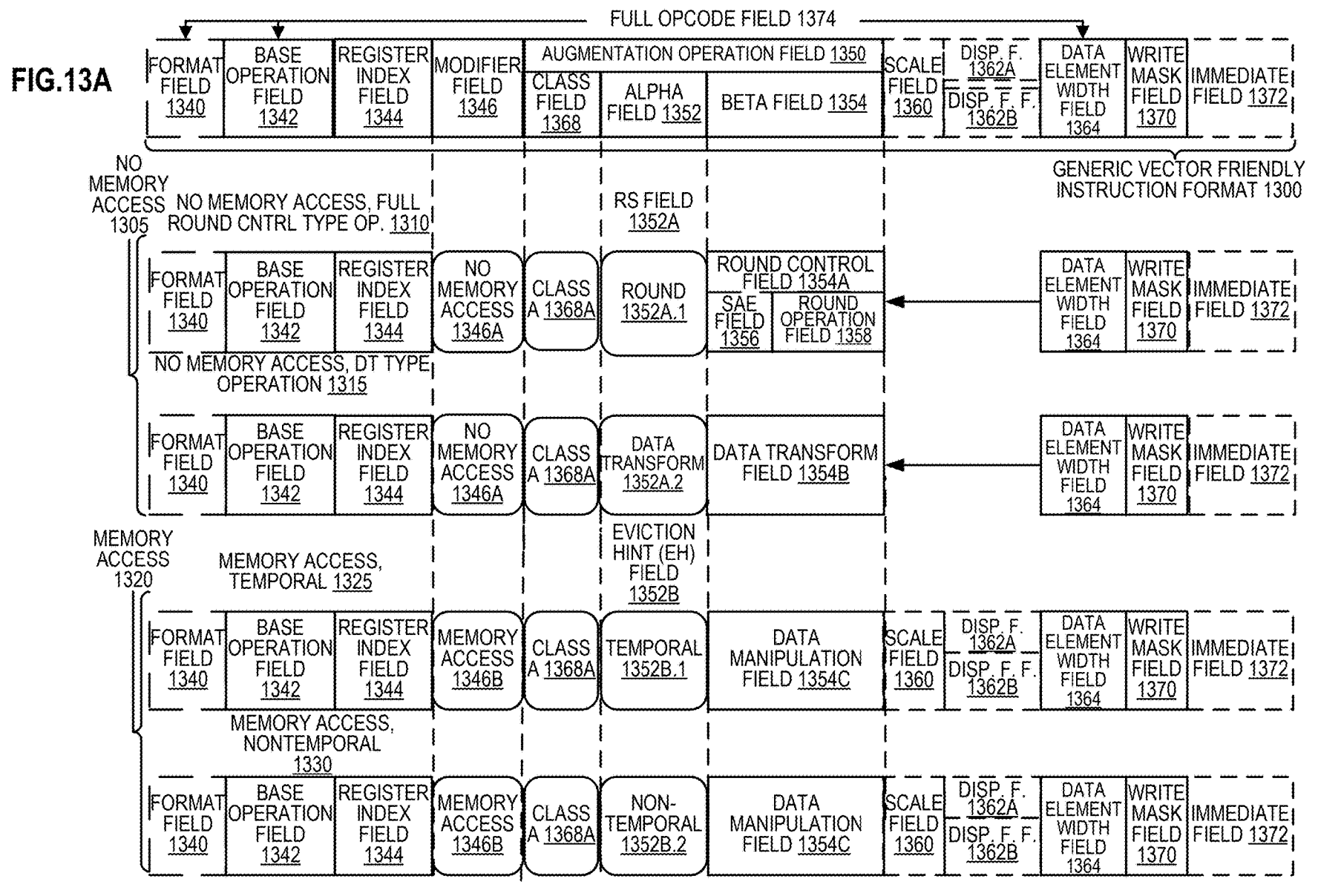

FIGS. 13A-13B are block diagrams illustrating a generic vector friendly instruction format and instruction templates thereof according to examples of the disclosure. FIG. 13A is a block diagram illustrating a generic vector friendly instruction format and class A instruction templates thereof according to examples of the disclosure; while FIG. 13B is a block diagram illustrating the generic vector friendly instruction format and class B instruction templates thereof according to examples of the disclosure. Specifically, a generic vector friendly instruction format 1300 for which are defined class A and class B instruction templates, both of which include no memory access 1305 instruction templates and memory access 1320 instruction templates. The term generic in the context of the vector friendly instruction format refers to the instruction format not being tied to any specific instruction set.

While examples of the disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative examples may support more, less and/or different vector operand sizes (e.g., 256 byte vector operands) with more, less, or different data element widths (e.g., 128 bit (16 byte) data element widths).

The class A instruction templates in FIG. 13A include: 1) within the no memory access 1305 instruction templates there is shown a no memory access, full round control type operation 1310 instruction template and a no memory access, data transform type operation 1315 instruction template; and 2) within the memory access 1320 instruction templates there is shown a memory access, temporal 1325 instruction template and a memory access, non-temporal 1330 instruction template. The class B instruction templates in FIG. 13B include: 1) within the no memory access 1305 instruction templates there is shown a no memory access, write mask control, partial round control type operation 1312 instruction template and a no memory access, write mask control, vsize type operation 1317 instruction template; and 2) within the memory access 1320 instruction templates there is shown a memory access, write mask control 1327 instruction template.

The generic vector friendly instruction format 1300 includes the following fields listed below in the order illustrated in FIGS. 13A-13B.

Format field 1340—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1342—its content distinguishes different base operations.

Register index field 1344—its content, directly or through address generation, specifies the locations of the source and destination operands, be they in registers or in memory. These include a sufficient number of bits to select N registers from a P×Q (e.g., 32×512, 16×128, 32×1024, 64×1024) register file. While in one example N may be up to three sources and one destination register, alternative examples may support more or less sources and destination registers (e.g., may support up to two sources where one of these sources also acts as the destination, may support up to three sources where one of these sources also acts as the destination, may support up to two sources and one destination).

Modifier field 1346—its content distinguishes occurrences of instructions in the generic vector instruction format that specify memory access from those that do not; that is, between no memory access 1305 instruction templates and memory access 1320 instruction templates. Memory access operations read and/or write to the memory hierarchy (in some cases specifying the source and/or destination addresses using values in registers), while non-memory access operations do not (e.g., the source and destinations are registers). While in one example this field also selects between three different ways to perform memory address calculations, alternative examples may support more, less, or different ways to perform memory address calculations.

Augmentation operation field 1350—its content distinguishes which one of a variety of different operations to be performed in addition to the base operation. This field is context specific. In one example of the disclosure, this field is divided into a class field 1368, an alpha field 1352, and a beta field 1354. The augmentation operation field 1350 allows common groups of operations to be performed in a single instruction rather than 2, 3, or 4 instructions.

Scale field 1360—its content allows for the scaling of the index field's content for memory address generation (e.g., for address generation that uses $2^{scale}$*index+base).

Displacement Field 1362A—its content is used as part of memory address generation (e.g., for address generation that uses $2^{scale}$*index+base+displacement).

Displacement Factor Field 1362B (note that the juxtaposition of displacement field 1362A directly over displacement factor field 1362B indicates one or the other is used)—its content is used as part of address generation; it specifies a displacement factor that is to be scaled by the size of a memory access (N)—where N is the number of bytes in the memory access (e.g., for address generation that uses $2^{scale}$*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1374 (described later herein) and the data manipulation field 1354C. The displacement field 1362A and the displacement factor field 1362B are optional in the sense that they are not used for the no memory access 1305 instruction templates and/or different examples may implement only one or none of the two.

Data element width field 1364—its content distinguishes which one of a number of data element widths is to be used (in some examples for all instructions; in other examples for only some of the instructions). This field is optional in the sense that it is not needed if only one data element width is supported and/or data element widths are supported using some aspect of the opcodes.

Write mask field 1370—its content controls, on a per data element position basis, whether that data element position in the destination vector operand reflects the result of the base operation and augmentation operation. Class A instruction templates support merging-write-masking, while class B instruction templates support both merging- and zeroing-writemasking. When merging, vector masks allow any set of elements in the destination to be protected from updates during the execution of any operation (specified by the base operation and the augmentation operation); in other one example, preserving the old value of each element of the destination where the corresponding mask bit has a 0. In contrast, when zeroing vector masks allow any set of elements in the destination to be zeroed during the execution of any operation (specified by the base operation and the augmentation operation); in one example, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1370 allows for partial vector operations, including loads, stores, arithmetic, logical, etc. While examples of the disclosure are described in which the write mask field's 1370 content selects one of a number of write mask registers that contains the write mask to be used (and thus the write mask field's 1370 content indirectly identifies that masking to be performed), alternative examples instead or additional allow the mask write field's 1370 content to directly specify the masking to be performed.

Immediate field 1372—its content allows for the specification of an immediate. This field is optional in the sense that it is not present in an implementation of the generic vector friendly format that does not support immediate and it is not present in instructions that do not use an immediate.

Class field 1368—its content distinguishes between different classes of instructions. With reference to FIGS. 13A-B, the contents of this field select between class A and class B instructions. In FIGS. 13A-B, rounded corner squares are used to indicate a specific value is present in a field (e.g., class A 1368A and class B 1368B for the class field 1368 respectively in FIGS. 13A-B).

Instruction Templates of Class A

In the case of the non-memory access 1305 instruction templates of class A, the alpha field 1352 is interpreted as an RS field 1352A, whose content distinguishes which one of the different augmentation operation types are to be performed (e.g., round 1352A.1 and data transform 1352A.2 are respectively specified for the no memory access, round type operation 1310 and the no memory access, data transform type operation 1315 instruction templates), while the beta field 1354 distinguishes which of the operations of the specified type is to be performed. In the no memory access 1305 instruction templates, the scale field 1360, the displacement field 1362A, and the displacement scale filed 1362B are not present.

No-Memory Access Instruction Templates-Full Round Control Type Operation

In the no memory access full round control type operation 1310 instruction template, the beta field 1354 is interpreted as a round control field 1354A, whose content(s) provide static rounding. While in the described examples of the disclosure the round control field 1354A includes a suppress all floating point exceptions (SAE) field 1356 and a round operation control field 1358, alternative examples may support may encode both these concepts into the same field or only have one or the other of these concepts/fields (e.g., may have only the round operation control field 1358).

SAE field 1356—its content distinguishes whether or not to disable the exception event reporting; when the SAE field's 1356 content indicates suppression is enabled, a given instruction does not report any kind of floating-point exception flag and does not raise any floating point exception handler.

Round operation control field 1358—its content distinguishes which one of a group of rounding operations to perform (e.g., Round-up, Round-down, Round-to-wards-zero and Round-to-nearest). Thus, the round operation control field 1358 allows for the changing of the rounding mode on a per instruction basis. In one example of the disclosure where a processor includes a control register for specifying rounding modes, the round operation control field's 1350 content overrides that register value.

No Memory Access Instruction Templates—Data Transform Type Operation

In the no memory access data transform type operation 1315 instruction template, the beta field 1354 is interpreted as a data transform field 1354B, whose content distinguishes which one of a number of data transforms is to be performed (e.g., no data transform, swizzle, broadcast).

In the case of a memory access 1320 instruction template of class A, the alpha field 1352 is interpreted as an eviction hint field 1352B, whose content distinguishes which one of the eviction hints is to be used (in FIG. 13A, temporal 1352B.1 and non-temporal 1352B.2 are respectively specified for the memory access, temporal 1325 instruction template and the memory access, non-temporal 1330 instruction template), while the beta field 1354 is interpreted as a data manipulation field 1354C, whose content distinguishes which one of a number of data manipulation operations (also known as primitives) is to be performed (e.g., no manipulation; broadcast; up conversion of a source; and down conversion of a destination). The memory access 1320 instruction templates include the scale field 1360, and optionally the displacement field 1362A or the displacement scale field 1362B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1352 is interpreted as a write mask control (Z) field 1352C, whose content distinguishes whether the write masking controlled by the write mask field 1370 should be a merging or a zeroing.

In the case of the non-memory access 1305 instruction templates of class B, part of the beta field 1354 is interpreted as an RL field 1357A, whose content distinguishes which one of the different augmentation operation types are to be performed (e.g., round 1357A.1 and vector length (VSIZE) 1357A.2 are respectively specified for the no memory access, write mask control, partial round control type operation 1312 instruction template and the no memory access, write mask control, VSIZE type operation 1317 instruction template), while the rest of the beta field 1354 distinguishes which of the operations of the specified type is to be performed. In the no memory access 1305 instruction templates, the scale field 1360, the displacement field 1362A, and the displacement scale filed 1362B are not present.

In the no memory access, write mask control, partial round control type operation 1310 instruction template, the rest of the beta field 1354 is interpreted as a round operation field 1359A and exception event reporting is disabled (a given instruction does not report any kind of floating-point exception flag and does not raise any floating point exception handler).

Round operation control field 1359A-just as round operation control field 1358, its content distinguishes which one of a group of rounding operations to perform (e.g., Round-up, Round-down, Round-towards-zero and Round-to-nearest). Thus, the round operation control field 1359A allows for the changing of the rounding mode on a per instruction basis. In one example of the disclosure where a processor includes a control register for specifying rounding modes, the round operation control field's 1350 content overrides that register value.

In the no memory access, write mask control, VSIZE type operation 1317 instruction template, the rest of the beta field 1354 is interpreted as a vector length field 1359B, whose content distinguishes which one of a number of data vector lengths is to be performed on (e.g., 128, 256, or 512 byte).

In the case of a memory access 1320 instruction template of class B, part of the beta field 1354 is interpreted as a broadcast field 1357B, whose content distinguishes whether or not the broadcast type data manipulation operation is to be performed, while the rest of the beta field 1354 is interpreted the vector length field 1359B. The memory access 1320 instruction templates include the scale field 1360, and optionally the displacement field 1362A or the displacement scale field 1362B.

With regard to the generic vector friendly instruction format 1300, a full opcode field 1374 is shown including the format field 1340, the base operation field 1342, and the data element width field 1364. While one example is shown where the full opcode field 1374 includes all of these fields, the full opcode field 1374 includes less than all of these fields in examples that do not support all of them. The full opcode field 1374 provides the operation code (opcode).

The augmentation operation field 1350, the data element width field 1364, and the write mask field 1370 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some examples of the disclosure, different processors or different cores within a processor may support only class A, only class B, or both classes. For instance, a high performance general purpose out-of-order core intended for general-purpose computing may support only class B, a core intended primarily for graphics and/or scientific (through-put) computing may support only class A, and a core intended for both may support both (of course, a core that has some mix of templates and instructions from both classes but not all templates and instructions from both classes is within the purview of the disclosure). Also, a single processor may include multiple cores, all of which support the same class or in which different cores support different class. For instance, in a processor with separate graphics and general purpose cores, one of the graphics cores intended primarily for graphics and/or scientific com-puting may support only class A, while one or more of the general purpose cores may be high performance general purpose cores with out of order execution and register renaming intended for general-purpose computing that sup-port only class B. Another processor that does not have a separate graphics core, may include one more general pur-pose in-order or out-of-order cores that support both class A and class B. Of course, features from one class may also be implement in the other class in different examples of the disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 14 is a block diagram illustrating an exemplary specific vector friendly instruction format according to examples of the disclosure. FIG. 14 shows a specific vector friendly instruction format 1400 that is specific in the sense that it specifies the location, size, interpretation, and order of the fields, as well as values for some of those fields. The specific vector friendly instruction format 1400 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 13 into which the fields from FIG. 14 map are illustrated.

It should be understood that, although examples of the disclosure are described with reference to the specific vector friendly instruction format 1400 in the context of the generic vector friendly instruction format 1300 for illustrative pur-poses, the disclosure is not limited to the specific vector friendly instruction format 1400 except where claimed. For example, the generic vector friendly instruction format 1300 contemplates a variety of possible sizes for the various fields, while the specific vector friendly instruction format 1400 is shown as having fields of specific sizes. By way of specific example, while the data element width field 1364 is illustrated as a one bit field in the specific vector friendly instruction format 1400, the disclosure is not so limited (that is, the generic vector friendly instruction format 1300 con-templates other sizes of the data element width field 1364).

The generic vector friendly instruction format 1300 includes the following fields listed below in the order illustrated in FIG. 14A.

EVEX Prefix (Bytes 0-3) 1402—is encoded in a four-byte form.

Format Field 1340 (EVEX Byte 0, bits [7:0])—the first byte (EVEX Byte 0) is the format field 1340 and it contains 0x62 (the unique value used for distinguishing the vector friendly instruction format in one example of the disclo-sure).

The second-fourth bytes (EVEX Bytes 1-3) include a number of bit fields providing specific capability.

REX field 1405 (EVEX Byte 1, bits [7-5])—consists of an EVEX.R bit field (EVEX Byte 1, bit [7]—R), EVEX.X bit field (EVEX byte 1, bit [6]—X), and 1357BEX byte 1, bit [5]-B). The EVEX.R, EVEX.X, and EVEX.B bit fields provide the same functionality as the corresponding VEX bit fields, and are encoded using 1s complement form, e.g., ZMMO is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1310—this is the first part of the REX' field 1310 and is the EVEX.R' bit field (EVEX Byte 1, bit [4]-R') that is used to encode either the upper 16 or lower 16 of the extended 32 register set. In one example of the disclosure, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alter-native examples of the disclosure do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1415 (EVEX byte 1, bits [3:0]-mmmm)-its content encodes an implied leading opcode byte (0F, 0F 38, or 0F 3).

Data element width field 1364 (EVEX byte 2, bit [7]-W)—is represented by the notation EVEX.W. EVEX.W is used to define the granularity (size) of the datatype (either 32-bit data elements or 64-bit data elements).

EVEX.vvvv 1420 (EVEX Byte 2, bits [6:3]-vvvv)—the role of EVEX.vvvv may include the following: 1) EVEX.vvvv encodes the first source register operand, speci-fied in inverted (1s complement) form and is valid for instructions with 2 or more source operands; 2) EVEX.vvvv encodes the destination register operand, specified in Is complement form for certain vector shifts; or 3) EVEX.vvvv does not encode any operand, the field is reserved and should contain 1111b. Thus, EVEX.vvvv field 1420 encodes the 4 low-order bits of the first source register specifier stored in inverted (1s complement) form. Depending on the instruction, an extra different EVEX bit field is used to extend the specifier size to 32 registers.

EVEX.U 1368 Class field (EVEX byte 2, bit [2]-U)—If EVEX.U=0, it indicates class A or EVEX.U0; if EVEX.U=1, it indicates class B or EVEX.U1.

Prefix encoding field 1425 (EVEX byte 2, bits [1:0]-pp)-provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one example, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain examples expand in a similar fashion for consistency but allow for different meanings to be specified by these legacy SIMD prefixes. An alternative example may redesign the PLA to support the 2 bit SIMD prefix encodings, and thus not require the expansion.

Alpha field 1352 (EVEX byte 3, bit [7]-EH; also known as EVEX.EH, EVEX.rs, EVEX.RL, EVEX.write mask control, and EVEX.N; also illustrated with α)—as previously described, this field is context specific.

Beta field 1354 (EVEX byte 3, bits [6:4]-SSS, also known as EVEX.$s_{2-0}$, EVEX.$r_{2-0}$, EVEX.rr1, EVEX.LL0, EVEX.LLB; also illustrated with BBB)—as previously described, this field is context specific.

REX' field 1310—this is the remainder of the REX' field and is the EVEX. V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1370 (EVEX byte 3, bits [2:0]-kkk)—its content specifies the index of a register in the write mask registers as previously described. In one example of the disclosure, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 1430 (Byte 4) is also known as the opcode byte. Part of the opcode is specified in this field.

MOD R/M Field 1440 (Byte 5) includes MOD field 1442, Reg field 1444, and R/M field 1446. As previously described, the MOD field's 1442 content distinguishes between memory access and non-memory access operations. The role of Reg field 1444 can be summarized to two situations: encoding either the destination register operand or a source register operand, or be treated as an opcode extension and not used to encode any instruction operand. The role of R/M field 1446 may include the following: encoding the instruction operand that references a memory address, or encoding either the destination register operand or a source register operand.

Scale, Index, Base (SIB) Byte (Byte 6)—As previously described, the scale field's 1350 content is used for memory address generation. SIB.xxx 1454 and SIB.bbb 1456—the contents of these fields have been previously referred to with regard to the register indexes Xxxx and Bbbb.

Displacement field 1362A (Bytes 7-10)—when MOD field 1442 contains 10, bytes 7-10 are the displacement field 1362A, and it works the same as the legacy 32-bit displacement (disp32) and works at byte granularity.

Displacement factor field 1362B (Byte 7)—when MOD field 1442 contains 01, byte 7 is the displacement factor field 1362B. The location of this field is that same as that of the legacy x86 instruction set 8-bit displacement (disp8), which works at byte granularity. Since disp8 is sign extended, it can only address between-128 and 127 bytes offsets; in terms of 64 byte cache lines, disp8 uses 8 bits that can be set to only four really useful values –128, –64, 0, and 64; since a greater range is often needed, disp32 is used; however, disp32 requires 4 bytes.

In contrast to disp8 and disp32, the displacement factor field 1362B is a reinterpretation of disp8; when using displacement factor field 1362B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1362B substitutes the legacy x86 instruction set 8-bit displacement. Thus, the displacement factor field 1362B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 1372 operates as previously described.

Full Opcode Field

Figures 14A, 14B, 14C:
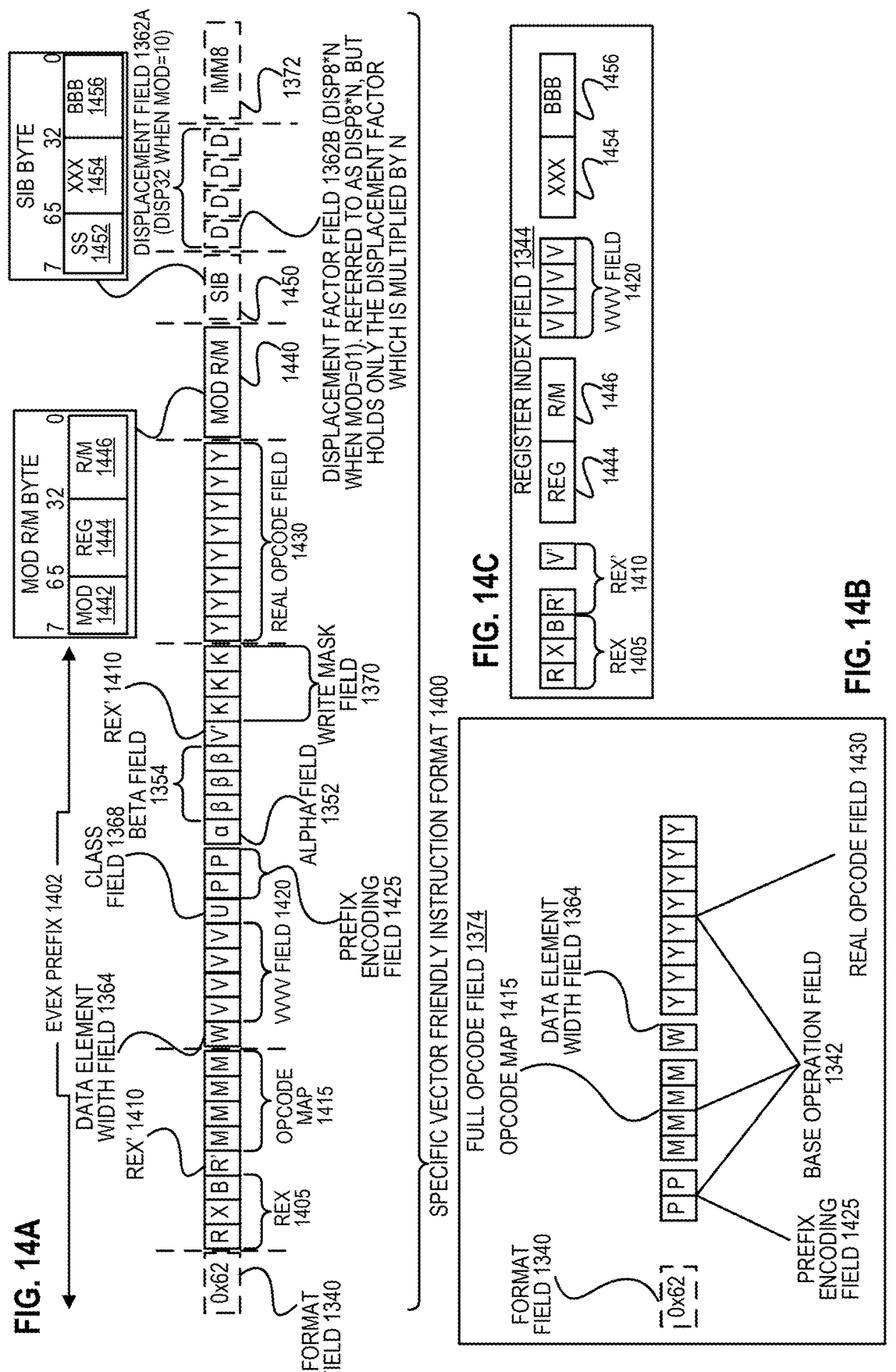
FIG. 14A is a block diagram illustrating fields for the generic vector friendly instruction formats in FIGS. 13A and 13B according to examples of the disclosure.
FIG. 14B is a block diagram illustrating the fields of the specific vector friendly instruction format in FIG. 14A that make up a full opcode field according to one example of the disclosure.
FIG. 14C is a block diagram illustrating the fields of the specific vector friendly instruction format in FIG. 14A that make up a register index field according to one example of the disclosure.

FIG. 14B is a block diagram illustrating the fields of the specific vector friendly instruction format 1400 that make up the full opcode field 1374 according to one example of the disclosure. Specifically, the full opcode field 1374 includes the format field 1340, the base operation field 1342, and the data element width (W) field 1364. The base operation field 1342 includes the prefix encoding field 1425, the opcode map field 1415, and the real opcode field 1430.

Register Index Field

FIG. 14C is a block diagram illustrating the fields of the specific vector friendly instruction format 1400 that make up the register index field 1344 according to one example of the disclosure. Specifically, the register index field 1344 includes the REX field 1405, the REX' field 1410, the MODR/M.reg field 1444, the MODR/M.r/m field 1446, the VVVV field 1420, xxx field 1454, and the bbb field 1456.

Augmentation Operation Field

Figure 14D:
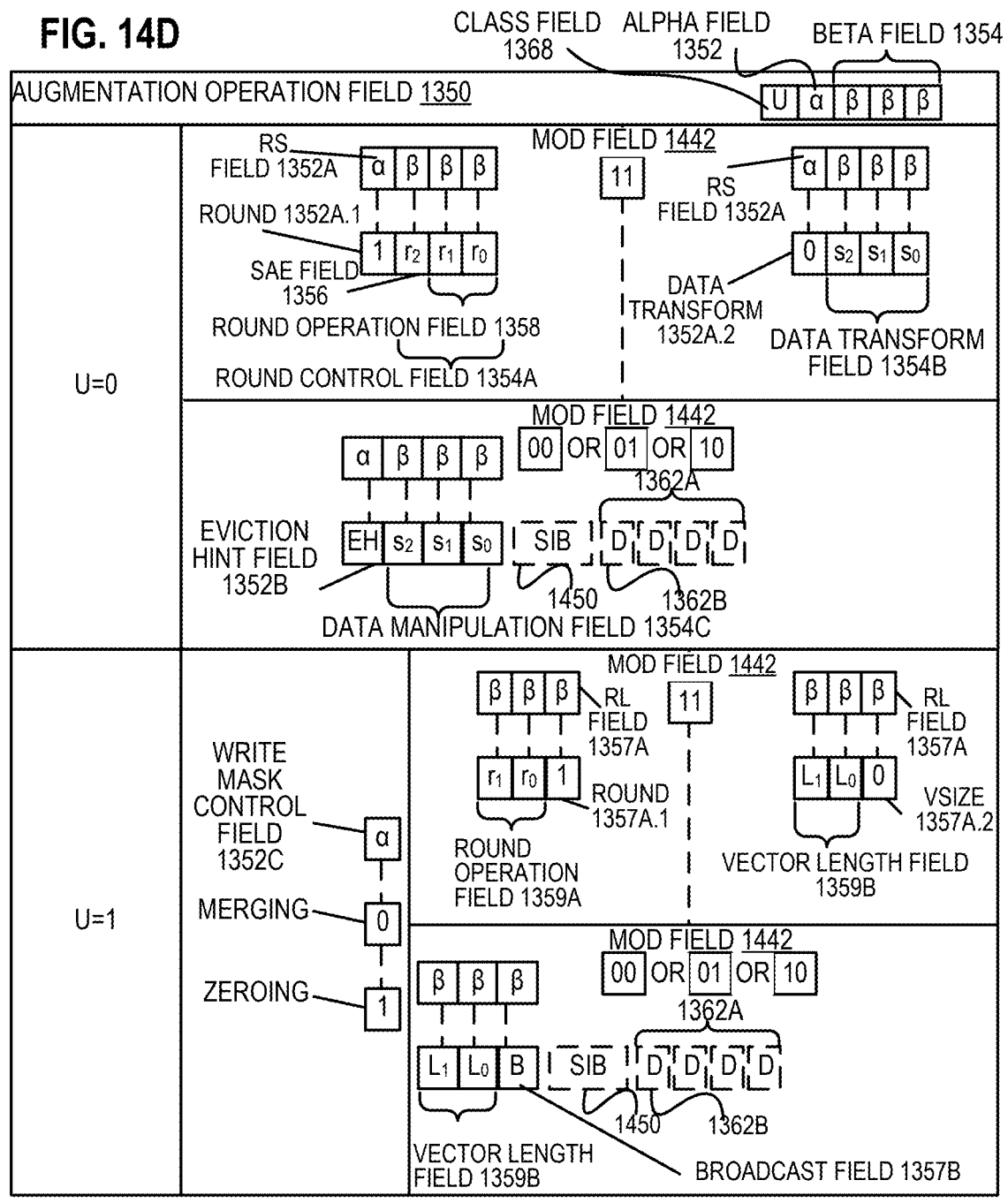
FIG. 14D is a block diagram illustrating the fields of the specific vector friendly instruction format in FIG. 14A that make up the augmentation operation field 1350 according to one example of the disclosure.

FIG. 14D is a block diagram illustrating the fields of the specific vector friendly instruction format 1400 that make up the augmentation operation field 1350 according to one example of the disclosure. When the class (U) field 1368 contains 0, it signifies EVEX.U0 (class A 1368A); when it contains 1, it signifies EVEX.U1 (class B 1368B). When U=0 and the MOD field 1442 contains 11 (signifying a no memory access operation), the alpha field 1352 (EVEX byte 3, bit [7]-EH) is interpreted as the rs field 1352A. When the rs field 1352A contains a 1 (round 1352A.1), the beta field 1354 (EVEX byte 3, bits [6:4]-SSS) is interpreted as the round control field 1354A. The round control field 1354A includes a one bit SAE field 1356 and a two bit round operation field 1358. When the rs field 1352A contains a 0 (data transform 1352A.2), the beta field 1354 (EVEX byte 3, bits [6:4]-SSS) is interpreted as a three bit data transform field 1354B. When U=0 and the MOD field 1442 contains 00, 01, or 10 (signifying a memory access operation), the alpha field 1352 (EVEX byte 3, bit [7]-EH) is interpreted as the eviction hint (EH) field 1352B and the beta field 1354 (EVEX byte 3, bits [6:4]-SSS) is interpreted as a three bit data manipulation field 1354C.

When U=1, the alpha field 1352 (EVEX byte 3, bit [7]-EH) is interpreted as the write mask control (Z) field 1352C. When U=1 and the MOD field 1442 contains 11 (signifying a no memory access operation), part of the beta field 1354 (EVEX byte 3, bit [4]-$S_0$) is interpreted as the RL field 1357A; when it contains a 1 (round 1357A.1) the rest of the beta field 1354 (EVEX byte 3, bit [6-5]-$S_{2-1}$) is interpreted as the round operation field 1359A, while when the RL field 1357A contains a 0 (VSIZE 1357.A2) the rest of the beta field 1354 (EVEX byte 3, bit [6-5]-$S_{2-1}$) is interpreted as the vector length field 1359B (EVEX byte 3, bit [6-5]-$L_{1-0}$). When U=1 and the MOD field 1442 contains 00, 01, or 10 (signifying a memory access operation), the beta field 1354 (EVEX byte 3, bits [6:4]-SSS) is interpreted as the vector length field 1359B (EVEX byte 3, bit [6-5]-$L_{1-0}$) and the broadcast field 1357B (EVEX byte 3, bit [4]-B).

Exemplary Register Architecture

Figure 15:
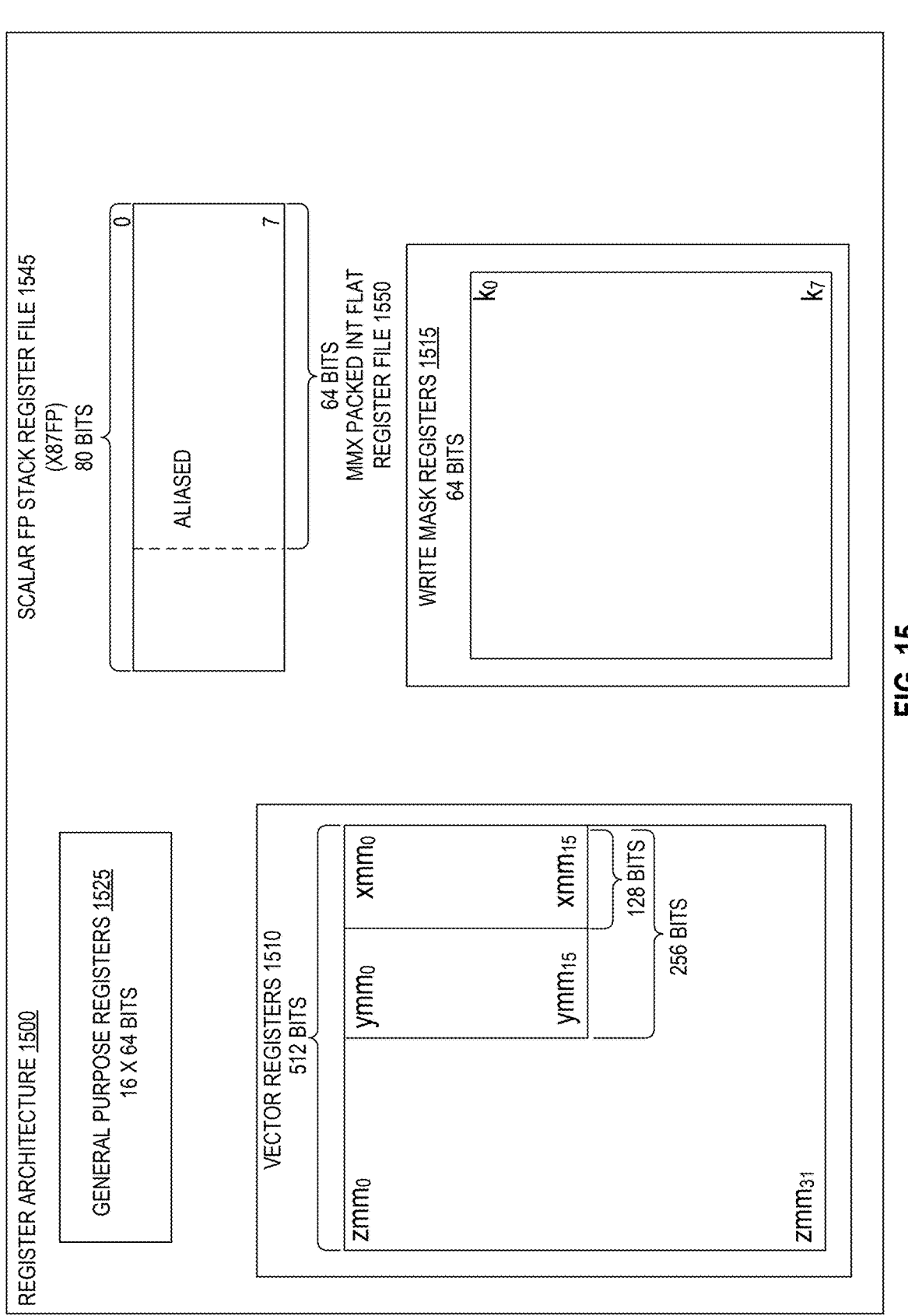
FIG. 15 is a block diagram of a register architecture according to one example of the disclosure.

FIG. 15 is a block diagram of a register architecture 1500 according to one example of the disclosure. In the example illustrated, there are 32 vector registers 1510 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1400 operates on these overlaid register file as illustrated in the below tables.

General-purpose registers 1525—in the example illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1545, on which is aliased the MMX packed integer flat register file 1550—in the example illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative examples of the disclosure may use wider or narrower registers. Additionally, alternative examples of the disclosure may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose

| Adjustable Vector Length | Class | Operations | Registers |
|---|---|---|---|
| Instruction Templates that do not include the vector length field 1359B | A (FIG. 13A; U = 0) | 1310, 1315, 1325, 1330 | zmm registers (the vector length is 64 byte) |
| | B (FIG. 13B; U = 1) | 1312 | zmm registers (the vector length is 64 byte) |
| Instruction templates that do include the vector length field 1359B | B (FIG. 13B; U = 1) | 1317, 1327 | zmm, ymm, or xmm registers (the vector length is 64 byte, 32 byte, or 16 byte) depending on the vector length field 1359B |

In other words, the vector length field 1359B selects between a maximum length and one or more other shorter lengths, where each such shorter length is half the length of the preceding length; and instructions templates without the vector length field 1359B operate on the maximum vector length. Further, in one example, the class B instruction templates of the specific vector friendly instruction format 1400 operate on packed or scalar single/double-precision floating point data and packed or scalar integer data. Scalar operations are operations performed on the lowest order data element position in a zmm/ymm/xmm register; the higher order data element positions are either left the same as they were prior to the instruction or zeroed depending on the example.

Write mask registers 1515—in the example illustrated, there are 8 write mask registers (k0 through k7), each 64 bits in size. In an alternate example, the write mask registers 1515 are 16 bits in size. As previously described, in one example of the disclosure, the vector mask register k0 cannot be used as a write mask; when the encoding that would normally indicate k0 is used for a write mask, it selects a hardwired write mask of 0xFFFF, effectively disabling write masking for that instruction.

out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

Figures 16A, 16B:
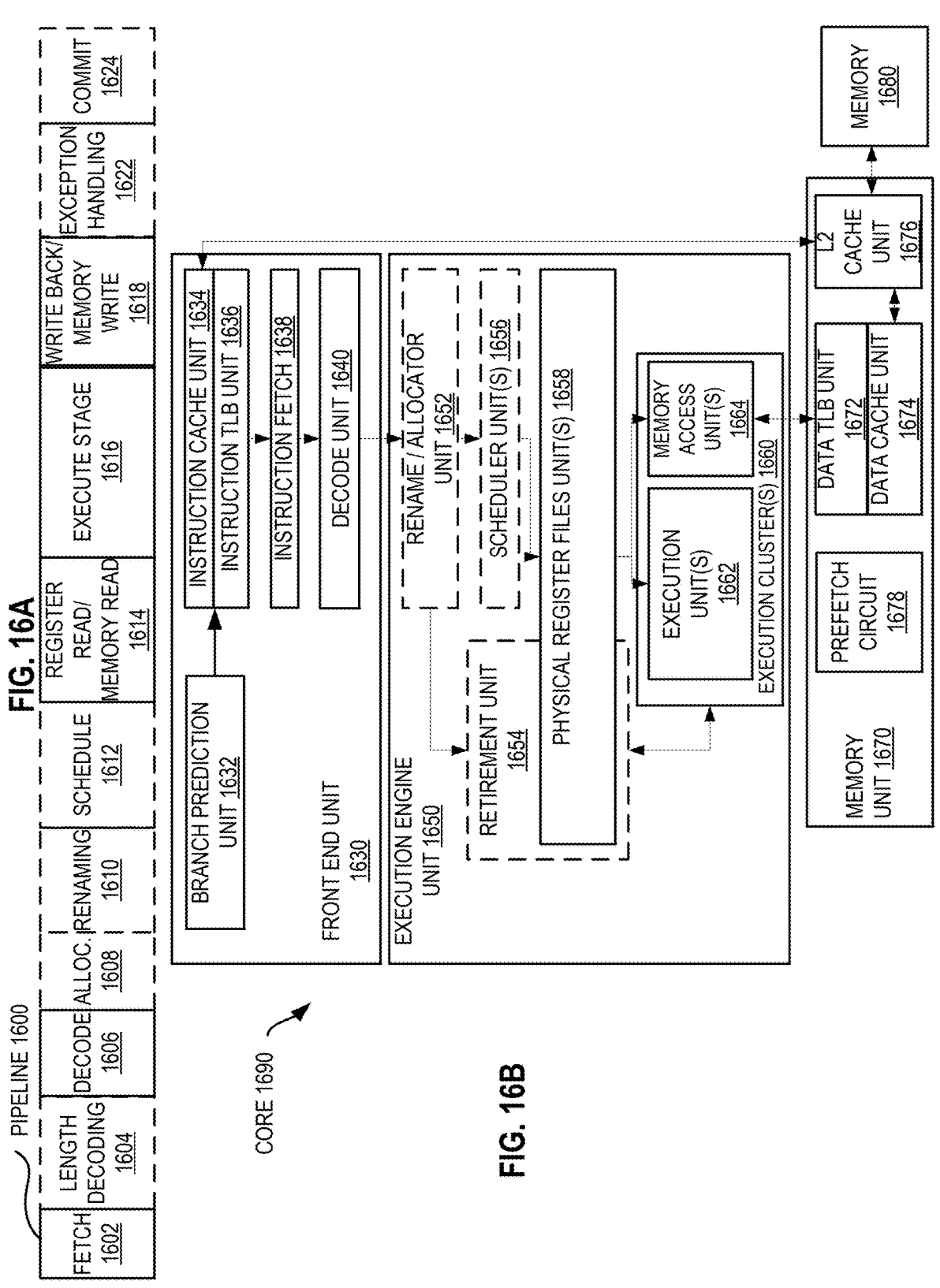
FIG. 16A is a block diagram illustrating both an exemplary in-order pipeline and an exemplary register renaming, out-of-order issue/execution pipeline according to examples of the disclosure.
FIG. 16B is a block diagram illustrating both an exemplary example of an in-order architecture core and an exemplary register renaming, out-of-order issue/execution architecture core to be included in a processor according to examples of the disclosure.

FIG. 16A is a block diagram illustrating both an exemplary in-order pipeline and an exemplary register renaming, out-of-order issue/execution pipeline according to examples of the disclosure. FIG. 16B is a block diagram illustrating both an exemplary example of an in-order architecture core and an exemplary register renaming, out-of-order issue/execution architecture core to be included in a processor according to examples of the disclosure. The solid lined boxes in FIGS. 16A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 16A, a processor pipeline 1600 includes a fetch stage 1602, a length decode stage 1604, a decode stage 1606, an allocation stage 1608, a renaming stage 1610, a scheduling (also known as a dispatch or issue) stage 1612, a register read/memory read stage 1614, an execute stage 1616, a write back/memory write stage 1618, an exception handling stage 1622, and a commit stage 1624.

FIG. 16B shows processor core 1690 including a front end unit 1630 coupled to an execution engine unit 1650, and both are coupled to a memory unit 1670. The core 1690 may be a reduced instruction set computing (RISC) core, a complex instruction set computing (CISC) core, a very long instruction word (VLIW) core, or a hybrid or alternative core type. As yet another option, the core 1690 may be a special-purpose core, such as, for example, a network or communication core, compression engine, coprocessor core, general purpose computing graphics processing unit (GPGPU) core, graphics core, or the like.

The front end unit 1630 includes a branch prediction unit 1632 coupled to an instruction cache unit 1634, which is coupled to an instruction translation lookaside buffer (TLB) 1636, which is coupled to an instruction fetch unit 1638, which is coupled to a decode unit 1640. The decode unit 1640 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 1640 may be implemented using various different mechanisms. Examples of suitable mechanisms include, but are not limited to, look-up tables, hardware implementations, programmable logic arrays (PLAs), microcode read only memories (ROMs), etc. In one example, the core 1690 includes a microcode ROM or other medium that stores microcode for certain macro-instructions (e.g., in decode unit 1640 or otherwise within the front end unit 1630). The decode unit 1640 is coupled to a rename/allocator unit 1652 in the execution engine unit 1650.

The execution engine unit 1650 includes the rename/allocator unit 1652 coupled to a retirement unit 1654 and a set of one or more scheduler unit(s) 1656. The scheduler unit(s) 1656 represents any number of different schedulers, including reservations stations, central instruction window, etc. The scheduler unit(s) 1656 is coupled to the physical register file(s) unit(s) 1658. Each of the physical register file(s) units 1658 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one example, the physical register file(s) unit 1658 comprises a vector registers unit, a write mask registers unit, and a scalar registers unit. These register units may provide architectural vector registers, vector mask registers, and general purpose registers. The physical register file(s) unit(s) 1658 is overlapped by the retirement unit 1654 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1654 and the physical register file(s) unit(s) 1658 are coupled to the execution cluster(s) 1660. The execution cluster(s) 1660 includes a set of one or more execution units 1662 and a set of one or more memory access units 1664. The execution units 1662 may perform various operations (e.g., shifts, addition, subtraction, multiplication) and on various types of data (e.g., scalar floating point, packed integer, packed floating point, vector integer, vector floating point). While some examples may include a number of execution units dedicated to specific functions or sets of functions, other examples may include only one execution unit or multiple execution units that all perform all functions. The scheduler unit(s) 1656, physical register file(s) unit(s) 1658, and execution cluster(s) 1660 are shown as being possibly plural because certain examples create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster— and in the case of a separate memory access pipeline, certain examples are implemented in which only the execution cluster of this pipeline has the memory access unit(s) 1664). It should also be understood that where separate pipelines are used, one or more of these pipelines may be out-of-order issue/execution and the rest in-order.

The set of memory access units 1664 is coupled to the memory unit 1670, which includes a data TLB unit 1672 coupled to a data cache unit 1674 coupled to a level 2 (L2) cache unit 1676. In one exemplary example, the memory access units 1664 may include a load unit, a store address unit, and a store data unit, each of which is coupled to the data TLB unit 1672 in the memory unit 1670. The instruction cache unit 1634 is further coupled to a level 2 (L2) cache unit 1676 in the memory unit 1670. The L2 cache unit 1676 is coupled to one or more other levels of cache and eventually to a main memory.

In certain examples, a prefetch circuit 1678 is included to prefetch data, for example, to predict access addresses and bring the data for those addresses into a cache or caches (e.g., from memory 1680).

By way of example, the exemplary register renaming, out-of-order issue/execution core architecture may implement the pipeline 1600 as follows: 1) the instruction fetch 1638 performs the fetch and length decoding stages 1602 and 1604; 2) the decode unit 1640 performs the decode stage 1606; 3) the rename/allocator unit 1652 performs the allocation stage 1608 and renaming stage 1610; 4) the scheduler unit(s) 1656 performs the schedule stage 1612; 5) the physical register file(s) unit(s) 1658 and the memory unit 1670 perform the register read/memory read stage 1614; the execution cluster 1660 perform the execute stage 1616; 6) the memory unit 1670 and the physical register file(s) unit(s) 1658 perform the write back/memory write stage 1618; 7) various units may be involved in the exception handling stage 1622; and 8) the retirement unit 1654 and the physical register file(s) unit(s) 1658 perform the commit stage 1624.

The core 1690 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one example, the core 1690 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyper-Threading technology).

Figure 17B:
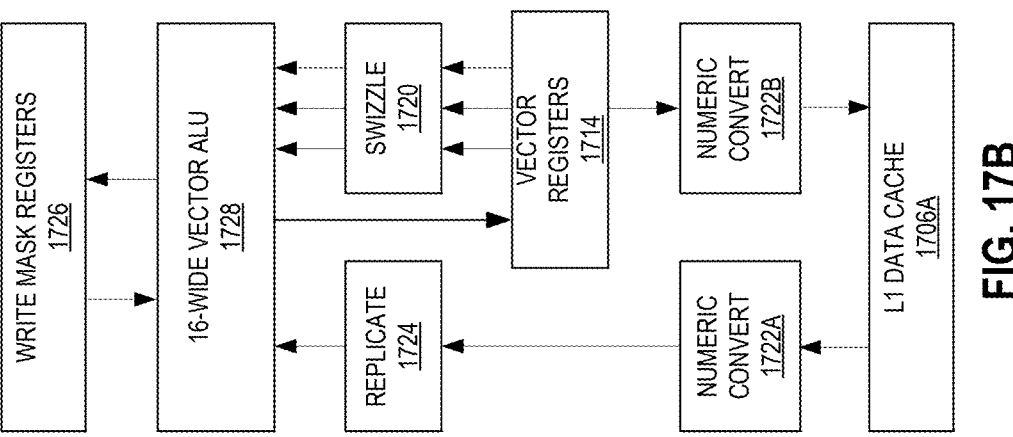
FIG. 17B is an expanded view of part of the processor core in FIG. 17A according to examples of the disclosure.
Figure 17A:
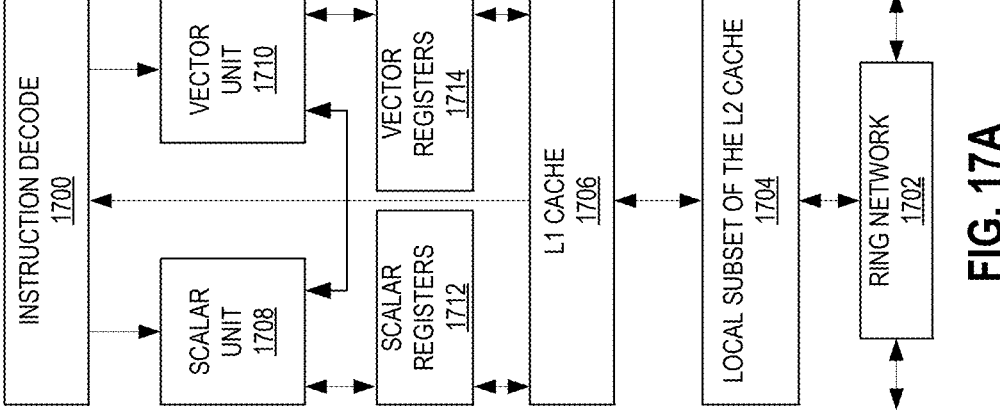
FIG. 17A is a block diagram of a single processor core, along with its connection to the on-die interconnect network and with its local subset of the Level 2 (L2) cache, according to examples of the disclosure.

While register renaming is described in the context of out-of-order execution, it should be understood that register renaming may be used in an in-order architecture. While the illustrated example of the processor also includes separate instruction and data cache units 1634/1674 and a shared L2 cache unit 1676, alternative examples may have a single internal cache for both instructions and data, such as, for example, a Level 1 (L1) internal cache, or multiple levels of internal cache. In some examples, the system may include a combination of an internal cache and an external cache that is external to the core and/or the processor. Alternatively, all of the cache may be external to the core and/or the processor. Specific Exemplary In-Order Core Architecture FIGS. 17A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory IO interfaces, and other necessary IO logic, depending on the application.

FIG. 17A is a block diagram of a single processor core, along with its connection to the on-die interconnect network 1702 and with its local subset of the Level 2 (L2) cache 1704, according to examples of the disclosure. In one example, an instruction decode unit 1700 supports the x86 instruction set with a packed data instruction set extension. An L1 cache 1706 allows low-latency accesses to cache memory into the scalar and vector units. While in one example (to simplify the design), a scalar unit 1708 and a vector unit 1710 use separate register sets (respectively, scalar registers 1712 and vector registers 1714) and data transferred between them is written to memory and then read back in from a level 1 (L1) cache 1706, alternative examples of the disclosure may use a different approach (e.g., use a single register set or include a communication path that allow data to be transferred between the two register files without being written and read back).

The local subset of the L2 cache 1704 is part of a global L2 cache that is divided into separate local subsets, one per processor core. Each processor core has a direct access path to its own local subset of the L2 cache 1704. Data read by a processor core is stored in its L2 cache subset 1704 and can be accessed quickly, in parallel with other processor cores accessing their own local L2 cache subsets. Data written by a processor core is stored in its own L2 cache subset 1704 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 17B is an expanded view of part of the processor core in FIG. 17A according to examples of the disclosure. FIG. 17B includes an L1 data cache 1706A part of the L1 cache 1704, as well as more detail regarding the vector unit 1710 and the vector registers 1714. Specifically, the vector unit 1710 is a 16-wide vector processing unit (VPU) (see the 16-wide ALU 1728), which executes one or more of integer, single-precision float, and double-precision float instructions. The VPU supports swizzling the register inputs with swizzle unit 1720, numeric conversion with numeric convert units 1722A-B, and replication with replication unit 1724 on the memory input. Write mask registers 1726 allow predicating resulting vector writes.

Figure 18:
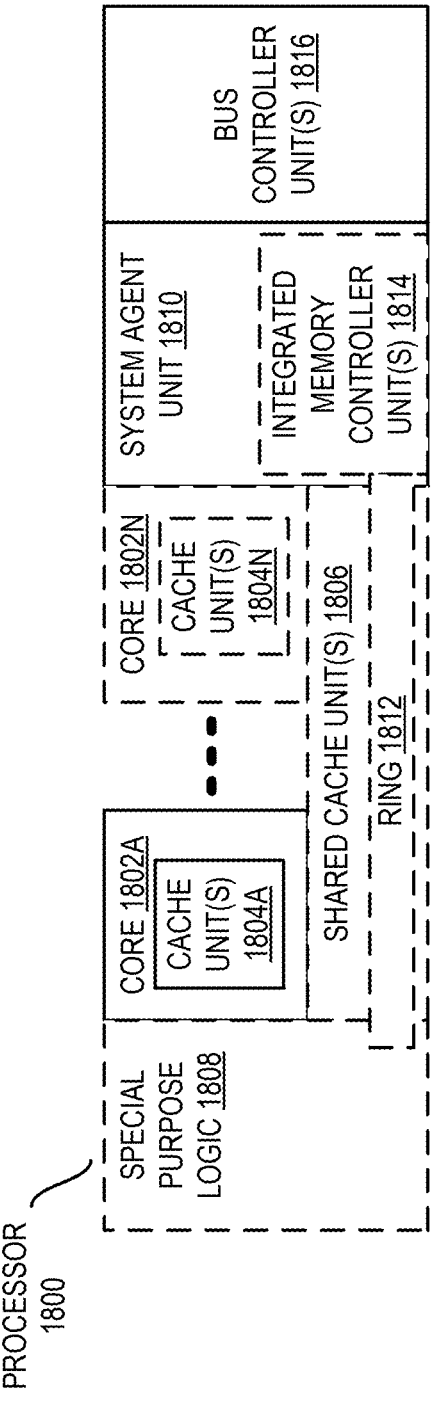
FIG. 18 is a block diagram of a processor that may have more than one core, may have an integrated memory controller, and may have integrated graphics according to examples of the disclosure.

FIG. 18 is a block diagram of a processor 1800 that may have more than one core, may have an integrated memory controller, and may have integrated graphics according to examples of the disclosure. The solid lined boxes in FIG. 18 illustrate a processor 1800 with a single core 1802A, a system agent 1810, a set of one or more bus controller units 1816, while the optional addition of the dashed lined boxes illustrates an alternative processor 1800 with multiple cores 1802A-N, a set of one or more integrated memory controller unit(s) 1814 in the system agent unit 1810, and special purpose logic 1808.

Thus, different implementations of the processor 1800 may include: 1) a CPU with the special purpose logic 1808 being integrated graphics and/or scientific (throughput) logic (which may include one or more cores), and the cores 1802A-N being one or more general purpose cores (e.g., general purpose in-order cores, general purpose out-of-order cores, a combination of the two); 2) a coprocessor with the cores 1802A-N being a large number of special purpose cores intended primarily for graphics and/or scientific (throughput); and 3) a coprocessor with the cores 1802A-N being a large number of general purpose in-order cores. Thus, the processor 1800 may be a general-purpose processor, coprocessor, or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1800 may be a part of and/or may be implemented on one or more substrates using any of a number of process technologies, such as, for example, BiCMOS, CMOS, or NMOS.

The memory hierarchy includes one or more levels of cache 1802A-1802N within the cores, a set or one or more shared cache units 1806, and external memory (not shown) coupled to the set of integrated memory controller units 1814. The set of shared cache units 1806 may include one or more mid-level caches, such as level 2 (L2), level 3 (L3), level 4 (L4), or other levels of cache, a last level cache (LLC), and/or combinations thereof. While in one example a ring based interconnect unit 1812 interconnects the integrated graphics logic 1808, the set of shared cache units 1806, and the system agent unit 1810/integrated memory controller unit(s) 1814, alternative examples may use any number of well-known techniques for interconnecting such units. In one example, coherency is maintained between one or more cache units 1806 and cores 1802-A-N.

In some examples, one or more of the cores 1802A-N are capable of multi-threading. The system agent 1810 includes those components coordinating and operating cores 1802A-

N. The system agent unit 1810 may include for example a power control unit (PCU) and a display unit. The PCU may be or include logic and components needed for regulating the power state of the cores 1802A-N and the integrated graphics logic 1808. The display unit is for driving one or more externally connected displays.

The cores 1802A-N may be homogenous or heterogeneous in terms of architecture instruction set; that is, two or more of the cores 1802A-N may be capable of execution the same instruction set, while others may be capable of executing only a subset of that instruction set or a different instruction set.

Exemplary Computer Architectures

FIGS. 19-22 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, handheld devices, and various other electronic devices, are also suitable. In general, a huge variety of systems or electronic devices capable of incorporating a processor and/or other execution logic as disclosed herein are generally suitable.

Figure 19:
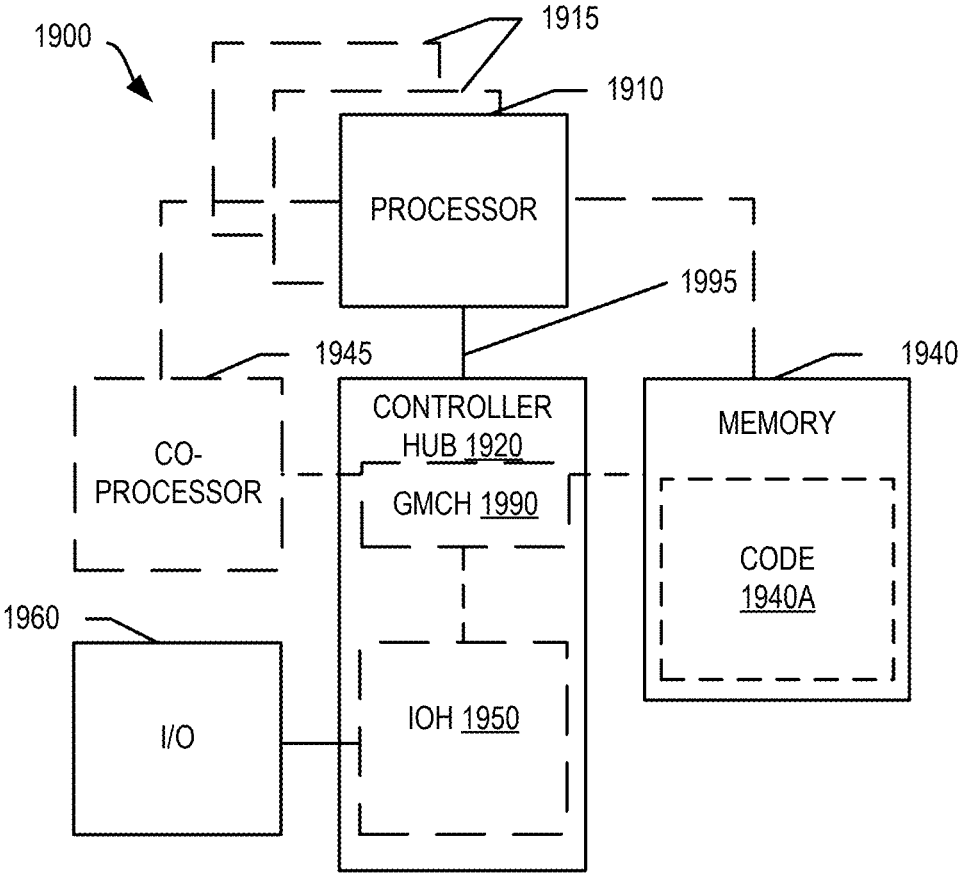
FIG. 19 is a block diagram of a system in accordance with one example of the present disclosure.

Referring now to FIG. 19, shown is a block diagram of a system 1900 in accordance with one example of the present disclosure. The system 1900 may include one or more processors 1910, 1915, which are coupled to a controller hub 1920. In one example the controller hub 1920 includes a graphics memory controller hub (GMCH) 1990 and an Input/Output Hub (IOH) 1950 (which may be on separate chips); the GMCH 1990 includes memory and graphics controllers to which are coupled memory 1940 and a coprocessor 1945; the IOH 1950 couples input/output (IO) devices 1960 to the GMCH 1990. Alternatively, one or both of the memory and graphics controllers are integrated within the processor (as described herein), the memory 1940 and the coprocessor 1945 are coupled directly to the processor 1910, and the controller hub 1920 in a single chip with the IOH 1950. Memory 1940 may include code 1940A, for example, that when executed causes a processor to perform any method of this disclosure.

The optional nature of additional processors 1915 is denoted in FIG. 19 with broken lines. Each processor 1910, 1915 may include one or more of the processing cores described herein and may be some version of the processor 1800.

The memory 1940 may be, for example, dynamic random access memory (DRAM), phase change memory (PCM), or a combination of the two. For at least one example, the controller hub 1920 communicates with the processor(s) 1910, 1915 via a multi-drop bus, such as a frontside bus (FSB), point-to-point interface such as Quickpath Interconnect (QPI), or similar connection 1995.

In one example, the coprocessor 1945 is a special-purpose processor, such as, for example, a high-throughput MIC processor, a network or communication processor, compression engine, graphics processor, GPGPU, embedded processor, or the like. In one example, controller hub 1920 may include an integrated graphics accelerator.

There can be a variety of differences between the physical resources 1910, 1915 in terms of a spectrum of metrics of merit including architectural, microarchitectural, thermal, power consumption characteristics, and the like.

In one example, the processor 1910 executes instructions that control data processing operations of a general type.

Embedded within the instructions may be coprocessor instructions. The processor 1910 recognizes these coprocessor instructions as being of a type that should be executed by the attached coprocessor 1945. Accordingly, the processor 1910 issues these coprocessor instructions (or control signals representing coprocessor instructions) on a coprocessor bus or other interconnect, to coprocessor 1945. Coprocessor(s) 1945 accept and execute the received coprocessor instructions.

Figure 20:
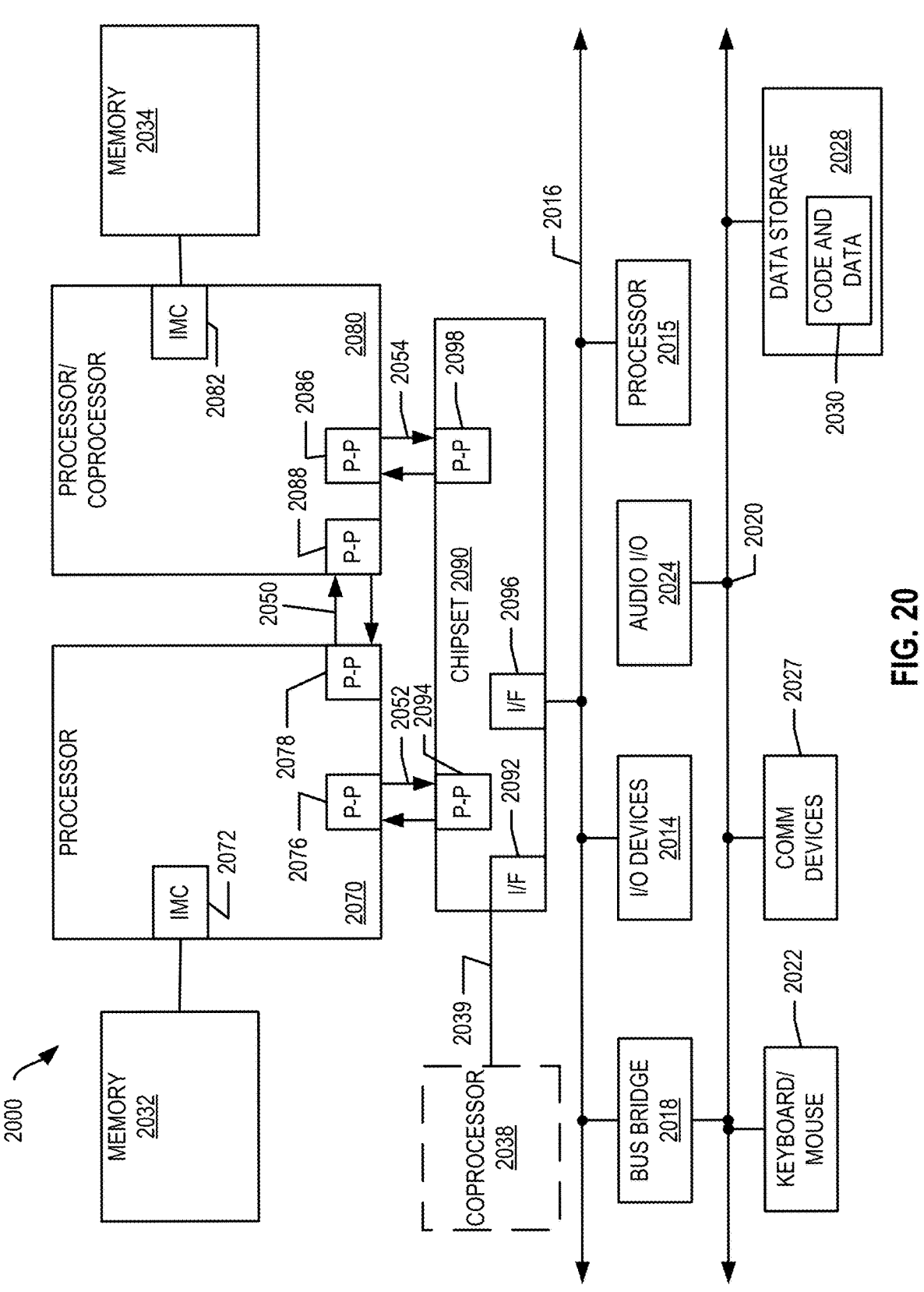
FIG. 20 is a block diagram of a more specific exemplary system in accordance with an example of the present disclosure.

Referring now to FIG. 20, shown is a block diagram of a first more specific exemplary system 2000 in accordance with an example of the present disclosure. As shown in FIG. 20, multiprocessor system 2000 is a point-to-point interconnect system, and includes a first processor 2070 and a second processor 2080 coupled via a point-to-point interconnect 2050. Each of processors 2070 and 2080 may be some version of the processor 1800. In one example of the disclosure, processors 2070 and 2080 are respectively processors 1910 and 1915, while coprocessor 2038 is coprocessor 1945. In another example, processors 2070 and 2080 are respectively processor 1910 coprocessor 1945.

Processors 2070 and 2080 are shown including integrated memory controller (IMC) units 2072 and 2082, respectively. Processor 2070 also includes as part of its bus controller units point-to-point (P-P) interfaces 2076 and 2078; similarly, second processor 2080 includes P-P interfaces 2086 and 2088. Processors 2070, 2080 may exchange information via a point-to-point (P-P) interface 2050 using P-P interface circuits 2078, 2088. As shown in FIG. 20, IMCs 2072 and 2082 couple the processors to respective memories, namely a memory 2032 and a memory 2034, which may be portions of main memory locally attached to the respective processors.

Processors 2070, 2080 may each exchange information with a chipset 2090 via individual P-P interfaces 2052, 2054 using point to point interface circuits 2076, 2094, 2086, 2098. Chipset 2090 may optionally exchange information with the coprocessor 2038 via a high-performance interface 2039. In one example, the coprocessor 2038 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 2090 may be coupled to a first bus 2016 via an interface 2096. In one example, first bus 2016 may be a Peripheral Component Interconnect (PCI) bus, or a bus such as a PCI Express bus or another third generation IO interconnect bus, although the scope of the present disclosure is not so limited.

As shown in FIG. 20, various IO devices 2014 may be coupled to first bus 2016, along with a bus bridge 2018 which couples first bus 2016 to a second bus 2020. In one example, one or more additional processor(s) 2015, such as coprocessors, high-throughput MIC processors, GPGPU's, accelerators (such as, e.g., graphics accelerators or digital signal processing (DSP) units), field programmable gate arrays, or any other processor, are coupled to first bus 2016. In one example, second bus 2020 may be a low pin count (LPC) bus. Various devices may be coupled to a second bus 2020 including, for example, a keyboard and/or mouse 2022, communication devices 2027 and a storage unit 2028 such as a disk drive or other mass storage device which may include instructions/code and data 2030, in one example. Further, an audio IO 2024 may be coupled to the second bus 2020. Note that other architectures are possible. For example, instead of the point-to-point architecture of FIG. 20, a system may implement a multi-drop bus or other such architecture.

Figure 21:
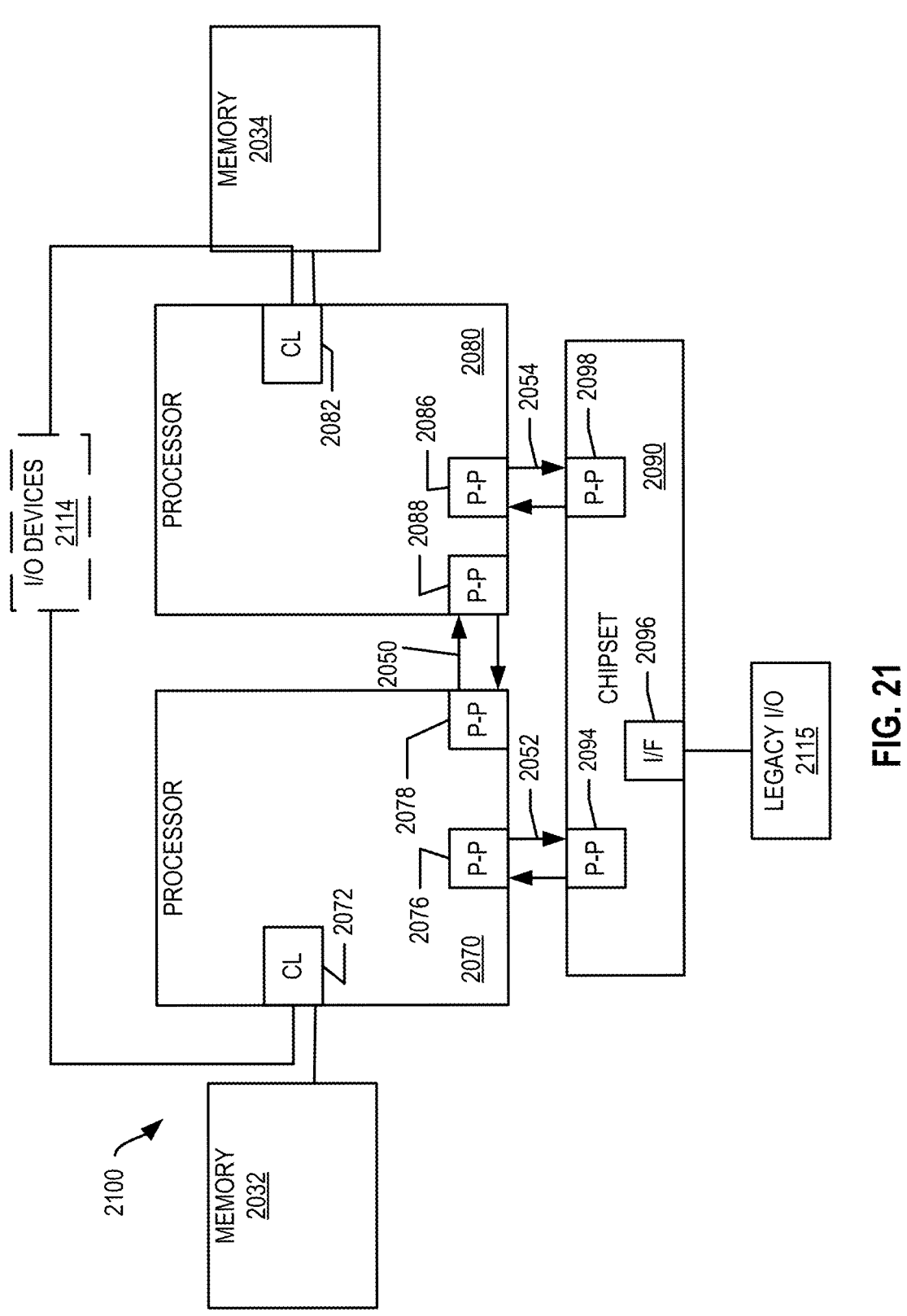
FIG. 21, shown is a block diagram of a second more specific exemplary system in accordance with an example of the present disclosure.

Referring now to FIG. 21, shown is a block diagram of a second more specific exemplary system 2100 in accordance with an example of the present disclosure. Like elements in FIGS. 20 and 21 bear like reference numerals, and certain aspects of FIG. 20 have been omitted from FIG. 21 in order to avoid obscuring other aspects of FIG. 21.

FIG. 21 illustrates that the processors 2070, 2080 may include integrated memory and IO control logic ("CL") 2072 and 2082, respectively. Thus, the CL 2072, 2082 include integrated memory controller units and include IO control logic. FIG. 21 illustrates that not only are the memories 2032, 2034 coupled to the CL 2072, 2082, but also that IO devices 2114 are also coupled to the control logic 2072, 2082. Legacy IO devices 2115 are coupled to the chipset 2090.

Figure 22:
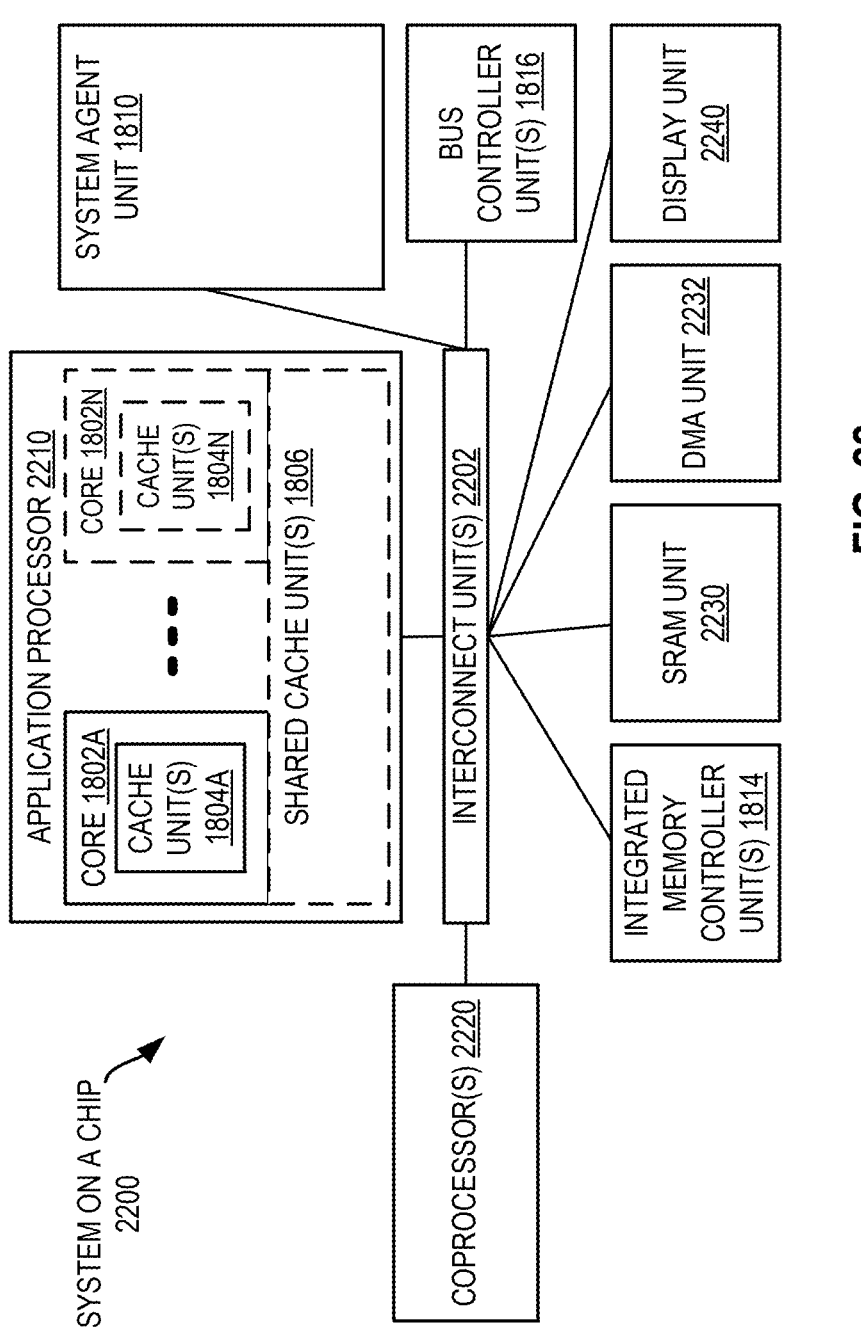
FIG. 22, shown is a block diagram of a system on a chip (SoC) in accordance with an example of the present disclosure.

Referring now to FIG. 22, shown is a block diagram of a SoC 2200 in accordance with an example of the present disclosure. Similar elements in FIG. 18 bear like reference numerals. Also, dashed lined boxes are optional features on more advanced SoCs. In FIG. 22, an interconnect unit(s) 2202 is coupled to: an application processor 2210 which includes a set of one or more cores 1802A-N and shared cache unit(s) 1806; a system agent unit 1810; a bus controller unit(s) 1816; an integrated memory controller unit(s) 1814; a set or one or more coprocessors 2220 which may include integrated graphics logic, an image processor, an audio processor, and a video processor; an static random access memory (SRAM) unit 2230; a direct memory access (DMA) unit 2232; and a display unit 2240 for coupling to one or more external displays. In one example, the coprocessor(s) 2220 include a special-purpose processor, such as, for example, a network or communication processor, compression engine, GPGPU, a high-throughput MIC processor, embedded processor, or the like.

Examples (e.g., of the mechanisms) disclosed herein may be implemented in hardware, software, firmware, or a combination of such implementation approaches. Examples of the disclosure may be implemented as computer programs or program code executing on programmable systems comprising at least one processor, a storage system (including volatile and non-volatile memory and/or storage elements), at least one input device, and at least one output device.

Program code, such as code 2030 illustrated in FIG. 20, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one example may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, examples of the disclosure also include non-transitory, tangible machine-readable media containing instructions or containing design data, such as Hardware Description Language (HDL), which defines structures, circuits, apparatuses, processors and/or system features described herein. Such examples may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 23:
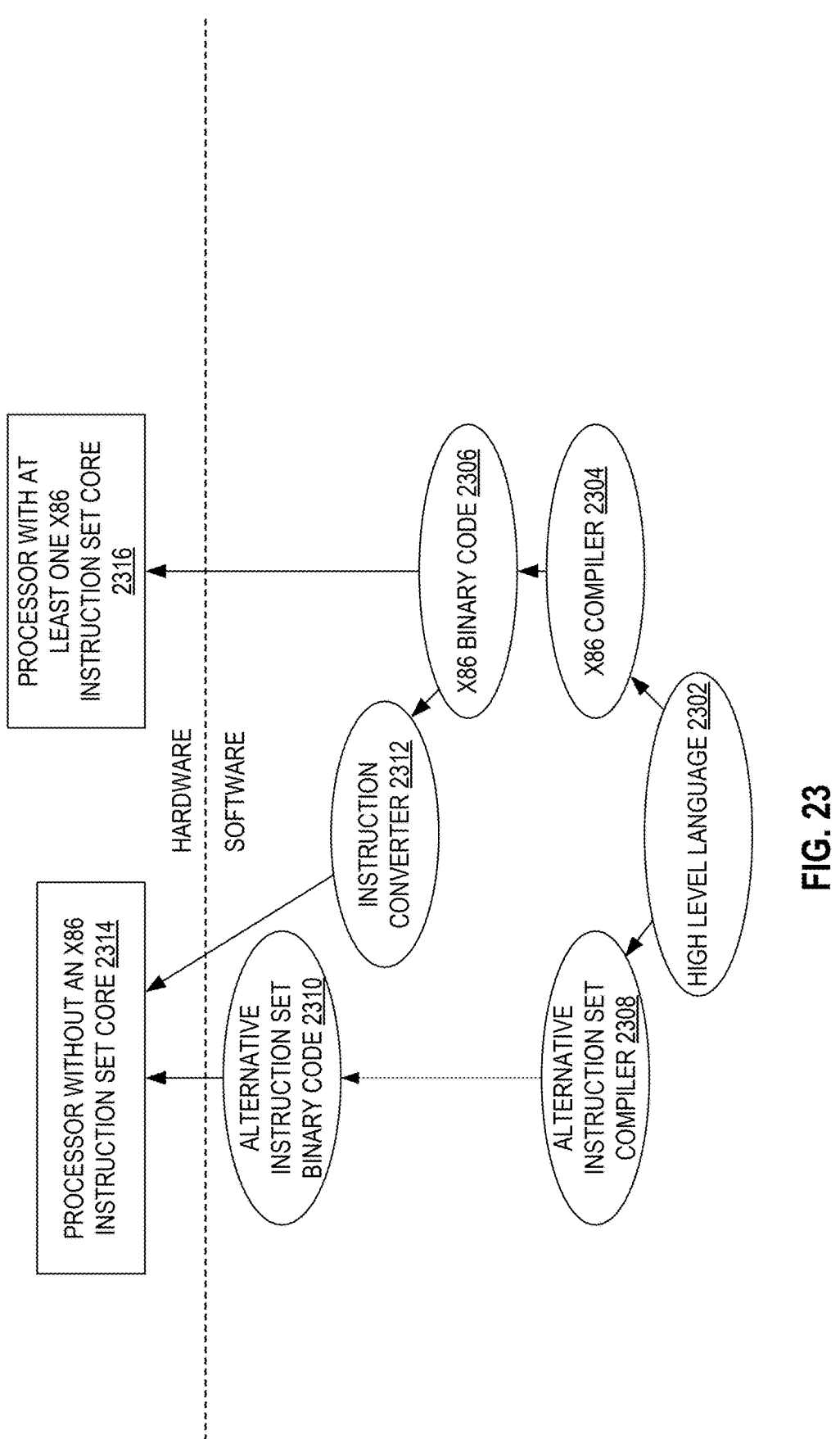
FIG. 23 is a block diagram contrasting the use of a software instruction converter to convert binary instructions in a source instruction set to binary instructions in a target instruction set according to examples of the disclosure.

FIG. 23 is a block diagram contrasting the use of a software instruction converter to convert binary instructions in a source instruction set to binary instructions in a target instruction set according to examples of the disclosure. In the illustrated example, the instruction converter is a software instruction converter, although alternatively the instruction converter may be implemented in software, firmware, hardware, or various combinations thereof. FIG. 23 shows a program in a high level language 2302 may be compiled using an x86 compiler 2304 to generate x86 binary code 2306 that may be natively executed by a processor with at least one x86 instruction set core 2316. The processor with at least one x86 instruction set core 2316 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 2304 represents a compiler that is operable to generate x86 binary code 2306 (e.g., object code) that can, with or without additional linkage processing, be executed on the processor with at least one x86 instruction set core 2316. Similarly, FIG. 23 shows the program in the high level language 2302 may be compiled using an alternative instruction set compiler 2308 to generate alternative instruction set binary code 2310 that may be natively executed by a processor without at least one x86 instruction set core 2314 (e.g., a processor with cores that execute the MIPS instruction set of MIPS Technologies of Sunnyvale, CA and/or that execute the ARM instruction set of ARM Holdings of Sunnyvale, CA). The instruction converter 2312 is used to convert the x86 binary code 2306 into code that may be natively executed by the processor without an x86 instruction set core 2314. This converted code is not likely to be the same as the alternative instruction set binary code 2310 because an instruction converter capable of this is difficult to make; however, the converted code will accomplish the general operation and be made up of instructions from the alternative instruction set. Thus, the instruction converter 2312 represents software, firmware, hardware, or a combination thereof that, through emulation, simulation, or any other process, allows a processor or other electronic device that does not have an x86 instruction set processor or core to execute the x86 binary code 2306.

What is claimed is:

1. An apparatus comprising:
a hardware processor core configurable to implement a trust domain manager to manage one or more virtual machines as a respective trust domain isolated from a virtual machine monitor; and
a device security manager circuit to be coupled between the hardware processor core and an input/output device, wherein the device security manager circuit is to, in response to a trusted request from the trust domain manager to a control interface of the device security manager circuit, access a state of a trusted device interface of the input/output device for a trust domain of the trust domain manager, and provide a corresponding response to the trust domain manager.

2. The apparatus of claim 1, wherein the control interface of the device security manager circuit comprises a set of one or more protected registers that are accessible by the trust domain manager and not accessible by the virtual machine monitor of the one or more virtual machines.

3. The apparatus of claim 1, wherein the control interface of the device security manager circuit comprises a protected trust domain mode and a management trusted device interface of the device security manager circuit, and the device security manager circuit is to access the state of the trusted device interface of the input/output device in response to the protected trust domain mode being enabled and the trusted request including a trusted execution environment field that indicates the trusted request is from a trusted entity.

4. The apparatus of claim 3, wherein the management trusted device interface of the device security manager circuit is accessible by the trust domain and not accessible by a second trust domain managed by the trust domain manager.

5. The apparatus of claim 3, wherein the management trusted device interface of the device security manager circuit is to not accept the trusted request in response to the protected trust domain mode being disabled.

6. The apparatus of claim 5, wherein the device security manager circuit is to:
lock configuration of the input/output device in response to the protected trust domain mode being enabled;

monitor the input/output device for a re-configuration or an error event;
disable the protected trust domain mode in response to the re-configuration; and
disable the protected trust domain mode in response to the error event.

7. The apparatus of claim 1, wherein the control interface of the device security manager circuit comprises a set of protected registers that provide firmware measurements for the input/output device.

8. The apparatus of claim 1, wherein the device security manager circuit is to, in response to the trusted request from the trust domain manager to the control interface of the device security manager circuit, transition the state of the trusted device interface according to a Trusted Execution Environment (TEE) Device Interface Security Protocol standard.

9. A method comprising:
managing one or more virtual machines as a respective trust domain, isolated from a virtual machine monitor, by a trust domain manager implemented by a hardware processor core;
sending a trusted request from the trust domain manager to a control interface of a device security manager circuit of an input/output device coupled to the hardware processor core;
accessing, in response to the trusted request, a state of a trusted device interface of the input/output device for a trust domain of the trust domain manager; and
receiving a corresponding response by the trust domain manager.

10. The method of claim 9, wherein the control interface of the device security manager circuit comprises a set of one or more protected registers that are accessible by the trust domain manager and not accessible by the virtual machine monitor of the one or more virtual machines, and the receiving comprises performing a read or a write on the set of one or more protected registers.

11. The method of claim 9, wherein the control interface of the device security manager circuit comprises a protected trust domain mode and a management trusted device interface of the device security manager circuit, and the accessing the state of the trusted device interface of the input/output device is in response to the protected trust domain mode being enabled and the trusted request including a trusted execution environment field that indicates the trusted request is from a trusted entity.

12. The method of claim 11, wherein the management trusted device interface of the device security manager circuit is accessible by the trust domain and not accessible by a second trust domain managed by the trust domain manager.

13. The method of claim 11, further comprising not accepting, by the management trusted device interface of the device security manager circuit, the trusted request in response to the protected trust domain mode being disabled.

14. The method of claim 13, further comprising:
locking configuration of the input/output device in response to the protected trust domain mode being enabled;
monitoring the input/output device for a re-configuration or an error event;
disabling the protected trust domain mode in response to the re-configuration; and
disabling the protected trust domain mode in response to the error event.

15. The method of claim 9, wherein the control interface of the device security manager circuit comprises a set of protected registers, and the accessing comprises performing a read of firmware measurements from the set of protected registers for the input/output device.

16. The method of claim 9, wherein the accessing the state comprises transitioning the state of the trusted device interface according to a Trusted Execution Environment (TEE) Device Interface Security Protocol standard.

17. A system comprising:

a hardware processor core configurable to implement a trust domain manager to manage one or more virtual machines as a respective trust domain isolated from a virtual machine monitor; and an input/output device coupled to the hardware processor core and comprising a device security manager circuit, wherein the device security manager circuit is to, in response to a trusted request from the trust domain manager to a control interface of the device security manager circuit, access a state of a trusted device interface of the input/output device for a trust domain of the trust domain manager, and provide a corresponding response to the trust domain manager.

18. The system of claim 17, wherein the control interface of the device security manager circuit comprises a set of one or more protected registers that are accessible by the trust domain manager and not accessible by the virtual machine monitor of the one or more virtual machines.

19. The system of claim 17, wherein the control interface of the device security manager circuit comprises a protected trust domain mode and a management trusted device interface of the device security manager circuit, and the device security manager circuit is to access the state of the trusted device interface of the input/output device in response to the protected trust domain mode being enabled and the trusted request including a trusted execution environment field that indicates the trusted request is from a trusted entity.

20. The system of claim 19, wherein the management trusted device interface of the device security manager circuit is accessible by the trust domain and not accessible by a second trust domain managed by the trust domain manager.

21. The system of claim 19, wherein the management trusted device interface of the device security manager circuit is to not accept the trusted request in response to the protected trust domain mode being disabled.

22. The system of claim 21, wherein the device security manager circuit is to:

lock configuration of the input/output device in response to the protected trust domain mode being enabled;

monitor the input/output device for a re-configuration or an error event;

disable the protected trust domain mode in response to the re-configuration; and disable the protected trust domain mode in response to the error event.

23. The system of claim 17, wherein the control interface of the device security manager circuit comprises a set of protected registers that provide firmware measurements for the input/output device.

24. The system of claim 17, wherein the device security manager circuit is to, in response to the trusted request from the trust domain manager to the control interface of the device security manager circuit, transition the state of the trusted device interface according to a Trusted Execution Environment (TEE) Device Interface Security Protocol standard.

* * * * *